(12) United States Patent
Douglas

(10) Patent No.: US 12,543,970 B2
(45) Date of Patent: Feb. 10, 2026

(54) RESPIRATORY DIAGNOSTIC TOOL AND METHOD

(71) Applicant: ARETE MEDICAL TECHNOLOGIES LTD, Cambridge (GB)

(72) Inventor: Graeham Douglas, Cambridge (GB)

(73) Assignee: ARTE MEDICAL TECHNOLOGIES LTD, Cambridge (GB)

( * ) Notice: Subject to any disclaimer, the term of this patent is extended or adjusted under 35 U.S.C. 154(b) by 816 days.

(21) Appl. No.: 17/260,338

(22) PCT Filed: Jul. 12, 2019

(86) PCT No.: PCT/GB2019/051968
§ 371 (c)(1),
(2) Date: Jan. 14, 2021

(87) PCT Pub. No.: WO2020/016558
PCT Pub. Date: Jan. 23, 2020

(65) Prior Publication Data
US 2021/0290101 A1    Sep. 23, 2021

(30) Foreign Application Priority Data

Jul. 14, 2018 (GB) .................................... 1811581
Jul. 14, 2018 (GB) .................................... 1811582
Jul. 14, 2018 (GB) .................................... 1811583

(51) Int. Cl.
*A61B 5/087*    (2006.01)

(52) U.S. Cl.
CPC ...... *A61B 5/087* (2013.01); *A61B 2562/0247* (2013.01); *A61B 2562/0271* (2013.01); *A61B 2562/029* (2013.01)

(58) Field of Classification Search
None
See application file for complete search history.

(56) References Cited

U.S. PATENT DOCUMENTS 4,220,161 A    9/1980    Berlin et al.
4,333,476 A    6/1982    Downing, Jr.
(Continued)

FOREIGN PATENT DOCUMENTS

BE    1001672    2/1990
CN    1625367    6/2005
(Continued)

OTHER PUBLICATIONS

NCI Dictionary of Cancer terms. Comprehensive Cancer Information—NCI. https://www.cancer.gov/publications/dictionaries/cancer-terms/def/diagnostic-test (Year: 2024).*

(Continued)

*Primary Examiner* — Jacqueline Cheng
*Assistant Examiner* — Samuel C Kim
(74) *Attorney, Agent, or Firm* — HSML P.C.

(57) ABSTRACT

In one embodiment, there is provided a device for performing a plurality of respiratory diagnostic tests, comprising: a housing, a sensor assembly, and control circuitry configured to receive signals from the sensor assembly; wherein the device has a first configuration in which the device is configured to perform a first respiratory diagnostic test and a second configuration in which the device is configured to perform a second respiratory diagnostic test, wherein in the first configuration an airflow channel is defined through the device housing, the sensor assembly being configured to measure at least a first property of air in the airflow channel during the first respiratory diagnostic test, and wherein in the second configuration the airflow channel is modified relative to the first configuration, the sensor assembly being used to measure at least a second property of air in the airflow channel during the second respiratory diagnostic test. In another embodiment there is provided a stand-alone device is designed for performing an impulse oscillometry test.

4 Claims, 24 Drawing Sheets

(56) References Cited

U.S. PATENT DOCUMENTS

| | | | |
|---|---|---|---|
| 4,346,584 A * | 8/1982 | Boehringer | G01N 33/4972 |
| | | | 73/23.3 |
| 4,730,479 A | 3/1988 | Pyke et al. | |
| 5,318,038 A | 6/1994 | Jackson et al. | |
| 5,357,975 A | 10/1994 | Kraemer et al. | |
| 5,447,165 A | 9/1995 | Gustafsson | |
| 5,716,506 A | 2/1998 | Maclay et al. | |
| 5,922,610 A | 7/1999 | Alving et al. | |
| 6,010,459 A | 1/2000 | Silkoff et al. | |
| 6,038,913 A | 3/2000 | Gustafsson et al. | |
| 6,066,101 A | 5/2000 | Johnson et al. | |
| 6,099,480 A | 8/2000 | Gustafsson | |
| 6,138,674 A | 10/2000 | Gull et al. | |
| 6,203,502 B1 | 3/2001 | Hilgendorf et al. | |
| 6,612,306 B1 | 9/2003 | Mault | |
| 6,620,106 B2 | 9/2003 | Mault | |
| 6,629,934 B2 | 10/2003 | Mault et al. | |
| 6,712,762 B1 | 3/2004 | Lichter et al. | |
| 6,733,463 B2 | 5/2004 | Moilanen et al. | |
| 6,733,464 B2 | 5/2004 | Olbrich et al. | |
| 6,761,185 B1 | 7/2004 | De Leeuw | |
| 6,777,120 B2 | 8/2004 | Nelson et al. | |
| 6,792,793 B2 | 9/2004 | Mendoza | |
| 6,842,705 B2 | 1/2005 | Moriyama | |
| 6,866,637 B2 | 3/2005 | George et al. | |
| 6,899,683 B2 | 5/2005 | Mault et al. | |
| 6,997,880 B2 | 2/2006 | Carlebach et al. | |
| 7,014,692 B2 | 3/2006 | Nilsson et al. | |
| 7,063,669 B2 | 6/2006 | Brawner et al. | |
| 7,185,650 B2 | 3/2007 | Huber et al. | |
| 7,282,032 B2 | 10/2007 | Miller | |
| 7,402,139 B2 | 7/2008 | Ganshorn | |
| 7,445,601 B2 | 11/2008 | Kline | |
| 7,547,931 B2 | 6/2009 | Star et al. | |
| 7,611,671 B2 | 11/2009 | Anvar et al. | |
| 7,687,275 B2 | 3/2010 | Burdinski | |
| 7,814,777 B2 | 10/2010 | Van Kesteren | |
| 8,040,516 B2 | 10/2011 | Van Kesteren et al. | |
| 8,100,836 B2 | 1/2012 | Diong | |
| 8,176,915 B2 | 5/2012 | Jaffe et al. | |
| 8,181,503 B2 | 5/2012 | Flaherty et al. | |
| 8,206,311 B2 | 6/2012 | Chazan et al. | |
| 8,323,207 B2 | 12/2012 | Popov et al. | |
| 8,357,100 B2 | 1/2013 | Eriksen et al. | |
| 8,403,865 B2 | 3/2013 | Halperin et al. | |
| 8,425,428 B2 | 4/2013 | Wood | |
| 8,449,474 B2 | 5/2013 | Schuessler et al. | |
| 8,459,261 B2 | 6/2013 | Ricciardelli et al. | |
| 8,539,809 B2 | 9/2013 | Hemmingsson et al. | |
| 8,573,030 B2 | 11/2013 | Gole | |
| 8,623,281 B2 | 1/2014 | Setayesh et al. | |
| 8,641,637 B2 | 2/2014 | Sly et al. | |
| 8,796,034 B2 | 8/2014 | Von Bahr et al. | |
| 8,801,609 B2 | 8/2014 | Beiswenger et al. | |
| 8,834,798 B2 | 9/2014 | Frisk et al. | |
| 8,882,683 B2 | 11/2014 | Horii et al. | |
| 8,932,230 B2 | 1/2015 | Nason et al. | |
| 9,164,080 B2 | 10/2015 | Dutta et al. | |
| 9,304,100 B2 | 4/2016 | Roxhed et al. | |
| 9,510,774 B2 | 12/2016 | Russell | |
| 9,513,247 B2 | 12/2016 | Merz et al. | |
| 9,521,963 B2 | 12/2016 | Esposito et al. | |
| 9,532,731 B2 | 1/2017 | Kahlman et al. | |
| 9,562,873 B2 | 2/2017 | Scheffler et al. | |
| 9,562,915 B2 | 2/2017 | Burgi et al. | |
| 9,706,946 B2 | 7/2017 | Brimer et al. | |
| 2002/0002999 A1 * | 1/2002 | Fukano | F16L 47/041 |
| | | | 137/554 |
| 2002/0138213 A1 * | 9/2002 | Mault | A61B 5/083 |
| | | | 702/32 |
| 2005/0034982 A1 | 2/2005 | Goes et al. | |
| 2005/0143673 A1 | 6/2005 | Lundberg et al. | |
| 2005/0284484 A1 | 12/2005 | Curti et al. | |
| 2006/0200037 A1 | 9/2006 | Falasco | |
| 2007/0048180 A1 | 3/2007 | Gabriel et al. | |
| 2007/0144518 A1 * | 6/2007 | Acker | A61M 16/06 |
| | | | 128/205.24 |
| 2007/0185406 A1 | 8/2007 | Goldman | |
| 2007/0282214 A1 | 12/2007 | George et al. | |
| 2008/0023078 A1 | 1/2008 | Bahrton | |
| 2008/0091116 A1 * | 4/2008 | Cardell | G01N 33/497 |
| | | | 600/529 |
| 2008/0300501 A1 | 12/2008 | Willard et al. | |
| 2009/0253994 A1 * | 10/2009 | Schuessler | H02K 33/16 |
| | | | 417/415 |
| 2010/0041062 A1 | 2/2010 | Lanier, Jr. et al. | |
| 2010/0185112 A1 | 7/2010 | Van Kesteren et al. | |
| 2011/0009762 A1 | 1/2011 | Eichler et al. | |
| 2011/0077545 A1 | 3/2011 | Eichler | |
| 2011/0208081 A1 | 8/2011 | Smith et al. | |
| 2012/0022388 A1 | 1/2012 | Pittman et al. | |
| 2012/0029376 A1 * | 2/2012 | Meng | A61B 5/7475 |
| | | | 600/538 |
| 2012/0123288 A1 | 5/2012 | Van Kesteren et al. | |
| 2012/0247466 A1 | 10/2012 | Avni | |
| 2013/0030316 A1 | 1/2013 | Popov et al. | |
| 2013/0220324 A1 | 8/2013 | Jafari et al. | |
| 2013/0245980 A1 | 9/2013 | Forbes et al. | |
| 2014/0024960 A1 | 1/2014 | Smith et al. | |
| 2014/0238100 A1 | 8/2014 | Londergan et al. | |
| 2014/0257127 A1 | 9/2014 | Smith et al. | |
| 2014/0278144 A1 | 9/2014 | Risk et al. | |
| 2014/0358019 A1 | 12/2014 | Johnson | |
| 2015/0005639 A1 | 1/2015 | Blanton et al. | |
| 2015/0025407 A1 | 1/2015 | Eichler et al. | |
| 2015/0065901 A1 * | 3/2015 | Bhatnagar | A61B 5/097 |
| | | | 600/543 |
| 2015/0144504 A1 | 5/2015 | Wang et al. | |
| 2015/0148634 A1 | 5/2015 | Garudadr | |
| 2015/0164373 A1 | 6/2015 | Davis et al. | |
| 2015/0297306 A1 | 10/2015 | Lazar et al. | |
| 2016/0038057 A1 | 2/2016 | Johnson et al. | |
| 2016/0038697 A1 | 2/2016 | Johnson et al. | |
| 2016/0106341 A1 | 4/2016 | Adam et al. | |
| 2016/0256072 A1 | 9/2016 | Eichler | |
| 2016/0338616 A1 | 11/2016 | Eichler | |
| 2016/0338619 A1 | 11/2016 | Roxhed et al. | |
| 2016/0345860 A1 | 12/2016 | Wolfe et al. | |
| 2016/0361677 A1 | 12/2016 | Blackley | |
| 2017/0055878 A1 | 3/2017 | Chon et al. | |
| 2017/0065208 A1 | 3/2017 | Furusaki et al. | |
| 2017/0119279 A1 | 5/2017 | Ahmad et al. | |
| 2017/0119280 A1 * | 5/2017 | Ahmad | A61B 5/097 |

FOREIGN PATENT DOCUMENTS

| | | |
|---|---|---|
| CN | 102596029 | 7/2012 |
| CN | 102770069 | 11/2012 |
| CN | 102971036 | 3/2013 |
| CN | 203479740 U | 3/2014 |
| CN | 104023633 | 9/2014 |
| CN | 105658141 | 6/2016 |
| DE | 3812235 | 10/1989 |
| DE | 4326374 | 2/1995 |
| DE | 19813192 | 10/1998 |
| EP | 0616792 | 9/1994 |
| EP | 1391178 | 2/2004 |
| EP | 2299901 B1 | 8/2013 |
| EP | 2454568 B1 | 9/2013 |
| EP | 2496136 B1 | 4/2015 |
| EP | 2066236 B1 | 9/2015 |
| EP | 2536333 B1 | 12/2015 |
| EP | 2842488 B1 | 7/2016 |
| ES | 2579911 | 8/2016 |
| GB | 1500626 | 2/1978 |
| GB | 2055046 | 2/1981 |
| GB | 2533125 | 6/2016 |
| GB | 2 555 999 | 5/2018 |
| JP | H08-164225 | 6/1996 |
| JP | 6090828 B2 | 3/2017 |
| KR | 101905067 B1 | 10/2018 |
| WO | 00/21434 | 4/2000 |
| WO | 2008/088780 | 7/2008 |

(56) References Cited

FOREIGN PATENT DOCUMENTS

| WO | 2008/093263 | | 8/2008 |
| WO | 2008/123831 | | 10/2008 |
| WO | 2009/129235 | | 10/2009 |
| WO | 2010/013276 | | 2/2010 |
| WO | 2010/094967 | | 8/2010 |
| WO | 2012004794 | A1 | 1/2012 |
| WO | 2012/045560 | | 4/2012 |
| WO | 2012/059835 | | 5/2012 |
| WO | 2013/188458 | | 12/2013 |
| WO | 2015/025316 | | 2/2015 |
| WO | 2015/066562 | | 5/2015 |
| WO | 2016/078972 | | 5/2016 |
| WO | 2018/226639 | | 12/2018 |

OTHER PUBLICATIONS

"PulmOne offering FeNO by NIOX with its MiniBox complete pulmonary function testing system," available at: https://www.hhmglobal.com/industry-updates/press-releases/pulmone-offering-feno-by-niox-with-its-minibox-complete-pulmonary-function-testing-system; accessed on Sep. 17, 2021; 1 page.

Dongkyu Lee, "Exhaled Breath Analysis for Chronic Respiratory Disease," Korea Institute of Machinery & Materials, available at: https://www.kimm.re.kr/eng/sub020207/view/id/154; accessed on Oct. 6, 2021; 1 page.

Peter Condorelli et al., "Characterizing airway and alveolar nitric oxide exchange during tial breathing using a three-comparment model," J Appl Physiol 96, 2004, pp. 1832-1842.

J. Pan et al., "Comparison of Respiratory Resistance Measurements Made with an Airflow Perturbation Device with Those from Impulse Oscillometry," Hindawi Publishing Corporation, Journal of Medical Engineering, vol. 2013, Article ID 165782, 11 pages, http://dx.doi.org/10.1155/2013/165782.

U. Frey et al., "Pressure oscillations after flow interruption in relation to lung mechanics," Respiration Physiology 102 (1995) pp. 225-237.

CareFusion—MasterScreen™ PFT All-in-one Diffusion System, Truly Real-Time, New Analyzer Technology, 2009, 2 pages.

H.J. Smith et al. "Chapter 5, Forced oscillation technique and impulse oscillometry," Eur Respir Mon, 2005, 31, pp. 72-105.

CareFusion—Vyntus® / SentrySuite®, Technical Specifications, 2014, 8 pages.

International Preliminary Report on Patentability of PCT/GB2019/051968, Jan. 19, 2021, 11 pages.

Lausted CG et al., "Respiratory resistance measured by an airflow perturbation device", Physiological measurement, vol. 20, 1999, p. 21-35.

Vossoughi et al., "In-Home Hand-Held Device to Measure Respiratory Resistance", Proceedings of the 1st Distributed Diagnostics and Home Healthcare (D2H2) conference, Arlington, Virginia, USA, Apr. 2-4, 2006, p. 12-14.

International Search Report and Written Opinion of PCT/GB2019/051968, Mar. 30, 2020, 19 pages.

Search Report issued for Application No. GB 1811581.6, Jan. 28, 2019, 3 pages.

Search Report issued for Application No. GB 1811582.4, Jan. 28, 2019, 4 pages.

Search Report issued for Application No. GB 1811583.2, Jan. 14, 2019, 4 pages.

Office Action issued for Indian Patent Application No. 202117006058, Oct. 12, 2022, 5 pages.

Office Action issued for Chinese Patent Application No. 201980060351.2, Nov. 30, 2023, 21 pages including English translation.

Office Action issued for Chinese Patent Application No. 201980060351.2, May 22, 2024, 19 pages including English translation.

Office Action issued for Euorpean Patent Application No. 19744824.4, Jun. 3, 2024, 55 pages including English translation.

Notice of Allowance issued in Chinese Patent Application No. 201980060351.2, mailed Dec. 15, 2024, 8 pages, English machine translation.

* cited by examiner

RESPIRATORY DIAGNOSTIC TOOL AND METHOD

FIELD OF THE INVENTION

The disclosure relates to devices for performing tests whose results can be used in the diagnosis of, or monitoring of, respiratory conditions and more particularly to a device capable of performing more than one diagnostic test. The disclosure also relates to a device that is capable of performing an impulse oscillometry test.

BACKGROUND TO THE INVENTION

There are many people who suffer from conditions that affect their respiratory systems. These conditions can make it difficult to breathe and can have a negative impact day to day for those who suffer from them. They can have many different forms or sub-types. Asthma is an example of a term used to describe such a condition that has several forms or sub-types. Evidence for sub-types of asthma is indicated by different people having different triggers to their symptoms and different responses to particular treatments. Another example of a respiratory condition is Chronic Obstructive Pulmonary Disease (COPD), which is an umbrella term used to describe a condition with numerous sub-types.

Diagnosing which condition a subject is suffering from, and also which sub-type, is essential for the most effective treatment of that condition. While a cure is not always possible, the symptoms of most respiratory conditions can be alleviated, improving the quality of life for the subject.

There are many diagnostic tests that have been developed over time. The results of these tests are used to diagnose a condition. Often the results of more than one test are necessary in order to properly and accurately diagnose a condition. This is particularly true when trying to diagnose a particular sub-type of a condition. Combining and analysing the results from more than one test is a skilled job and usually requires a trained medical professional to reach a final diagnosis. Often the diagnosis is not reached after only one testing session and it is necessary to monitor the symptoms over a period of time which may be several years. As the different sub-types of a condition may require different treatment it is important that the correct sub-type is diagnosed.

Historically, each diagnostic test has required a different device. Each device can be expensive, particularly because some tests require mechanical sample conditioning to ensure accurate results. For example, a common test is the fractional exhaled nitric oxide concentration (FeNO) test in which the levels of nitric oxide in the exhaled air are measured. This can be used as an indicator of lung inflammation and eosinophil activity. Nitric oxide levels can be measured using electrochemical sensors. However, in order for the measurement to be reliable and repeatable the effects of environmental variables such as humidity, temperature and pressure need to be removed. This is technically challenging, makes the test procedure slow, and the repeatability of the measurement of nitric oxide may still be poor. Repeatability is important when monitoring subjects over a series of testing sessions. A factor affecting repeatability with current FeNO tests is that the breathing pattern required is slow and can be difficult for some people.

As the cost of individual devices can be high and expert knowledge may be required to perform or interpret the combined results from more than one device, current devices are often only available in specialist practices or lung function laboratories. Therefore, only a small portion of people suspected of having asthma or other respiratory diseases are tested with such devices. It also makes it difficult to continually monitor symptoms over a series of testing sessions. Without objective testing, subjects may be given an incorrect treatment for their condition. Incorrect allocation of treatment wastes resources, may not prevent subjects' symptoms or attacks, and may cause unnecessary side-effects from a treatment.

There is a need for a system for diagnosing respiratory conditions that is inexpensive, accurate, readily available, easy to use and provides easy to interpret results.

Furthermore, in order to diagnose and monitor conditions in a subject it may be necessary to characterise the subject's airways. Many respiratory diagnostic tests that can be used to characterise airways require specific breath manoeuvres, which need to be performed accurately in order for the results to be reliable. Some people struggle, or find it impossible, to perform such manoeuvres. A spirometry test is an example of a test that is used to characterise a subject's airways but that requires a specific manoeuvre of forced, high-flow rate breathing. It may be very difficult to communicate to a young child how to perform the test. They may lack the skill or effort required to be able to reliably perform the test. Adults may also find it difficult to perform the specific breath manoeuvre, particularly those suffering from severe respiratory problems. There is a clear benefit to having a respiratory diagnostic test capable of characterising the airways of a subject that requires minimal skill and effort to perform.

One such respiratory diagnostic test that has been developed is impulse oscillometry. In impulse oscillometry tests, an acoustic impulse is generated that propagates into the airways of the subject. Parameters such as air pressure and flow rate can be measured following the creation of the impulse to provide an indication of the mechanics of the subject's breathing. This can be used to characterise the airway. The subject need only breathe with a relatively constant speed of inhale or exhale. It may even be possible for the subject to simply perform normal, tidal, breathing through the device. This is easier for the subject.

Current impulse oscillometry test devices use loudspeakers to generate the acoustic impulse in the airways of the subject. This has several disadvantages. Generally, the loudspeaker is positioned in a branch channel from the main flow channel which extends between a mouthpiece and the air inlet. The branch channel has a closed end i.e. it is a blind channel. Ideally the acoustic impulse is directed toward the mouthpiece. However, much of the energy from the speaker is lost out of the air inlet. Therefore, a large speaker with high power requirements is required to achieve a large enough acoustic impulse at the mouthpiece. This results in devices that are bulky and that are not portable.

Because the impulse oscillometry devices are large and bulky they are often only found in hospitals and specialist lung laboratories. This means that access to such devices is limited for the general population and only a small proportion of people suspected of having asthma or other respiratory diseases are tested with such devices. It also makes it difficult to continually monitor symptoms over a series of testing sessions. Without objective testing, subjects may be given an incorrect treatment for their condition. Incorrect allocation of treatment wastes resources, may not prevent subjects' symptoms or attacks, and may cause unnecessary side effects.

There is a need for a device for performing oscillometry diagnostic tests that can be used to characterise the airways of a subject that are compact and have the potential to be portable.

SUMMARY OF THE INVENTION

The invention provides a device and kit for performing a plurality of respiratory diagnostic tests and a method for performing a plurality of respiratory diagnostic tests using the device according to the appended independent claims, to which reference should now be made. Preferred or advantageous features of the invention are defined in the dependent claims.

In a first aspect of the invention there is a provided a device for performing a plurality of respiratory diagnostic tests comprising: a housing, a sensor assembly, and control circuitry configured to receive signals from the sensor assembly. The device has a first configuration in which the device is configured to perform a first respiratory diagnostic test and a second configuration in which the device is configured to perform a second respiratory diagnostic test.

In the first configuration an airflow channel is defined through the device housing, the sensor assembly being configured to measure at least a first property of air in the airflow channel during the first respiratory diagnostic test.

In the second configuration the airflow channel is modified relative to the first configuration, the sensor assembly being used to measure at least a second property of air in the airflow channel during the second respiratory diagnostic test.

The device being configurable to perform more than one respiratory diagnostic test advantageously means that a single device can provide results allowing for a fuller diagnosis or fuller monitoring of a respiratory condition. Diagnostic devices are typically able to perform only one type of test. However, there is no single test that can identify some respiratory diseases, including asthma and COPD. Different people with a respiratory disease have different triggers, symptoms, treatment responses, and biological pathways involved in their condition. A number of useful diagnostic tests have been discovered or are in development. However, it is impractical and expensive for a medical practice or subject to purchase, maintain, and use a number of different devices. The first and second configurations of the device correspond to first and second modes of operation of the device. By providing a device that is configurable to perform more than one respiratory diagnostic test, only a single device is needed to provide results that allow for a full diagnosis or full monitoring of a respiratory condition. Being able to use just one device simplifies the diagnostic or monitoring process and reduces the amount of hardware required, and so the cost. Said hardware may include batteries, control circuitry and displays, as well as other hardware such as a device housing.

The first respiratory test may be different to the second respiratory test. In particular the first respiratory test may be a different type to the second respiratory test. One of the first and second respiratory diagnostic tests may be a pulmonary obstruction or flow test. One of the first and second respiratory diagnostic tests may be a biomarker test. For example, one of the first and second respiratory diagnostic tests may be a flow rate test or pulmonary obstruction test, such as a spirometry test or an oscillometry test. The other of the first and second respiratory diagnostic tests may be a test for a biomarker indicative of inflammation or disease, such as nitric oxide.

The airflow channel advantageously has a distal end and a proximal end. The airflow channel may have an opening at the distal end. When the direction of flow of air in the airflow channel is toward the proximal end, then this opening may be an air inlet. When the direction of flow of air in the airflow channel is away from the proximal end then this opening may be an air outlet. However, herein, the opening at the distal end of the airflow channel will generally be referred to as an inlet. A mouthpiece may be provided at the proximal end so that a subject using the device can breathe through the airflow channel.

The sensor assembly is then configured to measure the properties of an inhaled or exhaled breath from the subject in the airflow channel. The airflow channel can advantageously be adapted for the different tests so that the airflow passes over different sensors and/or through different components of the device and/or so that properties of the airflow are changed. This may include increasing or reducing the airflow resistance experienced by air in the airflow channel, changing the cross-section of the airflow channel, changing the temperature in the airflow channel or providing additional inlets or outlets in the airflow channel. The airflow channel may comprise multiple sub-channels. The multiple sub-channels may join each other at a proximal end. Different sensors may be provided in different sub-channels. Some sub-channels may act simply as a bypass. Preferably, at least a portion of the airflow channel is the same in the first configuration and in the second configuration.

The device may comprise a primary component defining at least a portion of the airflow channel and a first secondary component, wherein the first secondary component has a first position relative to the primary component in the first configuration and a second position relative to the primary component in the second configuration. The device may comprise a plurality of secondary components, with each of the secondary components being designed for a specific respiratory test.

The first secondary component may comprise a sensor. This sensor advantageously measures a parameter of air in the air flow channel. This is in addition to any parameters measured by the sensor assembly, and may advantageously be specific to a particular respiratory diagnostic test. The sensor assembly may be positioned, at least partially, in the primary component.

In the first configuration, the primary component and the first secondary component may be engaged to one another to define the airflow channel. In the second configuration, the primary component and the first secondary component may be disengaged from one another or engaged to one another in a different manner. The airflow channel defined by engagement of the primary component and the first secondary component advantageously is optimized for performing a first respiratory test. In the second configuration, the primary component may be engaged with a second secondary component. At least a portion of the airflow channel may be defined through the secondary component.

The primary and secondary components may be separate or stand-alone components when they are not engaged. They may be engaged with each other by the subject. One component may have a male part and another component may have a corresponding female part into which the male part can be inserted to facilitate engagement. Pushing the male part into the female part connects the two components and holds the two components together. It may be advantageous to have a standard connection system between the primary component and all of the secondary components. A standard connection system advantageously means that additional secondary components can be added to the system after purchase or first release. This advantageously means that the subject can purchase or obtain new secondary components and use them with their existing system. These new secondary components may configure the device to have additional capabilities. These additional capabilities may include performing additional respiratory diagnostic tests.

Alternatively, the primary and secondary components may advantageously form a single device such that the primary and secondary components are not physically separable from one another. The primary and secondary components may comprise selection means configured to define an airflow channel through a selection of portions of the primary and secondary components. The airflow channel through the device must be appropriate for the test the device is to perform. The selection means may comprise one or more valves which may be used to select the secondary components that are included in the airflow channel. Changing the route of the airflow channel through the device changes the configuration of the device. A valve arrangement for changing the device configuration may be advantageous in there is no need to physically connect or remove components in order to configure the device. The valve(s) can be controlled by the control circuitry which automates configuring the device. This means the device can be shipped as one unit capable of being configured to perform any of a range of respiratory diagnostic tests. The use of a valve or valves may advantageously reduce contamination from the atmosphere before the tests is performed. A valve may also be configured to partially open for at least one of the secondary components. The airflow channel may be configured by intermittently opening and closing one or more valves.

It may be advantageous for the device to comprise both the described configuration options. As well as a valve connection, there may a number of stand-alone components that can be physically connected or disconnected.

The primary component may have a power or data connection with the secondary component in at least one of the first and second configurations. This advantageously allows measurements taken using a sensor positioned in either the primary component or the secondary component to be transferred to the other component, and for communication with the control circuitry. It also allows any element that may require power in any of the components to be powered from any of the other components.

The control circuitry may comprise a microcontroller. The microcontroller may be configured to process data received from the sensors. The result of the processing of data may be a test score which can be used to help monitor or diagnose a respiratory disease. The control circuitry may instead be in communication with a portable computer comprising a microcontroller such as a laptop or smartphone. In these cases, the microcontroller of the portable device performs the data processing. The communication between the control circuitry and the portable device may be wireless a connection. The wireless connection may be a Bluetooth connection.

The sensor assembly may comprise a flow sensor. The flow sensor may be positioned in the primary component. The device may be configured to perform a spirometry test in a first configuration and measure the concentration of a biomarker indicating lung inflammation in a second configuration. The flow sensor may be used to perform the spirometry test. The device may be configured to measure peak expiratory flow or forced expiratory flow using the flow sensor. Spirometry tests measure lung function, specifically the amount and/or the speed of air that can be inhaled or exhaled. These tests can advantageously be used to diagnose conditions such as asthma. Advantageously, the flow sensor can be used to perform the spirometry tests.

Spirometry tests may be conducted using an airflow of up to about 850 litres per minute with measurements having an accuracy of ±5 litres per minute. When the device is configured to perform a different respiratory diagnostic test, the required flow rate may be much lower. The required airflow for some tests may be not more than 5 litres per minute, with accuracy of measurements being ±<0.5 litres per minute. The required airflow for some tests may be not more than 3 litres per minute ±<0.3 litres per minute. The accuracy of the measurements may be ±/−<0.15 litres per minute. It would be advantageous to be able to use the same flow sensor in both configurations. In that case, the flow sensor needs to have the appropriate range for measuring airflow and appropriate accuracy across each range.

Producing a flow sensor with the appropriate range and sensitivity is technically challenging. A flow sensor that has a range of 850 litres per minute will generally not have a suitable sensitivity at lower flow rates of around 5 litres per minute. It may be advantageous to use a flow sensor with a lower range but with higher sensitivity at low flow rates. It may be advantageous to modify or adjust the effective range of the flow sensors, by modifying or adjusting the input to the flow sensor i.e. the flow rate, or by modifying or adjusting the output of the flow sensor; or by combining the output of the flow sensor with the output from one or more other sensors.

One way of addressing this problem is by allowing only a proportion of the inhaled or exhaled air to flow past the air flow sensor.

The airflow channel may comprise at least one sub-channel such that in at least one of the first and second configurations portion of an airflow through the device bypasses the sensor assembly. For example, the airflow channel may be separated into a plurality of sub-channels through one of the secondary components so that at least one of the sub-channels bypasses the sensor assembly. At least one of the sub-channels can take the form of inlets in the housing of the device between the flow sensor and the mouthpiece, the inlets providing fluid communication between the outside air and the rest of the airflow channel. Advantageously, this means that the flow sensor is only required to have a range capable of measuring the proportion of air passing it. The flow rate of the total air flow can be inferred from the measurement of a proportion of the airflow. At least 60% and more preferably, at least 70%, of the airflow through the airflow channel may bypass the sensor assembly, by volume. This advantageously means that less than 40% and more preferably, less than 30%, of air flowing through the air flow channel passes the flow sensor and the required range of the flow sensor is reduced to a corresponding fraction of the total flow rate that is supplied by a subject. The maximum flow through the sub-channel passing the flow sensor advantageously matches the range of the flow sensor.

Another way of addressing the problem is via electronic adjustment of the readings from the flow sensor using a measurement from another sensor. For example, the sensor assembly may comprise a pressure sensor. The control circuitry may be configured to use signals received from both the flow sensor and the pressure sensor to estimate flow rate. The flow sensor may have a range of ±200 litres per minute. The estimated flow rate using the flow sensor and pressure sensor has a range of ±1000 litres per minute. This is high enough to measure flow when the device is the in a spirometry configuration, where flow rate estimates of lower flow rates are primarily determined by the flow sensor, which has a higher sensitivity at lower flow rates, and measurements of higher flow rates are primarily determined by the pressure sensor, which has a larger range than the flow sensor.

The secondary component may comprise a biomarker sensing component wherein the biomarker indicates lung inflammation or disease. In one of the configurations the airflow channel may have a resistance of at least 5 cm $H_2O$. This advantageously ensures that the nasal velum stays closed while the subject is exhaling through the device. Nasal air may have a high concentration of the biomarker. If the nasal velum does not stay closed when the subject exhales, then the exhaled breath is contaminated with the nasal air and would give an artificially high measurement of the biomarker for lung inflammation.

The device may comprise an electrochemical sensor configured to detect the presence of the biomarker indicating lung inflammation. The electrochemical sensor may be part of the secondary component. The control circuitry may be configured to receive signals comprising output values from the electrochemical sensor.

The sensor assembly may comprise a combination of two or more of: a pressure sensor, a flow sensor, a temperature sensor and a humidity sensor. The electrochemical sensor, pressure sensor, flow sensor, temperature sensor and humidity sensor may be positioned adjacent one another within the airflow channel. They are advantageously in substantially the same position in the airflow because that reduces pressure differences and temperature differences between sensors.

The control circuitry may be configured to adjust an output value received from the electrochemical sensor using a signal from at least one of the pressure sensor, flow sensor, temperature sensor and humidity sensor. This adjustment is advantageous because electrochemical sensors are typically very sensitive to environmental conditions, changes to environmental conditions, and especially to changes to moisture in the air. It is typically exhaled breath that is measured by the device. Exhaled air has a high moisture content and temperature relative to atmospheric air, and the exhaled air flow may have variable pressure or flow rate. This lack of controlled and constant sample conditions means that readings from the electrochemical sensor alone may not be sufficiently accurate. Environmental conditions must be factored in. The signals received from the pressure sensor, flow sensor, temperature sensor and/or humidity sensor can be used by the control circuitry to provide an adjustment factor and/or offset to the measurement from the electrochemical sensor to account for the environmental conditions or rates of change of environmental variables.

The secondary component may comprise a scavenger filter configured to reduce the amount of a biomarker in the air. The biomarker may indicate lung inflammation. Inhaled breath may pass through the scavenger filter. This means that the amount of a biomarker measured in the exhaled breath can be assumed to be produced by the subject and not simply present in the environment, inhaled, and then exhaled.

The secondary component may comprise a valve configured to change the airflow path through the airflow channel depending on the direction of the flow of air through the airflow channel. For example, the valve may ensure that in only one direction does the airflow channel pass the scavenger filter.

The secondary component may comprise a gas drier. The gas drier may be configured to reduce the humidity of air passing through the gas drier. As explained above, electrochemical sensors are very sensitive to changes in moisture content. It may be advantageous to reduce the humidity of the air that is being sampled by the device, in addition to or instead of adjusting the measurement as in the method described above. This may improve the accuracy of readings from the electrochemical sensors.

Reducing the humidity of air passing through the device can prevent condensation on the sensors, which is advantageous, especially for the nitric oxide sensor. The gas drier may be an absorbent material, water trap, Nafion tubing, or may warm the sensor surface. An absorbent material advantageously does not require electrical power and does not substantially increase the internal volume of the flow channel. The gas drier may be positioned in the mouthpiece.

The biomarker indicating lung inflammation may be nitric oxide concentration. The exhaled nitric oxide concentration indicates activity of eosinophils, which are involved with inflammation for about two thirds of asthmatics and one third of people with COPD. Therefore, nitric oxide concentration can be used to determine the sub-type of disease a person may have. A high nitric oxide concentration can indicate that a subject is likely to respond to particular pharmaceutical treatments. If the treatment is successful, a subject's exhaled nitric oxide concentration should decrease, so the test can be used to find an effective drug dose and to confirm the subject is administering their treatment correctly.

One of the first and second respiratory diagnostic tests may be an impulse oscillometry test. Oscillometry tests are diagnostic tests, the results of which indicate mechanical properties of the airways of the subject performing the test. These properties can be used to aid the diagnosis of respiratory diseases such as COPD. Oscillometry tests are advantageous as they do not require the subject to perform a specific breath manoeuvre, such as forced breathing. The subject need only breathe with a relatively constant speed of inhale or exhale. It may even be possible for the subject to simply perform normal, tidal, breathing through the device. This is advantageous as it means the test is easy and comfortable to perform. This is particularly important for children and for subjects who are suffering from a respiratory disease that would make breathing in another manner, such as high-flow forced breathing, difficult and uncomfortable.

While performing an oscillometry test using the device, a subject may breathe into and/or out through the device, such that air passes through the air channel of the device and into/out of the subject's lungs. The device may comprise a mouthpiece. The airflow channel may be defined through the device from a mouthpiece to an air inlet. The air inlet may be open to the atmosphere. When the device is configured for performing an oscillometry test it may comprise an acoustic impulse generator. The acoustic impulse generator may be configured to create an acoustic impulse in the airflow channel by pushing air in the airflow channel in the direction of the mouthpiece to create an acoustic impulse in the air in the airflow channel. The push of air may create pressure fluctuations. The acoustic impulse generator may be controlled by the control circuitry.

As used herein, an acoustic impulse is a pressure wave comprising a plurality of sinusoidal frequencies. The pressure wave may take the form of, or approximate, a square wave.

The acoustic impulse travels at the speed of sound. The acoustic impulse may pass through the airflow channel and the mouthpiece and into the subject's airways before returning back into the airflow channel of the device. Following the creation of the acoustic impulse, parameters of the air in the airflow channel may be sensed by the sensor assembly. One measured parameter may be air pressure. Another measured parameter may be air flow rate. The acoustic impulse may interact with the airways of the subject. This interaction results in changes in the pressure and flow rate of the air passing the sensors. Therefore, these parameters may be used to determine the response of the subject's airways to the acoustic impulse. This response may be used to characterise the subject's airway.

When one of the first and second respiratory diagnostic tests is an impulse oscillometry test, the device may comprise an occluder and a means to move the occluder between a first position and a second position. In the second position, the occluder may occlude the airflow channel to a greater extent than in the first position. The control circuitry may be configured either to control the means to move the occluder or to receive signals from the sensor assembly, or both to control the means to move the occluder and to receive signals from the sensor assembly.

It is advantageous that the occluder occludes the airflow channel to a greater extent in the second position than in the first position, as this reduces loss of energy from the acoustic impulse in a direction away from the mouthpiece. Energy can escape through any gaps between the occluder and the airflow channel so any reduction in these gaps (achieved by the increased occlusion) ensures less energy escapes. Therefore, if the occluder is in the second position during the creation of the of acoustic impulse, energy loss from the created acoustic impulse in the direction away from the mouthpiece is advantageously reduced. This configuration advantageously allows for a compact and efficient way of generating an acoustic impulse that passes through the air in the airflow channel of the device.

The acoustic impulse generator may be a loudspeaker. The loudspeaker may comprise a cone or diaphragm which pushes air in the airflow channel creating an acoustic impulse.

The loudspeaker may be configured to push the air in the airflow channel in a direction parallel to the airflow channel and toward the mouthpiece. The loudspeaker may be connected to a signal generator. The signal generator may provide an electrical signal which the loudspeaker converts into an acoustic wave. The signal generator may form part of the control circuitry.

The acoustic impulse generator may be configured to release compressed gas in the airflow channel which pushes air in the airflow channel in the direction of the mouthpiece. The compressed gas may be stored in a gas canister. The gas canister may comprise a release valve. The release valve may be configured such that when it is opened, compressed gas is released from the gas canister into the airflow channel. The compressed gas may be released in a direction that is parallel to the airflow channel and in the direction of mouthpiece. The release valve may be connected to the control circuitry and controllable such that the release of the compressed gas is coordinated with the movement of the occluder from the first position to the second position.

The control circuitry may be configured to control the means to move the occluder such that the movement of the occluder from the first position to the second position is coordinated with the creation of the acoustic impulse by the acoustic impulse generator.

The control circuitry may be configured to coordinate the movement of the occluder from the first position to the second position such that it is simultaneous with the creation of the acoustic impulse. The occluder may be configured to move from the first position to the second position such that the occluder is in the second position with an offset of 5 ms or less to the creation of the acoustic impulse. The offset may be such that the occluder reaches the second position after the creation of the acoustic impulse, but preferably the occluder is in the second position before the creation of the acoustic impulse. The offset may advantageously allow fine control of the movement of the occluder relative to the creation of the acoustic impulse. The offset may be a predetermined value for a specific configuration of the device that ensures a maximum, or particularly desired amount of energy of the acoustic impulse being directed to the mouthpiece rather than away from the mouthpiece.

Advantageously, the acoustic impulse generator and the occluder may be the same component. In other words, the device may not comprise a separate acoustic impulse generator. When the occluder is the acoustic impulse generator, the acoustic impulse may be created by movement of the occlude towards the proximal end of the airflow channel.

The occluder pushes the air in the airflow channel as it is moved from the first position to the second position. The occluder may be configured such that movement of the occluder from the first position to the second position pushes air in the airflow channel from the occluder in the direction of the mouthpiece to create an acoustic impulse in the air in the airflow channel.

When the occluder is the acoustic impulse generator, movement of the occluder from the first position to the second position both increases the occlusion of the airflow channel and ensures that the amount of energy that can escape past the occluder is reduced. In an ideal case, the impulse would be created by instantaneous movement of the occluder from the first position to the second position. In reality, instantaneous movement is not possible, resulting in an asymmetrical, bell shaped impulse. The control circuitry may advantageously control the means to move the occluder such that the occluder moves between the first position and the second position at a speed and through a distance such that an acoustic impulse with desired properties is created. Alternatively, the means to move the occluder may be driven by the subject's breathing.

When the occluder is the acoustic impulse generator, a portion of the airflow channel may comprise a first tapered portion. In the first position, the occluder may be located in or near a wider part of this first tapered portion than in the second position. In this configuration, energy of the acoustic impulse created by moving the occluder from the first position to the second position, may be more efficiently directed toward the mouthpiece by the first tapered portion. The airflow channel may comprise a second tapered portion adjacent to the first tapered portion wherein the second tapered portion may be configured to surround the occluder, when the occluder is in the first position. The second tapered portion may provide sufficient clearance around the occluder that the resistance to flow through the airflow channel is very low when the occluder is in the first position, without requiring a long distance of travel between the first position and the second position.

The control circuitry may be configured to control the acoustic impulse generator such that the acoustic impulse provides a maximum pressure increase of at least 50 Pa at the sensor assembly and a flow rate increase of at least 0.15 litres $min^{-1}$ through the airflow channel in the direction of the mouthpiece. The increase of pressure is the amount the pressure is increased above the pressure of air in the airflow channel when the subject is breathing normally.

The control circuitry may be configured to control the acoustic impulse generator such that the acoustic impulse that is created comprises a plurality of frequencies of pressure fluctuations in a range from 5 Hz to 20 Hz. The acoustic impulse may be in the form of, or approximate, a square wave, created by the movement of the occluder from the first position to the second position.

The different frequencies of acoustic impulse may be attenuated differently by the subject's airways. The attenuation may increase as the frequency increases. As a result, the measurements of pressure and flow of the higher frequencies are dominated by the response of the upper airways. The measurements of pressure and flow of the lower frequencies may include a response from the lung periphery. It is therefore advantageous to probe the airways of the subject with a plurality of frequencies of pressure fluctuations rather than a single frequency, giving a fuller picture of the mechanical properties of the subject's airways. It allows for the recognition of characteristic respiratory responses at different frequencies.

When the acoustic impulse is created by movement of the occluder, the highest frequency contained in the impulse may depend on the duration of the impulse. For example, an upper frequency of 20 Hz contained in the impulse may be attained by the occluder moving from the first position to the second position in 50 ms or less. The impulse will contain lower frequencies, such as 5 Hz. The highest frequency with a detectable amplitude may be 20 Hz. The control circuitry may be configured to move the occluder from the first position to the second position within 50 ms or less. The control circuitry may be configured to move the occluder from the first position to the second position such that air is pushed in the airflow channel for less than 50 ms. This pushes the air in the airflow channel with enough force to create an acoustic impulse with pressure fluctuations that have an amplitude that is large enough to be detected. The 50 ms duration from the first position to the second position is advantageously short enough that the created acoustic impulse is sufficiently close to a square wave for the results of the test to be accurate and not complicate calculations such as Fourier Transforms. The control circuitry may be configured to move the occluder in a cycle from the first position, to the second position, and return to the first position more than once per breath. For example, the cycle of the occluder may have a frequency or pulse rate of 3 Hz.

Once the acoustic impulse has been created, either by a separate acoustic impulse generator or by movement of the occluder from a first position to a second position, it travels through the airflow channel in the direction of the mouthpiece. This is advantageously in the direction of the airways of a subject using the device. In other words, advantageously, the airflow channel does not include any bends or branches between the occluder and the mouthpiece. This means that a maximal amount of energy will reach the subject's airways. The acoustic impulse passes through the airflow channel out of the mouthpiece into the airways of the subject. The acoustic impulse interacts with the airways of the subject, resulting in changes in the pressure and flow rate of the air passing the sensor.

The sensor assembly may be configured to measure a flow rate of air in the airflow channel or a pressure of air in the airflow channel or both a flow rate of air in the airflow channel and a pressure of air in the airflow channel. The control circuitry may be configured to calculate a parameter that characterises a respiratory system based on a frequency domain analysis of the flow rate of air in the airflow channel or the pressure of air in the airflow channel or both the flow rate of air in the airflow channel and the pressure of air in the airflow channel. The flow rate and pressure are measured by the sensor assembly as required.

The control circuitry may receive measurements of flow and pressure from the sensor assembly, and based on these measurement may form a number of metrics that describe the mechanical properties of the airways. These metrics may be parameters that characterise the respiratory system of the subject. Because the impulse comprises multiple frequencies, the metrics can indicate the characteristics of the upper and lower airways as well as the airway system as a whole. The metrics may give an indication of airway resistance and airway reactance and other mechanical properties of the airways. The mechanical properties of the airways may indicate that a subject has a respiratory disease and so these metrics can aid a trained medical person in the diagnosis of respiratory diseases.

The control circuitry may be configured to perform a Fast Fourier Transform on both the signals relating to measured flow and measured pressure from the sensor assembly and so produce a frequency domain distribution showing an amplitude for each frequency.

As described, in the second position the occluder may occlude the airflow channel to a greater extent than in the first position. This change in occlusion results in a change in resistance to air flowing the airflow channel. When the occluder is in the second position air flowing in the airflow channel experiences a higher resistance to flow than when the occluder is in the first position. The resistance to flow when the occluder is in the first position is lower than 0.15 kPa s $L^{-1}$. While the occluder is in the second position the higher resistance may cause the pressure in the airflow channel to change compared to when the occluder is in the first position. The pressure change (depending on whether the subject is inhaling or exhaling) in the airflow channel may affect the characteristics of the acoustic impulse. Preferably, the increase in resistance may result in a greater proportion of the energy of the acoustic impulse traveling toward the mouthpiece, rather than out through the air inlet.

Both the length of time that the occluder is in the second position for, and the configuration of the occluder, may affect the characteristics of the acoustic impulse. The configuration of the occluder refers particularly to the amount to which the occluder increases the resistance to flow when the occluder is in the second position compared to when it is in the first position. The length of time that the occluder is in the second position for and the configuration of the occluder can therefore be chosen to result in an acoustic impulse that has desired characteristics.

In some embodiments the occluder may be configured such that when it is in the second position air can flow through the airflow channel. This means that even though the air in the airflow channel experiences more resistance when the occluder is in the second position, the airflow channel is not totally occluded. The minimum distance between the housing and the occluder, when the occluder is in the second position, may be at least 0.5 mm. At this distance the resistance to flow is sufficiently low that the effect of the change in flow resistance on the characteristics of the acoustic impulse is negligible. A gap of not much more than 0.5 mm may be chosen as this results in a suitably low resistance to flow while also ensuring that acoustic impulse is efficiently directed in the airflow channel toward the mouthpiece.

The test may be more comfortable for the subject and more likely to give accurate results if the pressure change experienced by the subject when the occluder is in the second position does not result in a significant build-up of pressure in the subject's airways. This can be achieved by ensuring that the occluder is in the second position for only a short time and by ensuring that the occluder does not fully close the airflow channel.

The control circuitry may be configured to move the occluder to the first position after the occluder has been in the second position for no more than 20 ms. This is a time that is advantageously short enough that the pressure change due to the increase in resistance while the occluder is in the second position is not noticeable for the subject. The mathematical model is advantageously simpler when the calculations do not have to take into account a significant pressure change resulting from prolonged occlusion of the airflow channel.

In some embodiments it may be advantageous to have high resistance to flow of air in the airflow channel when the occluder is in the second position. In such embodiments the minimum distance between the housing and the occluder, when the occluder is in the second position, may be less than 0.5 mm. In other embodiments the occluder is in the second position for long enough that the pressure build-up in the airflow channel has a significant effect on the test. The length of time the occluder is in the second position for may be longer than 20 ms.

A build-up of pressure in the airflow channel may increase the amplitude of the acoustic impulse. This may be because the pressure change in the airflow channel contributes additional energy to the acoustic impulse. The occluder remaining in the second position may more efficiently direct the energy of the acoustic impulse toward the mouthpiece. This may allow a smaller occluder to be used having a lower power requirement. However, the characteristics of the acoustic impulse may also be affected such that is less close to a square wave.

The occluder may be configured so that when it is in the second position air cannot flow past it. This is the extreme case of having high resistance to flow when the occluder is in the second position and ensures that a maximum amount of energy of the acoustic impulse is directed in the airflow channel toward the mouthpiece. The occluder may comprise a resilient sealing component configured to contact the housing when the occluder is in the second position. The sealing component may be made of a material that deforms when it comes into contact with the housing. The sealing component advantageously ensures that an air-tight seal is achieved in the airflow channel, preventing the flow of air in the past the occluder. It also prevents damage to the housing of the device when the occluder is moved with force from the first position to the second position.

The device may be configured to create at least 3 acoustic impulses each second during a test period. The control circuitry may also be configured such that the means to move the occluder moves said occluder from a first position to a second position and back to a first position at least 3 times each second during a test period. Creating multiple acoustic impulses throughout a test advantageously allows a full picture of the airways. For example, measurements may be taken when the subject's lungs have different inflation volumes. Alternatively to the control circuitry being configured to move the occluder back to the first position, a return spring may be used.

The occluder, in the second position, may be configured to occlude the air inlet of the airflow channel.

The face of the occluder in contact with the airflow channel may be substantially concave in shape. This is efficient for creating the acoustic impulse when movement of the occluder creates the acoustic impulse. The substantially concave shape ensures that as much air as possible is pushed toward the mouthpiece as the occluder is moved from the first position to the second position.

The means to move the occluder may be configured to move the occluder in a direction parallel to the airflow through the airflow channel when a subject is inhaling or exhaling through the mouthpiece. This results in the push of air by the occluder, when caused by the occluder moving from the first position to the second position also being parallel to the airflow channel. The pushed air then moves in the direction of the mouthpiece. When the acoustic impulse is created by a separate acoustic impulse generator, the push of air by the acoustic impulse generator may be parallel to the airflow, in the direction of the mouthpiece.

The means to move the occluder may be a linear actuator. The linear actuator may advantageously be positioned such that its axis of movement is parallel to the airflow channel. The linear actuator will then move the occluder from the first position to the second position in a direction parallel to the airflow channel. Other means to move the occluder are possible. For example, the occluder may be on a hinged actuator.

The device, as configured for performing an oscillometry test, may be a stand-alone device that it is not reconfigurable to perform any other respiratory diagnostic tests.

The one or more secondary components may include an integral mouthpiece. Alternatively, a mouthpiece may be provided as a separate component. The mouthpiece may advantageously comprise a microbe filter. The mouthpiece advantageously has a low resistance to flow, low wasted volumes, and relatively smooth internal surfaces. Avoiding sharp internal features reduces disturbance to the impulse/wave travelling into/out of the airways. These features may otherwise damp the signal properties of the wave. A different mouthpiece may be used for each test. The mouthpiece may be configured to engage the primary component or the secondary component, or both the primary component and the secondary component.

A mouthpiece may be configured for a specific respiratory test. The mouthpiece may advantageously increase the resistance to air flowing in the air flow channel. The mouthpiece may also advantageously comprise a gas drier.

The device for performing a plurality of respiratory diagnostic tests may be portable. This advantageously means that the device can be brought to a subject rather than the subject having to visit, for example, a hospital. This advantageously makes monitoring of a condition easier as a subject would not have to return to, for example, a hospital each time the test is performed. It also allows for environmental triggers to be assessed in the real world.

The device may comprise at least one battery configured to provide power to the control circuitry and the means to move the occluder. The device comprising a battery advantageously allows the device to be portable and not required to be near a power source such as mains power when in use.

In a second aspect of the invention there is provided a kit for performing a plurality of respiratory diagnostic tests, comprising: a primary component, a secondary component, a control circuitry, and a sensor assembly positioned in the primary component or secondary component or in both the primary and secondary components. The secondary component is configured to engage the primary component in a first configuration of the kit such that a first airflow channel is formed through the primary and secondary components so that a first respiratory diagnostic test can be performed. In a second configuration of the kit a second airflow channel is formed through the kit passing through at least the primary component so that a second respiratory diagnostic test can be performed. The kit can advantageously be changed from a first configuration to a second configuration without using any tools.

One of the first and second respiratory diagnostic tests may be a pulmonary obstruction. One of the first and second respiratory diagnostic tests may be a flow test and the other of the first and second respiratory diagnostic tests may be a biomarker test.

The primary component may comprise the sensor assembly and the control circuitry. The sensor assembly may comprise a flow sensor. The sensor assembly may comprise a pressure sensor. The sensor assembly may further comprise a temperature sensor and a humidity sensor.

The secondary component may comprise at least one additional air inlet configured so that a proportion of air flowing through the secondary component enters the secondary component through the at least one additional air inlet. Advantageously, air passing through the additional air inlet does not pass the sensor assembly.

The secondary component may comprise a gas drier configured to reduce the humidity of air passing through the drier. The secondary component may comprise a scavenger filter. The scavenger filter may be a nitric oxide scavenger filter. The secondary components may comprise a valve configured so that only air flowing along the airflow channel in one direction can passes the scavenger filter.

The secondary component may comprise an occluder and a means to move the occluder from a first position to a second position. The secondary component may comprise an acoustic impulse generator configured to push air in the airflow channel in the direction of the mouthpiece to create an acoustic impulse in the airflow channel. The acoustic impulse generator may be a loudspeaker or gas canister. Alternatively, it may be the occluder that is configured to create an acoustic impulse in the air in the airflow channel. The acoustic impulse may be created by a push of the of the air in the airflow channel by the occluder as it is moved from the first position to the second position. In these cases, the secondary component may not comprise a separate acoustic impulse generator.

The kit may further comprise a mouthpiece. The mouthpiece may comprise a microbe filter. The mouthpiece may be configured to engage the primary component or the secondary component, or both the primary component and the secondary component.

In a third aspect of the invention there is provided a method for performing a plurality of respiratory diagnostic tests using a device according to the first aspect of the invention, comprising the steps of:
putting the device in a first configuration for performing a first respiratory diagnostic test such that the device defines a first airflow channel through the device, and performing the first respiratory diagnostic test;
putting the device in a second configuration for performing a second respiratory diagnostic test different to the first such that the device defines a second airflow channel through the device different to the first airflow channel and performing the second respiratory diagnostic test.

Advantageously this method allows a single device to perform multiple respiratory diagnostic tests simply by reconfiguring the device such that the different airflow channels are formed through the device. Each of the airflow channels may be advantageously defined in a way that is optimized for specific test.

The method may further comprise the step of outputting a test result from the control circuitry after performing either of the first or second respiratory diagnostic tests. The test result may be a combination of measurements or results from the first and second respiratory diagnostic tests.

The step of putting the device in a configuration may comprise removing a component from the device. The step of putting the device in a configuration may comprise altering a position of a component of the device, or a position of an element within a component of the device, to change the airflow channel. The step of putting the device in a configuration may comprise connecting an additional component. The step of putting the device in a configuration may comprise changing environmental conditions of air flowing through the device, such as changing the temperature of air flowing through the device.

In a fourth aspect of the invention there is provided a device for performing a plurality of respiratory diagnostic tests, comprising a plurality of sensors each sensor measuring a property of air flowing through the device and control circuitry.

In a first configuration, the device is configured to perform a first respiratory diagnostic test, and in a second configuration, the device is configured to perform a second respiratory diagnostic test.

In the first configuration the control circuitry is configured to output a result for the first respiratory test based on measurements received at the control circuitry from a first subset of the plurality of sensors, and in the second configuration the control circuitry is configured to output a result for the second respiratory test based on measurements received at the control circuitry from a second subset of the plurality of sensors.

At least one of the plurality of sensors is present in both the first subset and second subset of plurality of sensors.

It is advantageous to have at least one sensor present in both the first subset and second subset of the plurality of sensors. If sensors are only used in one configuration it means that a large number of sensors are required. Having at least one sensor used in both configurations i.e. in both the first subset and second subset, reduces the overall number of sensors that are required in the device. This means the device can be smaller and cheaper.

One of the first and second respiratory diagnostic tests may be a flow rate test or pulmonary obstruction test, such as a spirometry test or an oscillometry test. The other of the first and second respiratory diagnostic tests may be a test for a biomarker indicative of inflammation or disease, such nitric oxide.

The first subset of sensors may comprise a primary sensor configured to measure a first parameter of air in the airflow channel. This parameter may be received by the control circuitry. It can be used to find a metric which can be used to monitor or diagnose the behaviour of the respiratory system of a subject. The metric may be equal to the parameter or calculated from the parameter.

The result of the first respiratory diagnostic test output by the control circuitry may be an adjusted measurement of a first parameter of air in the airflow channel based on a measurement from a first sensor in the first subset of sensors. The adjustment may be based on signals from one or more of the other sensors in the first subset of sensors.

The result of the second respiratory diagnostic test output by the control circuitry may be an adjusted measurement of a second parameter of air, or the first parameter of air, in the airflow channel based on a measurement from a first sensor in the second subset of sensors. The adjustment may be based on signals from one or more of the other sensors in the second subset of sensors.

The control circuitry may comprise a microcontroller. The microcontroller may be configured to process data received from the sensors. The result of the processing of data may be a test score which can be used to help monitor or diagnose a respiratory disease. The control circuitry may instead be in communication with a portable computer comprising a microcontroller such as a laptop or smartphone. In these cases, the microcontroller of the portable device performs the data processing. The communication between the control circuitry and the portable device may be wireless a connection. The wireless connection may be a Bluetooth connection.

The signals from the one or more other sensors may be measurements of additional parameters of the air in the airflow path. The first parameter may be dependent on these additional parameters. The dependency of the first parameter on the additional parameters may be a linear or non-linear dependency. The additional parameters may be temperature, pressure, humidity or flow speed. The microprocessor is programmed with a model of how the first parameter depends on the additional parameters. It uses these models to calculate an adjusted measurement of a first parameter.

A first sensor may measure a first parameter of air in the airflow channel within a first range and a second sensor, or adjusted first sensor, may measure the first parameter within a second range. This advantageously means that the range of measurement of the first parameter is not limited by the range of a single sensor. Measurements from other sensors, or adjusted measurements of the first sensor, can be used to extend the range. This allows simple and cheaper sensors to be used.

In each configuration of the device an airflow channel is defined. In the first configuration, a first airflow channel is defined through the device and in the second configuration a second airflow cannel may be defined through the device, different to the first airflow channel.

The device may comprise a primary component and at least one secondary component. In the first configuration, the primary component and the secondary component may be removably engaged to one another to define the airflow channel. In the second configuration a second airflow channel may be formed by disengaging the first secondary component from the primary component, the primary component and the secondary components may be disengaged from one another or engaged to one another in a different manner. The airflow channel defined by engagement of the primary component and the secondary component advantageously is optimized for performing a first respiratory test. In the second configuration, the primary component may be engaged with a second secondary component. At least a portion of the airflow channel may be defined through the secondary component.

The primary component may be identical in each configuration of the device. It may be the at least one secondary component that defines the second airflow channel to be different to the first airflow channel.

In a first configuration the device may be configured to perform a test for a biomarker indicating lung inflammation and in a second configuration the device may be configured to perform a spirometry test. It may be that the device has a number of configurations in which a corresponding number of other respiratory diagnostic tests may be performed.

One of the subsets of sensors may comprise a flow sensor. The flow sensor may be positioned in the primary component. The plurality of sensors may comprise a pressure sensor, a temperature sensor or a humidity sensor. One subset of sensors may comprise an electrochemical sensor. The subset of sensors comprising the electrochemical sensor may further comprise at least one of a pressure sensor, a temperature sensor, a humidity sensor and a flow sensor. The control circuitry may be configured to use measurements from at least one of a pressure sensor, temperature sensor, humidity sensor or flow sensor to adjust a measurement from a sensor for measuring at least one biomarker. These adjustments advantageously account for variability in measurements from the sensor for measuring a biomarker. The control circuitry may be configured to use measurements from at least one of the pressure sensor, temperature sensor, humidity sensor and flow sensor to calibrate the measurement from the electrochemical sensor.

The biomarker sensor may be an electrochemical sensor. The adjustments to measurements from the electrochemical sensor may be advantageous because electrochemical sensors are typically very sensitive to environmental conditions and especially to changes to moisture in the air. It is typically exhaled breath that is measured by the device. Exhaled air has a high moisture content and temperature relative to atmospheric air, and the exhaled air flow may have variable pressure or flow rate. This lack of controlled and constant sample conditions means that readings from the electrochemical sensor alone are not always accurate. Environmental conditions must be factored in. The signals received from the pressure sensor, flow sensor, temperature sensor and/or humidity sensor can be used by the microprocessor to provide an adjustment factor and/or offset to the measurement from the electrochemical sensor to account for the environmental conditions or rates of change of environmental variables. Because electrochemical sensors are typically especially sensitive to changes to moisture in air, the adjustment factor and/or offset to the measurement from the electrochemical sensor may be based on measurements from the humidity sensor. The humidity sensor may be placed in closer proximity to the electrochemical sensor than other sensors of the plurality of sensors. In such an arrangement the humidity sensor can advantageously take humidity measurements that more accurately represent the moisture in the air that passes the electrochemical sensor.

The device may be configured to perform a test for a biomarker indicating lung inflammation. The device may comprise a scavenger filter configured to reduce environmental traces of the biomarker indicating lung inflammation. Inhaled breath may pass through the scavenger filter. This means that the amount of a biomarker measured in the exhaled breath can be assumed to be produced by the subject and not simply present in the environment, inhaled, and then exhaled.

The device may comprise a valve configured to change a property of the airflow channel depending on the direction of the flow of air through the airflow channel. For example, the valve may be configured so that in only one direction is the airflow channel defined through the scavenger filter. The concentration of biomarker in air passing the scavenger filter is reduced. The biomarker concentration is reduced in inhaled air. When that air is then exhaled the measured biomarker concentration is representative of the biomarker concentration in the lungs rather than background or atmospheric levels of the biomarker.

The device may comprise a gas drier. The gas drier may be configured to reduce the humidity of air passing through the gas drier. As explained above, electrochemical sensors are very sensitive to changes in moisture content. It may be advantageous to reduce the humidity of the air that is being sampled by the device, in addition to or instead of adjusting the measurement as in the method described above. This may improve the accuracy of readings from the electrochemical sensors.

Reducing the humidity of air passing through the device can prevent condensation on the sensors, which is advantageous, especially the nitric oxide sensor. The gas drier may be an absorbent material, a water trap, Nafion tubing, or may warm the sensor surface. An absorbent material advantageously does not require electrical power and does not substantially increase the internal volume of the flow channel.

The biomarker indicating lung inflammation may be nitric oxide concentration. The exhaled nitric oxide concentration indicates activity of eosinophils, which are involved with inflammation for about two thirds of asthmatics and one third of people with COPD. Therefore, nitric oxide concentration can be used to determine the sub-type of disease a person may have. A high nitric oxide concentration can indicate that a subject is likely to respond to particular pharmaceutical treatments. If the treatment is successful, a subject's exhaled nitric oxide concentration should decrease, so the test can be used to find an effective drug dose and to confirm the subject is administering their treatment correctly.

The device may comprise a flow sensor. It may be advantageous for the flow sensor to be used in more than one configuration and/or for performing more than one respiratory diagnostic test. Different tests have different typical flow rates and accuracy requirements. One test may have a range of up to about 850 litres per minute, with measurements having an accuracy of ±5 litres per minute. When the device is configured to perform a different respiratory diagnostic test, the required flow rate may be much lower. The required airflow for some tests may be not more than 5 litres per minute, with accuracy of measurements being ±<0.5 litres per minute. It would be advantageous to be able to use the same flow sensor in both configurations. In that case, the flow sensor needs to have the appropriate range for measuring airflow and appropriate accuracy across that range.

Producing a flow sensor with the appropriate range and sensitivity is technically challenging. A flow sensor that has a range of 850 litres per minute, will generally not have a suitable sensitivity at lower flow rates of around 5 litres per minute. It may be advantageous to use a flow sensor with a lower range but with higher sensitivity at low flow rates. It may be advantageous to modify or adjust the effective range of the flow sensors, by modifying or adjusting the input to the flow sensor i.e. the flow rate of the air, or by modifying or adjusting the output of the flow sensor; or by combining the output of the flow sensor with the output from one or more other sensors.

The sensor assembly may comprise a pressure sensor. The control circuitry may be configured to use signals received from both the flow sensor and the pressure sensor to estimate flow rate. The flow sensor may advantageously have a range of ±200 litres per minute. The estimated flow rate using the flow sensor and pressure sensor may advantageously have a range of ±1000 litres per minute. This is high enough to measure flow when the device is the in a spirometry configuration, where flow rate estimates of lower flow rates are primarily determined by the flow sensor, which has a higher sensitivity at lower flow rates, and measurements of higher flow rates are primarily determined by the pressure sensor, which has a larger range than the flow sensor.

The device may be configured to perform a spirometry test. The device may be configured to perform spirometry tests using the flow sensor. The device may be configured to measure peak expiratory flow or forced expiratory flow. Spirometry tests measure lung function, specifically the amount and/or the speed of air that can be inhaled or exhaled. These tests can advantageously be used to diagnose conditions such as asthma.

The device may comprise a mouthpiece. The mouthpiece may comprise a microbe filter.

In a fifth aspect of the invention there is a provided a method for performing a plurality of respiratory diagnostic tests using a device comprising a plurality of sensors each sensor measuring a property of air flowing through the device, the device having a first configuration and a second configuration, comprising the steps of:
  putting the device in the first configuration for performing a first respiratory diagnostic test;
  performing the first respiratory diagnostic test using a first subset of the plurality of sensors;
  putting the device in the second configuration for performing a second respiratory diagnostic test;
  performing the second respiratory diagnostic test using a second subset of the plurality of sensors; and
  outputting a result of the first and second respiratory diagnostic tests based on the measurements received from the first and second subsets of sensors,
  wherein at least one sensor is present in both the first subset and second subset of the plurality of sensors.

One of the first and second respiratory diagnostic tests may be a pulmonary obstruction or flow test. One of the first and second respiratory diagnostic tests may be a biomarker test. The biomarker test may be a test for nitric oxide concentration.

A result of the first respiratory diagnostic test may be an adjusted a measurement of a first parameter of air in the airflow channel based on a measurement from a first sensor in the first subset of sensors, adjusted based on signals from one or more of the other sensors in the first subset of sensors.

A result of the second respiratory diagnostic test may be an adjusted measurement of a first parameter of air in the airflow channel based on a measurement from a first sensor in the second subset of sensors, adjusted based on signals from one or more of the other sensors in the second subset of sensors.

In a sixth aspect of the invention there is provided a device for performing a plurality of respiratory diagnostic tests, comprising a plurality of sensors each sensor measuring a property of air flowing through the device, and control circuitry;
  wherein in a first configuration the device is configured to perform a first respiratory diagnostic test and in a second configuration the device is configured to perform a second respiratory diagnostic test;
  wherein in the first configuration the control circuitry is configured to output a result for the first respiratory test based on measurements received at the control circuitry from a first subset of the plurality of sensors, and in the second configuration the control circuitry is configured to output a result for the second respiratory test based on measurements received at the control circuitry from a second subset of the plurality of sensors;
  wherein the result of the first respiratory diagnostic test output by the control circuitry is an adjusted measurement of a first parameter of air in the airflow channel based on a measurement from a first sensor in the first subset of sensors, wherein the adjustment is based on signals from one or more of the other sensors in the first subset of sensors.

The first respiratory test may be a test for a biomarker indicative of inflammation or disease. The first sensor in the subset of sensors may be a biomarker sensor. The biomarker sensor may be an electrochemical sensor. The biomarker sensor may be configured to measure the concentration of the biomarker which may be the first parameter of air in the airflow channel. The biomarker may be nitric oxide concentration measured using the electrochemical sensor. The measurement of biomarker concentration may be adjusted based on signals from at least one of the pressure sensor, temperature sensor, humidity sensor and flow sensor.

Because electrochemical sensors are typically especially sensitive to changes to moisture in air, the adjustment to the measurement of biomarker concentration from the electrochemical sensor may preferably be based on measurements from a humidity sensor. The humidity sensor may be placed in closer proximity to the electrochemical sensor than other sensors of the plurality of sensors. In such an arrangement the humidity sensor can advantageously take humidity measurements that more accurately represent the moisture in the air that passes the electrochemical sensor.

In a seventh aspect of the invention there is a provided a device for performing an impulse oscillometry test comprising a housing defining an airflow channel from a mouthpiece to an air inlet wherein the air inlet is open to the atmosphere, an occluder, a means to move the occluder between a first position and a second position wherein in the second position the occluder occludes the airflow channel to a greater extent than in the first position;
  an acoustic impulse generator configured to push air in the airflow channel in the direction of the mouthpiece to create an acoustic impulse in the air in the airflow channel;
  control circuitry configured to control the means to move the occluder and the acoustic impulse generator such that the creation of an acoustic impulse by the acoustic impulse generator is coordinated with the movement of the occluder from the first position to the second position; and a sensor assembly configured to measure an airflow parameter of air in the airflow channel following creation of the acoustic impulse.

Oscillometry tests are diagnostic tests, the results of which indicate mechanical properties of the airways of the subject performing the test. These properties can be used to aid the diagnosis of respiratory diseases such as COPD. Oscillometry tests are advantageous as they do not require the subject to perform a specific breath manoeuvre, such as forced breathing. The subject need only breathe with a relatively constant speed of inhale or exhale. It may even be possible for the subject to simply perform normal, tidal, breathing through the device. This is advantageous as it means the test is easy and comfortable to perform. This is particularly important for children and for subjects who are suffering from a respiratory disease that would make breathing in another manner, such as high-flow forced breathing, difficult and uncomfortable.

While performing an oscillometry test using the device, a subject may breathe into and/or out through the device, such that air passes through the air channel of the device and into/out of the subject's lungs. The configuration of the acoustic impulse generator, the occluder, and the means to move the occluder, advantageously provides a compact and efficient way of generating an acoustic impulse that passes through the air in the airflow channel of the device.

As used herein, an acoustic impulse is a pressure wave comprising a plurality of sinusoidal frequencies. The acoustic impulse is created by the push of the of the air into the airflow channel by the acoustic impulse generator. The push of air creates pressure fluctuations. The pressure wave ideally take the form of, or approximate, a square wave.

The acoustic impulse travels at the speed of sound. The acoustic impulse may pass through the airflow channel and the mouthpiece and into the subject's airways before returning back into the airflow channel of the device. Following the creation of the acoustic impulse, parameters of the air in the airflow channel may be sensed by the sensor assembly. One measured parameter may be air pressure. Another measured parameter may be air flow rate. The acoustic impulse may interact with the airways of the subject, resulting in changes in the pressure and flow rate of the air passing the sensor. Therefore, these parameters may be used to determine the response of the subject's airways to the acoustic impulse. This response may be used to characterise the subject's airway. After the acoustic impulse has interacted with the subject's airways, the pressure wave will be dispersed and may have a bell-shape.

It is advantageous that the occluder occludes the airflow channel to a greater extent in the second position than in the first position, as this reduces loss of energy from the acoustic impulse in a direction away from the mouthpiece. Energy can escape through any gaps between the occluder and the airflow channel so any reduction in the that gap (achieved by the increased occlusion) ensures less energy escapes. Therefore, if the occluder is in the second position during the creation of the of acoustic impulse, energy loss from the created acoustic impulse in the direction away from the mouthpiece is advantageously reduced.

The control circuitry may be configured to coordinate the movement of the occluder from the first position to the second position such that it is simultaneous with the creation of the acoustic impulse.

The control circuitry is configured to move the occluder such that the occluder is in the second position simultaneously with the creation of the acoustic impulse. Advantageously, this ensures the occlusion is increased as the acoustic impulse is created.

The occluder may be configured to move from the first position to the second position such that the occluder is in the second position with an offset of 5 ms or less to the creation of the acoustic impulse. The offset may be such that the occluder reaches the second position after the creation of the acoustic impulse, but preferably the occluder is in the second position before the creation of the acoustic impulse. The offset may advantageously allow fine control of the movement of the occluder relative to the creation of the acoustic impulse. The offset may be a predetermined value for a specific configuration of the device that ensures a maximum, or particularly desired amount of energy of the acoustic impulse to be directed to the mouthpiece rather than away from the mouthpiece.

Once created, the acoustic impulse travels through the airflow channel in the direction of the mouthpiece. This is advantageously in the direction of the airways of the subject using the device. In other words, advantageously, the airflow channel does not include any bends or branches between the occluder and the mouthpiece. This means that a maximal amount of energy will reach the subject's airways. The acoustic impulse passes through the airflow channel out of the mouthpiece into the airways of the subject. The acoustic impulse interacts with the airways of the subject, resulting in changes in the pressure and flow rate of the air passing the sensors.

The sensor assembly may be configured to measure flow rate of air in the airflow channel or a pressure of air in the airflow channel or both flow rate of air in the airflow channel and a pressure of air in the airflow channel. The control circuitry may be configured to calculate a parameter that characterises a respiratory system based on a frequency domain analysis of the flow rate of air in the airflow channel or the pressure of air in the airflow channel or both the flow rate of air in the airflow channel and the pressure of air in the airflow channel. The flow rate and pressure are measured by the sensor assembly as required.

The control circuitry may be configured to receive signals from the sensor assembly. The control circuitry may receive measurements of flow and pressure from the sensor assembly, and based on these measurement may form a number of metrics that describe the mechanical properties of the airways. These metrics may be parameters that characterise the respiratory system of the subject. The different frequencies of acoustic impulse may be attenuated differently by the subject's airways. The attenuation may increase as the frequency increases. As a result, the measurements of pressure and flow of the higher frequencies are dominated by the response of the upper airways. Because the acoustic impulse comprises multiple frequencies, the metrics can indicate the characteristics of the upper and lower airways as well as the airway system as a whole. The metrics may give an indication of airway resistance and airway reactance and other mechanical properties of the airways. The mechanical properties of the airways may indicate that a subject has a respiratory disease and so these metrics can aid a trained medical person in the diagnosis of respiratory diseases.

The control circuitry may comprise a microcontroller. The microcontroller may be configured to process the data received from the sensors. The processing of data may include performing a Fast Fourier Transform. The result of the processing of data may be a test score which can be used to help monitor or diagnose a respiratory disease. The control circuitry may instead be in communication with a portable computer comprising a microcontroller such as a laptop or smartphone. In these cases, the microcontroller of the portable device performs the data processing. The communication between the control circuitry and the portable device may be wireless a connection. The wireless connection may be a Bluetooth connection.

The control circuitry may be configured to perform a Fast Fourier Transform on both the signals relating to measured flow and measured pressure from the sensor assembly and so produce a frequency domain distribution showing an amplitude for each frequency.

The acoustic impulse that is created by the acoustic impulse generator may comprise a plurality of frequencies including a range of 5 Hz to 20 Hz. The acoustic impulse may be in the form of, or approximate, a square wave, created by the movement of the occluder from the first position to the second position.

The acoustic impulse that is created by the acoustic impulse generator may have a maximum pressure increase of at least 50 Pa at the sensor assembly and a flow rate increase of at least 0.15 litres min$^{-1}$ through the airflow channel in the direction of the mouthpiece. The increase of pressure is the amount the pressure is increased above the pressure of air in the airflow channel from when the subject is breathing normally. The control circuitry may be configured to move the occluder from the first position to the second position within 50 ms or less.

In the second position the occluder occludes the airflow channel to a greater extent than in the first position. This change in occlusion results in a change in resistance to air flowing the airflow channel. When the occluder is in the second position, air flowing in the airflow channel experiences a higher resistance to flow than when the occluder is in the first position. The resistance to flow when the occluder is in the first position may be lower than 0.15 kPa s L$^{-1}$. The resistance to flow when the occluder in the first position may be 0.1 kPa s L$^{-1}$. While the occluder is in the second position, the higher resistance may cause the pressure in the airflow channel to change compared to when the occluder is in the first position. The pressure change (depending on whether the subject is inhaling or exhaling) in the airflow channel may affect the characteristics of the acoustic impulse. Preferably, the pressure change may result in a greater proportion of the energy of the acoustic impulse traveling toward the mouthpiece, rather than out through the air inlet.

The device may further comprise a terminal resistor in the airflow channel. The terminal resistor may be configured to calibrate the resistance of the airflow channel. The terminal resistor may be configured to increase the resistance of the airflow channel. This has the effect of increasing the resistance of the airflow channel both when the occluder is in the first position and when the occluder is in the second position. The terminal resistor may prevent decoupling between the atmospheric pressure and the pressure measured by the sensors in the device.

Both the length of time that the occluder is in the second position for, and the configuration of the occluder, may affect the characteristics of the acoustic impulse. The configuration of the occluder refers particularly to the amount to which the occluder increases the resistance to flow when the occluder is in the second position compared to when it is in the first position. The length of time that the occluder is in the second position for and the configuration of the occluder can therefore be chosen to result in an acoustic impulse that has desired characteristics.

In some embodiments the occluder may be configured such that when it is in the second position air can flow through the airflow channel. This means that even though the air in the airflow channel experiences more resistance when the occluder is in the second position, the airflow channel is not totally occluded. The minimum distance between the housing and the occluder, when the occluder is in the second position, may be at least 0.5 mm. At this distance the resistance to flow is sufficiently low that the effect of the change in flow resistance on the characteristics of the acoustic impulse is negligible. A gap of not much more than 0.5 mm may be chosen as this results in a suitably low resistance to flow while also ensuring that acoustic impulse is efficiently directed in the airflow channel toward the mouthpiece.

The test may be more comfortable for the subject and more likely to give accurate results if the pressure change experienced by the subject when the occluder is in the second position does not result in a significant build-up of pressure in the subject's airways. This can be achieved by ensuring that the occluder is in the second position for only a short time and by ensuring that the occluder does not fully close the airflow channel.

The control circuitry may be configured to move the occluder to the first position after the occluder has been in the second position for no more than 20 ms. This is a time that is advantageously short enough that the pressure change due to the increase in resistance while the occluder is in the second position is not noticeable for the subject. The mathematical model required to calculate the metrics from the behaviour of the acoustic impulse is advantageously simpler when the calculations do not have to take into account a significant pressure change resulting from prolonged occlusion of the airflow channel. In some embodiments the control circuitry may be configured to move the occluder to the first position after it has been in the second position for no more than 30 ms or 40 ms.

In some embodiments it may be advantageous to have high resistance to flow of air in the airflow channel when the occluder is in the second position. In such embodiments the minimum distance between the housing and the occluder, when the occluder is in the second position, may be less than 0.5 mm. In other embodiments the occluder is in the second position for long enough that the pressure build-up in the airflow channel has a significant effect on the test. The length of time the occluder is in the second position for may be longer than 20 ms.

A build-up of pressure in the airflow channel may increase the amplitude of the acoustic impulse. This may be because the pressure change in the airflow channel contributes additional energy to the acoustic impulse. The occluder remaining in the second position may more efficiently direct the energy of the acoustic impulse toward the mouthpiece. This may allow a smaller occluder to be used and having a lower power requirement. However, the characteristics of the acoustic impulse may also be affected such that it is less close to a square wave.

The occluder may be configured such that when it is in the second position air cannot flow past the occluder from the air inlet to the mouthpiece. This is the extreme case of having high resistance to flow when the occluder is in the second position and ensures that a maximum amount of energy of the acoustic impulse is directed in the airflow channel toward the mouthpiece.

The occluder may comprise a resilient sealing component configured to contact the housing when the occluder is in the second position. The sealing component may be made of a material that deforms when it comes into contact with the housing. The sealing component advantageously ensures that an air-tight seal is achieved in the airflow channel, preventing the flow of air past the occluder. It also prevents damage to the housing of the device when the occluder is moved with force from the first position to the second position.

The control circuitry may be configured such that the means to move the occluder moves said occluder from a first position to a second position and back to a first position at least 3 times each second during a test period. The control circuitry may be configured such that the acoustic impulse generator is configured to create at least 3 acoustic impulses each second during a test period, one acoustic impulse for each time the occluder moves from a first position to a second position. Creating multiple acoustic impulses throughout a test advantageously allows for a full picture of the airways. For example, measurements may be taken when the subject's lungs have different inflation volumes. Alternatively or in addition, results from multiple acoustic impulses may be averaged. This may account for noise or other inaccuracies in a single measurement.

The occluder, in the second position, may be configured to occlude the air inlet of the airflow channel.

The occluder may be a plunger or shutter. When the occluder is a plunger or a shutter, the means to move the occluder may be a linear actuator. Other means to move the occluder are possible. For example, the occluder may be on a hinged actuator.

The occluder may be a rotating valve. For example, the rotating valve may comprise a disk positioned perpendicular to the airflow channel defined in the housing of device. The disk may comprise a hole. In a first position, this hole may be in communication with the airflow channel. In a second position, this hole may not be in communication with the airflow channel or only in partial communication with the airflow channel. Therefore the disk may occlude the airflow channel to greater extent in the second position than in the first. The differing occlusion between first and second position may be achieved in other ways. The disk may have an irregular shape. The axis of rotation may be off-centre. The rotating valve may comprise vanes. When the occluder is a rotating valve, the means to move the occluder may be a motor.

The acoustic impulse generator may comprise a plunger and a means to move the plunger between a first position and a second position and may be configured such that movement of the plunger from the first position to the second position pushes air in the airflow channel from the plunger in the direction of the mouthpiece. The control circuitry may advantageously control the means to move the plunger such that the plunger moves between the first position and the second position at a speed and through a distance such that an acoustic impulse with desired properties is created. This may mean flow rate and pressure fluctuations have a desired amplitude. The acoustic impulse generator may push air in the airflow channel for 50 ms or less. This creates an acoustic impulse with an amplitude that is large enough for an impulse oscillometry test.

The plunger may move in a cycle from the first position, to the second position, and return to the first position more than once per breath. For example, the cycle of the plunger may have a frequency or pulse rate of 3 Hz. The highest frequency contained in the impulse is dependent mainly on the duration of the impulse. For example, an upper frequency of 20 Hz contained in the impulse may be attained by the occluder moving from the first position to the second position in 50 ms or less. The impulse will contain lower frequencies, such as 5 Hz. The highest frequency with a detectable amplitude may be 20 Hz. The different frequencies of acoustic impulse may be attenuated differently. The attenuation may increase as the frequency increases. As a result, the measurements of pressure and flow of the higher frequencies are dominated by the response of the upper airways. The measurements of pressure and flow of the lower may include a response from the lung periphery. It is therefore advantageous to probe the airways of the subject with a plurality of frequencies of pressure fluctuations rather than a single frequency, giving a fuller picture of the mechanical properties of the subject's airways. It allows for the recognition of characteristic respiratory responses at different frequencies.

The means to move the plunger is configured to move the plunger in a direction parallel to the airflow through the airflow channel when a subject is inhaling or exhaling through the mouthpiece. This results in the push of air by the plunger, when caused by the plunger moving from the first position to the second position, also being parallel to the airflow channel. The pushed air then moves in the direction of the mouthpiece.

The means to move the plunger may be a linear actuator. The linear actuator may advantageously be positioned such that its axis of movement is parallel to the airflow channel.

The linear actuator will then move the plunger from the first position to the second position in a direction parallel to the airflow channel. Other means to move the plunger are possible. For example, the plunger may be on a hinged actuator.

A portion of the housing defining the airflow channel may comprise a first tapered portion. In the first position, the plunger may be located in or near a wider part of this first tapered portion than in the second position. In this configuration, energy of the acoustic impulse created by moving the plunger from the first position to the second position, may be more efficiently directed toward the mouthpiece by the first tapered portion. The airflow channel may comprise a second tapered portion adjacent to the first tapered portion, wherein the second tapered portion may be configured to surround the plunger, when the plunger is in the first position. The second tapered portion may provide enough clearance around the plunger that the resistance to flow through the airflow channel is very low when the plunger is in the first position, without requiring a long distance of travel between the first position and the second position When the acoustic impulse generator is a plunger, that plunger may also be the occluder. In that case, moving the plunger from a first position to a second position simultaneously creates the acoustic impulse while also increasing the occlusion of the airflow channel.

The acoustic impulse generator may be a loudspeaker. The loudspeaker may comprise a cone or diaphragm which pushes air in the airflow channel creating an acoustic impulse. The loudspeaker may be configured to push the air in the airflow channel in a direction parallel to the airflow channel and toward the mouthpiece. The loudspeaker may be connected to a signal generator. The signal generator may provide an electrical signal which the loudspeaker converts into an acoustic wave. The signal generator may form part of the control circuitry.

Alternatively, the acoustic impulse generator may be configured to release compressed gas in the airflow channel which pushes air in the airflow channel in the direction of the mouthpiece. The compressed gas may be stored in a gas canister. The gas canister may comprise a release valve. The release valve may be configured such that when it is opened, compressed gas is released from the gas canister into the airflow channel. The compressed gas may be released in a direction that is parallel to the airflow channel and in the direction of mouthpiece. The release valve may be connected to the control circuitry and controllable such that the release of the compressed gas is coordinated with the movement of the occluder from the first position to the second position.

The device may be portable. This advantageously means that the device can be brought to a subject rather than the subject having to visit, for example, a hospital. This advantageously makes monitoring of a condition easier, as a subject would not have to return to, for example, a hospital each time the test is performed. It also allows for environmental triggers to be assessed in the real world.

The device may comprise at least one battery configured to provide power to the control circuitry, the acoustic generator and the means to move the occluder. The device comprising a battery advantageously allows the device to be portable and not required to be near a power source, such as mains power, when in use.

In an eighth aspect of the invention there is provided a method of performing an oscillometry test comprising the steps of:

creating an acoustic impulse using an acoustic impulse generator configured to push air in the airflow channel in the direction of the mouthpiece to create the acoustic impulse in the air in the airflow channel, and moving an occluder from a first position to a second position, wherein in the second position the occluder occludes the airflow channel to a greater extent than in the first position;

returning the occluder to the first position after it has been moved to the second position, and measuring an airflow parameter of air in the airflow channel during a period following the creation of the acoustic impulse in the airflow channel;

wherein a control circuitry is configured to control the means to move the occluder and the acoustic impulse generator such that the creation of an acoustic impulse by the acoustic impulse generator is coordinated with the movement of the occluder from the first position to the second position.

The control circuitry may be configured to move the occluder back to the first position after the occluder has been in the second position quickly, to minimise pressure build-up in the airflow channel when the occluder is in the second position. The control circuitry may be configured to move the occluder to the first position when the occluder has been in the second position for no more than 20 ms or, in some embodiments, 30 ms or 40 ms. The occluder may move from the first position to the second position and back to the first position within 120 ms or less. The occluder may be moved from the first position to the second position and back to the position 3 times each second. Each time the occluder is moved from the first position to the second position an acoustic impulse may be created. Creating multiple acoustic impulses throughout a test advantageously allows a full picture of the airways. For example, measurements may be taken when the subject's lungs have different inflation volumes. Alternatively to the control circuitry being configured to move the occluder back to the first position, a return spring may be used.

The acoustic impulse may comprise multiple frequencies. The acoustic impulse may comprise frequencies in the range of 5 Hz to 20 Hz. This range of frequencies can advantageously probe both the lower and upper airways of the subject. The lower frequency signals are attenuated less by the subject's airways than the higher frequency signals. It is therefore advantageous to probe the airways of the subject with a plurality of frequencies of pressure fluctuations rather than a single frequency, to give a fuller picture of the mechanical properties of the subject's airways. This also allows for the recognition of characteristic respiratory responses at different frequencies.

In a ninth aspect of the invention there is provided a device for performing an impulse oscillometry test comprising a housing defining an airflow channel from a mouthpiece to an air inlet wherein the air inlet is open to the atmosphere, an occluder and a means to move the occluder between a first position and a second position.

In the second position the occluder occludes the airflow channel to a greater extent than in the first position. The occluder is configured such that movement of the occluder from the first position to the second position pushes air in the airflow channel from the occluder in the direction of the mouthpiece to create an acoustic impulse in the air in the airflow channel.

In the device of the of the ninth aspect of the invention, it is the movement of the occluder from the first position to the second position which creates the acoustic impulse.

Therefore, in this aspect, the occluder acts as an acoustic impulse generator (as referred to in the previous aspects) as well as having a second position in which the occluder occludes the airflow channel to a greater extent than in the first position. The occluder in this aspect of the invention may have the advantages of the occluder and the acoustic impulse generator described above in respect to other aspects of the invention.

The device further comprises a sensor assembly configured to measure an airflow parameter of air in the airflow channel following creation of the acoustic impulse.

The acoustic impulse is created by the push of the of the air into the airflow channel by the occluder as it is moved from the first position to the second position. The push of air creates a pressure wave. The pressure wave ideally takes the form of, or approximate, a square wave. In an ideal case the acoustic impulse would be created by instantaneous movement of the occluder from the first position to the second position. In reality, this instantaneous movement is not possible resulting in an asymmetrical, bell shaped impulse.

The acoustic impulse travels at the speed of sound. The acoustic impulse may pass through the airflow channel and the mouthpiece and into the subject's airways before returning back into the airflow channel of the device. Following the creation of the acoustic impulse, parameters of the air in the airflow channel may be sensed by the sensor assembly. One measured parameter may be air pressure. Another measured parameter may be air flow rate. The acoustic impulse may interact with the airways of the subject, resulting in changes in the pressure and flow rate of the air passing the sensor. Therefore, these parameters may be used to determine the response of the subject's airways to the acoustic impulse. This response may be used to characterise the subject's airway.

It is advantageous that the occluder occludes the airflow channel to a greater extent in the second position than in the first position, as this reduces loss of energy from the pressure wave in a direction away from the mouthpiece. Energy can escape through any gaps between the occluder and the airflow channel so any reduction in the those gaps (achieved by the increased occlusion) ensures less energy escapes. Therefore, moving the occluder from the first position to the second position creates an acoustic impulse by pushing air in the airflow channel towards the mouthpiece while the increased occlusion in second position, relative to the first, simultaneously reduces energy loss in the direction away from the mouthpiece.

The control circuitry may advantageously control the means to move the occluder such that the occluder moves between the first position and the second position at a speed and through a distance such that an acoustic impulse with desired properties is created. This may mean flow rate and pressure fluctuations have a desired amplitude. Alternatively, the means to move the occluder may be driven by the action of the subject breathing.

Once created, the acoustic impulse travels through the airflow channel in the direction of the mouthpiece. This is advantageously in the direction of the airways of the subject using the device. In other words, advantageously, the airflow channel does not include any bends or branches between the occluder and the mouthpiece. This means that a maximal amount of energy will reach the subject's airways. The acoustic impulse passes through the airflow channel out of the mouthpiece into the airways of the subject. The acoustic impulse interacts with the airways of the subject, resulting in changes in the pressure and flow rate of the air passing the sensor.

The measured response to the acoustic impulse is dependent on the configuration of the occluder, motion of the occluder, and the properties of the air channel including the subject's lungs. As the configuration of the occluder, motion of the occluder, and properties of the airflow channel within the device can be known or calibrated for, the parameters sensed by the sensor assembly can be used to characterise airway mechanics of the subject's lungs.

The device may further comprise control circuitry configured either to control the means to move the occluder or to receive signals from the sensor assembly, or both to control the means to move the occluder and to receive signals from the sensor assembly.

The sensor assembly is configured to measure a flow rate of air in the airflow channel or a pressure of air in the airflow channel or both a flow rate of air in the airflow channel and a pressure of air in the airflow channel. The control circuitry may be configured to calculate a parameter that characterises a respiratory system based on a frequency domain analysis of the flow rate of air in the airflow channel or the pressure of air in the airflow channel or both the flow rate of air in the airflow channel and the pressure of air in the airflow channel. The flow rate and pressure are measured by the sensor assembly as required.

The control circuitry may receive measurements of flow and pressure from the sensor assembly, and based on these measurements may form a number of metrics that describe the mechanical properties of the airways.

These metrics may be parameters that characterise the respiratory system of the subject. The different frequencies of acoustic impulse may be attenuated differently and the attenuation may increase as the frequency increases. As a result, the measurements of pressure and flow of the higher frequencies are dominated by the response of the upper airways. Because the impulse comprises multiple frequencies, the metrics can indicate the characteristics of the upper and lower airways as well as the airway system as a whole.

The metrics may give an indication of airway resistance and airway reactance and other mechanical properties of the airways. The mechanical properties of the airways may indicate that a subject has a respiratory disease and so these metrics can aid a trained medical person in the diagnosis of respiratory diseases.

The control circuitry may comprise a microcontroller. The microcontroller may be configured to process the data received from the sensors. The processing of data may include performing a Fast Fourier Transform. The result of the processing of data may be a test score which can be used to help monitor or diagnose a respiratory disease. The control circuitry may instead be in communication with a portable computer comprising a microcontroller such as a laptop or smartphone. In these cases, the microcontroller of the portable device performs the data processing. The communication between the control circuitry and the portable device may be wireless a connection. The wireless connection may be a Bluetooth connection.

The control circuitry may be configured to move the occluder such that the acoustic impulse that is created comprises a plurality of frequencies of pressure fluctuations in a range from 5 Hz to 20 Hz. The acoustic impulse may be in the form of, or approximate, a square wave, created by the movement of the occluder from the first position to the second position. The occluder may move in a cycle from the first position, to the second position, and return to the first position more than once per breath. For example, the cycle of the occluder may have a frequency or pulse rate of 3 Hz. The highest frequency contained in the impulse is dependent mainly on the duration of the impulse. For example, an upper frequency of 20 Hz contained in the impulse may be attained by the occluder moving from the first position to the second position in 50 ms or less. The impulse will contain lower frequencies, such as 5 Hz. The highest frequency with a detectable amplitude may be 20 Hz. The different frequencies of acoustic impulse may be attenuated differently. The attenuation may increase as the frequency increases. As a result, the measurements of pressure and flow of the higher frequencies are dominated by the response of the upper airways. The measurements of pressure and flow of the lower frequencies may include a response from the lung periphery. It is therefore advantageous to probe the airways of the subject with a plurality of frequencies of pressure fluctuations rather than a single frequency, giving a fuller picture of the mechanical properties of the subject's airways. It allows for the recognition of characteristic respiratory responses at different frequencies.

The control circuitry may be configured to perform a Fast Fourier Transform on both the signals relating to measured flow and measured pressure from the sensor assembly and so produce a frequency domain distribution showing an amplitude for each frequency.

The control circuitry may be configured to move the occluder from the first position to the second position such that the acoustic impulse provides a maximum pressure increase of at least 50 Pa at the sensor assembly and a flow rate increase of at least 0.15 litres min-1 through the airflow channel in the direction of the mouthpiece. The increase of pressure is the amount the pressure is increased above the pressure of air in the airflow channel from the subject breathing normally. The control circuitry may be configured to move the occluder from the first position to the second position within 50 ms or less.

In the second position the occluder occludes the airflow channel to a greater extent than in the first position. This change in occlusion results in a change in resistance to air flowing the airflow channel. When the occluder is in the second position, air flowing in the airflow channel experiences a higher resistance to flow than when the occluder is in the first position. The resistance to flow when the occluder is in the first position is lower than $0.15$ kPa s $L^{-1}$. While the occluder is in the second position, the higher resistance may cause the pressure in the airflow channel to change compared to when the occluder is in the first position. The pressure change (depending on whether the subject is inhaling or exhaling) in the airflow channel may affect the characteristics of the acoustic impulse. Preferably, the pressure change may result in a greater proportion of the energy of the acoustic impulse traveling toward the mouthpiece, rather than out through the air inlet.

Both the length of time that the occluder is in the second position for, and the configuration of the occluder, may affect the characteristics of the acoustic impulse. The configuration of the occluder refers particularly to the amount to which the occluder increases the resistance to flow when the occluder is in the second position compared to when it is in the first position. The length of time that the occluder is in the second position for and the configuration of the occluder can therefore be chosen to result in an acoustic impulse that has desired characteristics.

In some embodiments the occluder may be configured such that when it is in the second position air can flow through the airflow channel. This means that even though the air in the airflow channel experiences more resistance when the occluder is in the second position, the airflow channel is not totally occluded. The minimum distance between the housing and the occluder, when the occluder is in the second position, may be at least 0.5 mm. At this distance the resistance to flow is sufficiently low that the effect of the change in flow resistance on the characteristics of the acoustic impulse is negligible. A gap of not much more than 0.5 mm may be chosen as this results in a suitably low resistance to flow while also ensuring that acoustic impulse is efficiently directed in the airflow channel toward the mouthpiece.

The test may be more comfortable for the subject and more likely to give accurate results if the pressure change experienced by the subject when the occluder is in the second position does not result in a significant build-up of pressure in the subject's airways. This can be achieved by ensuring that the occluder is in the second position for only a short time and by ensuring that the occluder does not fully close the airflow channel.

The control circuitry may be configured to move the occluder to the first position after the occluder has been in the second position for no more than 20 ms. This is a time that is advantageously short enough that the pressure change due to the increase in resistance while the occluder is in the second position is not noticeable for the subject. The mathematical model required to calculate the metrics from the behaviour of the acoustic impulse is advantageously simpler when the calculations do not have to take into account a significant pressure change resulting from prolonged occlusion of the airflow channel. In some cases, the control circuitry may be configured to move the occluder to the first position after it has been in the second position for no more than 30 ms or 40 ms.

In some embodiments it may be advantageous to have high resistance to flow of air in the airflow channel when the occluder is in the second position. In such embodiments the minimum distance between the housing and the occluder, when the occluder is in the second position, may be less than 0.5 mm. In other embodiments the occluder is in the second position for long enough that the pressure build-up in the airflow channel has a significant effect on the test. The length of time the occluder is in the second position for may be longer than 20 ms.

A build-up of pressure in the airflow channel may increase the amplitude of the acoustic impulse. This may be because the pressure change in the airflow channel contributes additional energy to the acoustic impulse. The occluder remaining in the second position may more efficiently direct the energy of the acoustic impulse toward the mouthpiece. This may allow a smaller occluder to be used and having a lower power requirement. However, the characteristics of the acoustic impulse may also be affected such that it is less close to a square wave.

A portion of the airflow channel may comprise a first tapered portion. In the first position, the occluder may be located in or near a wider part of this first tapered portion than in the second position. In this configuration, energy of the acoustic impulse created by moving the occluder from the first position to the second position, may be more efficiently directed toward the mouthpiece by the first tapered portion. The airflow channel may comprise a second tapered portion adjacent to the first tapered portion wherein the second tapered portion may be configured to surround the occluder, when the occluder is in the first position. The second tapered portion may provide enough clearance around the occluder that the resistance to flow through the airflow channel is very low when the occluder is in the first position, without requiring a long distance of travel between the first position and the second position.

The occluder may be configured so that when it is in the second position air cannot flow past it. This is the extreme case of having high resistance to flow when the occluder is in the second position and ensures that a maximum amount of energy of the acoustic impulse is directed in the airflow channel toward the mouthpiece. The occluder may comprise a resilient sealing component configured to contact the housing when the occluder is in the second position. The sealing component may be made of a material that deforms when it comes into contact with the housing. The sealing component advantageously ensures that an air-tight seal is achieved in the airflow channel, preventing the flow of air past the occluder. It also prevents damage to the housing of the device when the occluder is moved with force from the first position to the second position.

The control circuitry may be configured such that the means to move the occluder moves said occluder from a first position to a second position and back to a first position at least 3 times each second during a test period. This creates at least 3 acoustic impulses each second during a test period. Creating multiple acoustic impulses throughout a test advantageously allows a full picture of the airways. Alternatively to the control circuitry being configured to move the occluder back to the first position, a return spring may be used.

The occluder, in the second position, may be configured to occlude the air inlet of the airflow channel.

The face of the occluder in contact with the airflow channel may be substantially concave in shape. This is efficient for creating the acoustic impulse, and ensures that as much air as possible is pushed toward the mouthpiece as the occluder is moved from the first position to the second position.

The means to move the occluder may be configured to move the occluder in a direction parallel to the airflow through the airflow channel when a subject is inhaling or exhaling through the mouthpiece. This results in the push of air by the occluder, when caused by the occluder moving from the first position to the second position, also being parallel to the airflow channel. The pushed air then moves in the direction of the mouthpiece.

The means to move the occluder may be a linear actuator. The linear actuator may advantageously be positioned such that its axis of movement is parallel to the airflow channel. The linear actuator will then move the occluder from the first position to the second position in a direction parallel to the airflow channel. Other means to move the occluder are possible. For example, the occluder may be on a hinged actuator.

The mouthpiece advantageously has a low resistance to flow, low wasted volumes, and relatively smooth internal surfaces. Avoiding sharp internal features reduces disturbance to the impulse/wave travelling into/out of the airways. These features may otherwise damp the signal properties of the wave.

The device may be portable. This advantageously means that the device can be brought to a subject rather than the subject having to visit, for example, a hospital. This advantageously makes monitoring of a condition easier, as a subject would not have to return to, for example, a hospital each time the test is performed. It also allows for environmental triggers to be assessed in the real world.

The device may comprise at least one battery configured to provide power to the control circuitry and the means to move the occluder. The device comprising a battery advantageously allows the device to be portable and not required to be near a power source, such as mains power, when in use.

In a tenth aspect of the invention there is provided a method of generating an impulse during an impulse oscillometry test comprising the steps of:
providing an airflow channel defined through a housing of a device for performing the impulse oscillometry test, the airflow channel extending from a mouthpiece to an air inlet, wherein the air inlet is open to the atmosphere,
moving an occluder from a first position to second position, wherein in the second position the occluder occludes the airflow channel to a greater extent than in the first position, and
wherein moving the occluder pushes air in the airflow channel from the occluder in the direction of the mouthpiece to create an acoustic wave, and
returning the occluder to the first position after it has been moved to the second position.

The occluder may move from the first position to the second position within 50 ms or less. This creates an acoustic impulse with an amplitude that is large enough for an impulse oscillometry test.

The control circuitry may be configured to move the occluder back to the first position after the occluder has been in the second position quickly, to minimise pressure build-up in the airflow channel when the occluder is in the second position. The control circuitry may be configured to move the occluder to first position when the occluder has been in the second position for no more than 20 ms or, in some embodiments, 30 ms or 40 ms. The occluder may move from the first position to the second position and back to the first position within 120 ms or less. The occluder may be moved from the first position to the second position and back to the position 3 times each second. Creating multiple acoustic impulses throughout a test advantageously allows a full picture of the airways. Alternatively to the control circuitry being configured to move the occluder back to the first position, a return spring may be used.

The acoustic impulse may comprise multiple frequencies. The acoustic impulse may comprise frequencies in the range of 5 Hz to 20 Hz. This range of frequencies can advantageously probe both the lower and upper airways of the subject.

The lower frequency signals are attenuated less by the subject's airways than the higher frequency signals. It is therefore advantageous to probe the airways of the subject with a plurality of frequencies of pressure fluctuations rather than a single frequency, to give a fuller picture of the mechanical properties of the subject's airways. This also allows for the recognition of characteristic respiratory responses at different frequencies.

In an eleventh aspect of the invention there is provided a method of performing an oscillometry test comprising the steps of:
providing an airflow channel defined through a housing of a device for performing the impulse oscillometry test, the airflow channel extending from a mouthpiece to air inlet wherein the air inlet is open to the atmosphere,
moving an occluder from a first position to second position, wherein in the second position the occluder occludes the airflow channel to a greater extent than in the first position, and wherein moving the occluder pushes air in the airflow channel from the occluder in the direction of the mouthpiece to create an acoustic impulse,
returning the occluder to the first position after it has been moved to the second position, and measuring an airflow parameter of air in the airflow channel during a period following the creation of the acoustic impulse in the airflow channel.

It should be clear that features described in relation to one aspect may be applied to other aspects of the invention.

BRIEF DESCRIPTION OF THE DRAWINGS

Embodiments in accordance with the invention will now be described, by way of example only, with reference to the accompanying drawings, in which.

DETAILED DESCRIPTION

Figure 1:
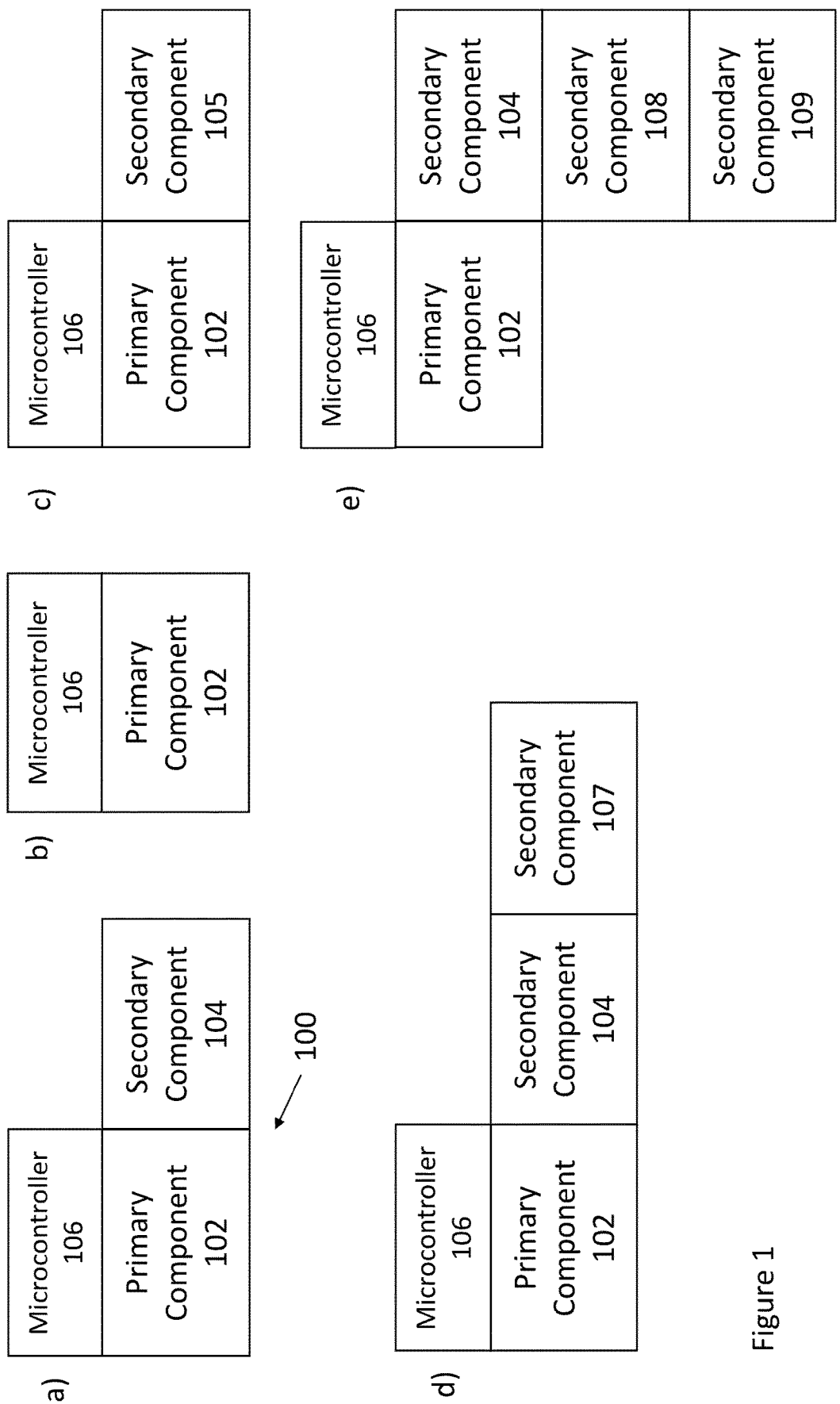
FIG. 1 shows a series of schematics of general configurations of the device in accordance with the invention wherein each configuration may perform one of a plurality of respiratory diagnostic tests.

FIG. 1 illustrates, in schematic form, five different configurations of a device 100 for performing respiratory diagnostic tests in accordance with the invention. In each configuration, the device 100 is configured to perform a specific respiratory diagnostic test. The device comprises a primary component 102 and control circuitry 106. The control circuitry 106 may be a microcontroller. The device may also comprise any number of secondary components 104, 105 107, 108 or 109. The primary component 102 comprises, or is connected to, the control circuitry 106. The secondary components of the device can be arranged relative to the primary component in numerous ways, as shown in FIG. 1, in order to carry out different tests.

All the configurations shown in FIG. 1 contain the primary component 102 and the control circuitry 106. Each configuration differs in the number or arrangement of secondary components. Secondary components are added, removed, or rearranged within the assembly to create a new configuration of the device. In each configuration, an airflow channel is defined through the connected primary and secondary components. The characterisation of the airflow channel differs in each configuration in order to be optimised for a specific respiratory diagnostic test.

In some embodiments the control circuitry 106 of the primary component is powered by an external power source. This may be via a USB connection with a computer or portable device such as a laptop. The USB connection is not shown in the figures. In other embodiments the power source may be an internal power source such as a battery. The primary component 102 is in electrical contact with any secondary components in connection with the primary component. This allows power to be transferred from the external power source to the primary component and the secondary components.

To use the device 100, a subject inhales and/or exhales through the device so that the inhaled or exhaled air flows through the airflow channel defined through the device 100. The primary component 102 comprises at least one sensor. Some, but not all, of the secondary components 104 comprise sensors. The primary 102 and secondary components 104 have a standard connection mechanism which exists across all the components making it easy to switch components around. The primary component may also comprise an additional connection mechanism via which some secondary components can connect. Generally, a mouthpiece is also connected to the primary component 102 or one of the secondary components.

FIGS. 1a to 1d show four different configurations of the device with various arrangements of primary components in connection with different secondary components. FIG. 1a is a configuration with a primary component 102 connected to a secondary component 104.

FIG. 1b is a configuration with a primary component 102 not connected to any other component. FIG. 1c is a configuration with secondary component 105, different to secondary component 104, connected to the primary component 102. FIG. 1*d* is a configuration with secondary component 104 connected to the primary component 102 and to secondary component 107, different to secondary components 104 and 105.

FIG. 1*e* is an alternative embodiment. It shows a number of secondary components 104, 108 and 109 that are fixed to one another. Only secondary component 104 is in connection with the primary component 102. When the device is configured as shown in FIG. 1*e*, an airflow channel is defined through the primary component 102 and secondary component 104 only. Secondary components 108 and 109 can be connected to the primary component 102 as required to reconfigure the device to perform one of the other respiratory diagnostic tests and so defining an airflow channel through primary component 102 and secondary components 108 or 109 respectively. Connection may be achieved by opening a valve. Closing the valve disconnects the secondary component. In some configurations the valves may allow air to flow through one, more than one or none of the secondary components 104, 108 and 109. An alternative connection may be rotation or other movement of the secondary components into different positions relative to the primary component, to change the airflow path through the device.

Figure 2:
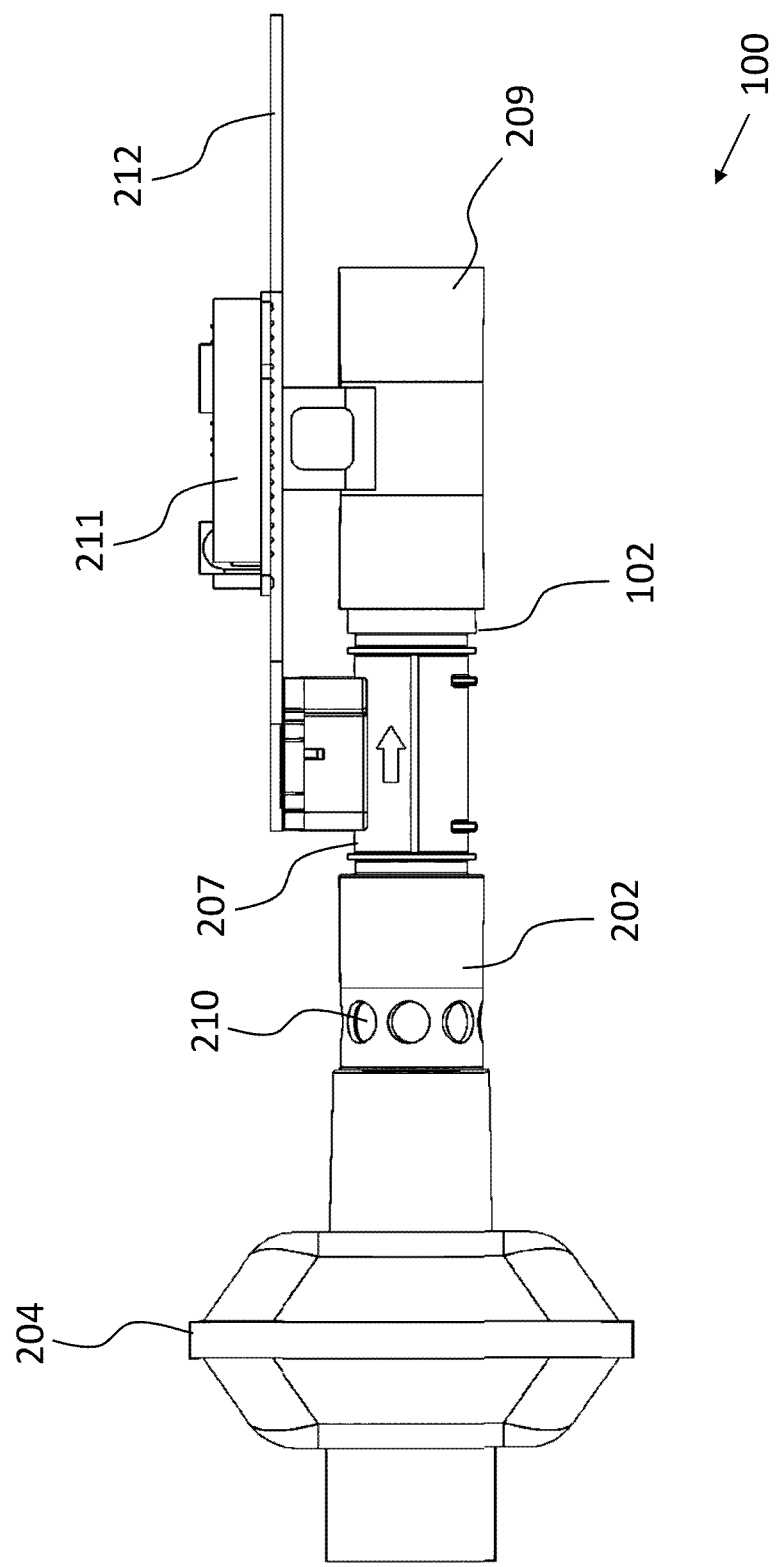
FIG. 2 is a side view of the device in a specific configuration for performing spirometry tests.

FIG. 2 is a perspective view of a device 100 for performing a first respiratory diagnostic test. In this configuration the device is configured to perform a spirometry test. Spirometry tests are used to indicate mechanical properties of the airways of the subject. The flow rate is measured and can be integrated over time to calculate lung volumes. The maximum exhaled flow rate is an indicator of airway resistance and obstruction; resistance to flow increases as airway diameter decreases. The reduction in airway diameter reduces the maximum flow rate. Obstructed or narrowed airways suggest the subject may have a respiratory condition such as asthma or COPD.

The device comprises a primary component 102, a first secondary component, which is a spirometry component 202, and a mouthpiece 204. The secondary component is positioned between the mouthpiece and the primary component. The spirometry component 202 comprises eight bypass holes 210.

The primary component comprises a flow sensor held within housing portion 207, a sensor assembly held within a housing portion 209 and a control circuitry held within a housing portion 211. The flow sensor, sensor assembly and control circuitry are not shown in FIG. 2. The primary component further comprises mounting plate 212.

Figure 3:
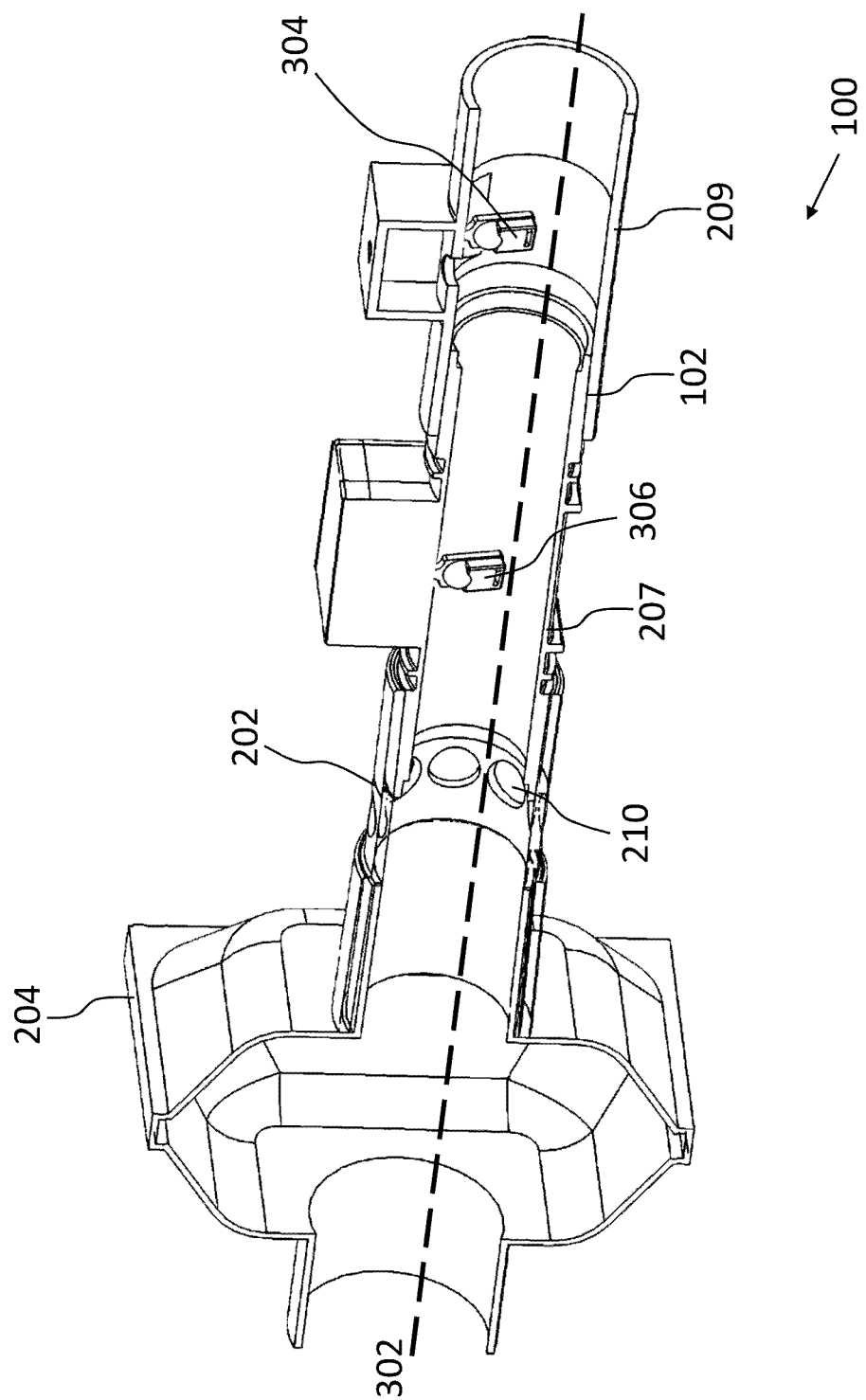
FIG. 3 is a cross-sectional view of the device of FIG. 2 showing the airflow channel that is formed through the device.

FIG. 3 is a cross section of the device of FIG. 2 and shows the airflow channel 302 defined through the device 200 when it is in a spirometry configuration. In FIG. 3 the control circuitry and control circuitry housing portion 211 are not shown. The mounting plate 212 is also not shown.

The sensor assembly 304 and flow sensor 306 are visible in FIG. 3. The sensor assembly 304 comprises environmental sensors, which are a pressure sensor, a temperature sensor, and a humidity sensor. The pressure sensor is an All Sensors Co DLHR-L02D. The temperature and humidity sensors are integrated into one component, a Sensirion SHT75. All of the above sensor components are available for purchase from the Digi-Key electronics website: www.digikey.com. The flow sensor is a Sensirion SFM3000. In FIGS. 2 and 3 the flow sensor 306 and the flow sensor housing 207 are shown as being part of the primary component 102. However, these may form part of the secondary component 202.

The airflow channel 302 is designed to have a low resistance to flow and low internal volume or dead space. The various components forming the airflow channel 302 have similar internal diameters. Where there are changes to the airflow channel 302 diameter, the changes are graduated to reduce airflow resistance and encourage consistent airflow with repeatable characteristics. Some sensors respond better to laminar flow and some sensors respond better to turbulent flow. As the sensors respond differently to different flow characteristics, it is important that the characteristics are repeatable so that every time a diagnostic test is performed a similar air flow occurs in the airflow channel 302 of the device. Spirometry is used to measure airway resistance of the subject, so inconsistent or high resistance in the device could cause inaccurate test results or make it difficult for the subject to perform the test. Local disruptions or turbulence to the airflow in the airflow channel 302 could cause errors or inaccuracies measurements by the sensors.

The flow sensor 306 is connected electrically to the control circuitry, and is able to send data to the control circuitry and receive instructions and power from the control circuitry. For example, the control circuitry can activate, deactivate, and adjust the sampling frequency of the flow sensor 306. A higher sampling frequency can provide better data for respiratory measurements. Electrical power can be used more efficiently if the flow sensor is deactivated when are not being used in a test.

The mouthpiece 204 comprises a microbe filter, not shown, to protect the subject from infection. The microbe filter also acts to avoid contamination of the device 100, absorb some moisture from the exhaled breath to reduce condensation on sensors in the device and protect sensors in the device from exhaled particles, fluids, or debris. A new mouthpiece 204 is used for each person using the device.

Figure 4:
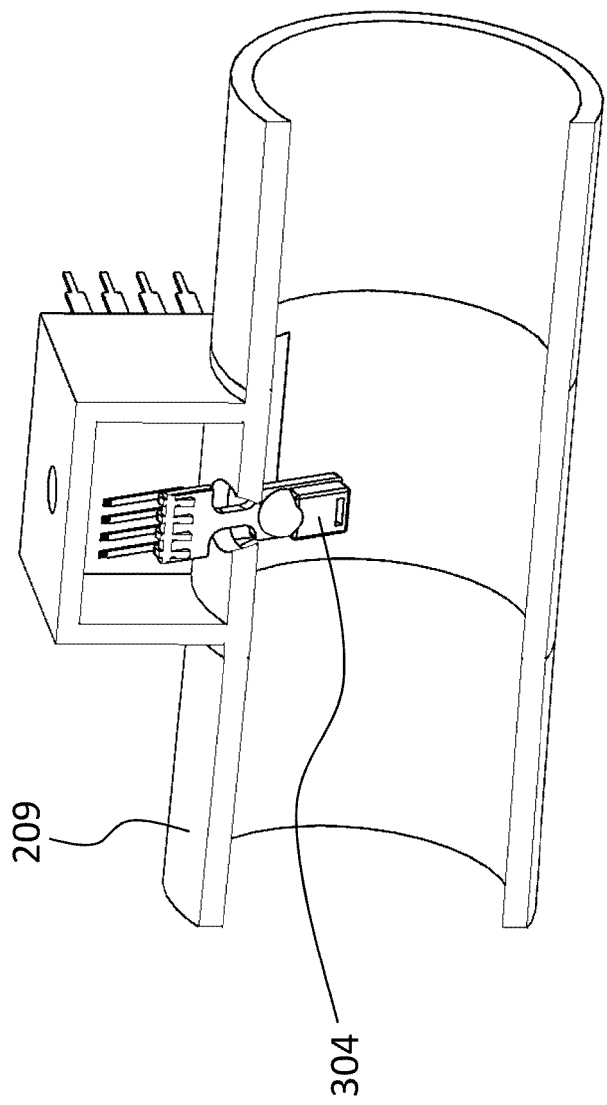
FIG. 4 is a close-up cross-sectional view of part of FIG. 3 showing a sensor in the airflow channel.

FIG. 4 is a close up view of the portion 209 of the primary component 102 holding the sensor assembly 304. The sensor assembly comprises environmental sensors. The environmental sensors measure pressure, temperature and humidity. The sensor assembly 304 is fitted in the primary component 102 to expose inlets of the sensors to the air in the airflow channel 302.

The sensor assembly 304 is mounted to reduce thermal conduction from the housing 209 of the primary component 102. Thermal conduction between the housing of the primary component 102 and the sensor assembly 304 could cause the measurement of the air to be influenced by the temperature of the primary component 102. Access holes into the housing of the primary component 102 for the sensor assembly 304 are sealed to avoid interaction between the environment and the airflow channel 302. Flow through these access holes could cause disturbance to the flow profile and cause errors in the measurements made by sensors of the sensor assembly 304.

The sensors of the sensor assembly 304 are connected electrically to the control circuitry, and are able to send data to the control circuitry and receive instructions and power from the control circuitry. For example, the control circuitry can activate, deactivate, and adjust the sampling frequency of the sensors of the sensor assembly 304. A higher sampling frequency can provide better data for respiratory measurements, but can generate heat that can produce errors in temperature measurements. Electrical power can be used more efficiently if the sensors are deactivated when they are not being used in a test.

Figure 5:
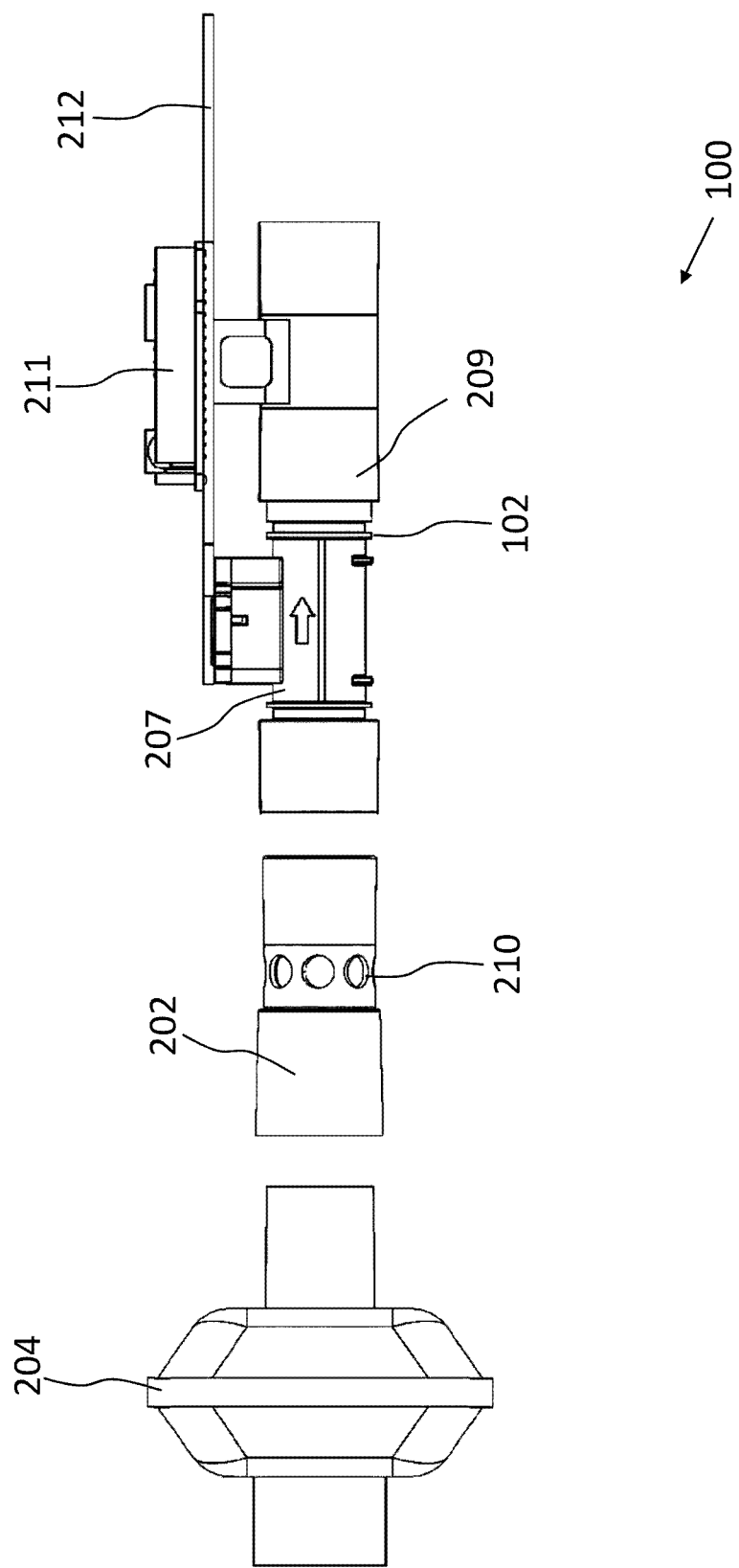
FIG. 5 is an exploded side view of the device of FIG. 2 showing the separate components that are connected to form the device.

FIG. 5 is an exploded view of FIG. 2 and illustrates how the components fit together. In the configuration shown in FIG. 2 the primary component 102 is configured to perform spirometry tests when connected to the secondary component 104 and the mouthpiece 204. The spirometry component 202 is detachable from the primary component 102. The mouthpiece is detachable from the secondary component 104 which is spirometry component 202. By connecting the spirometry component 202 to the primary component the device is configured for performing spirometry tests.

The spirometry component 202 has an inner surface that is designed to interface and seal with the outer surface of the flow sensor portion 207 of the primary component 102. The interfacing surface of each component has a conical taper to provide a seal when the spirometry component 202 is installed over the flow sensor portion 207 of the primary component 102. The inner diameter and conical taper of the flow sensor portion end of the spirometry component 202 is the same as the outer diameter and taper of the connecting end of the mouthpiece 204. Thus, the components can be used in a modular way, where components can be added to, removed from, or rearranged within the device for different configurations of the device.

The opposite end of the spirometry component 202 has an inner surface that interfaces with the outer surface of the mouthpiece 204. The dimensions and taper of interfacing surfaces in the device are standardised. This means that these interfacing surfaces will be the same as above. Each secondary component has a standardised interface to interact with the shape and dimensions of at least one end of the primary component or another secondary component. The interfacing surface of both components has a conical taper to provide a seal when the spirometry component 202 is installed over the mouthpiece 204.

Some interfaces have additional features to aid with connection. The inner surface of the spirometry component 202 has an internal step that locates the depth the mouthpiece 204 can be inserted into the spirometry component 202. The internal step also reduces disruptions to airflow within the airflow channel 302 because the internal diameter beyond the step is the same as the internal diameter of the mouthpiece 204.

The mounting plate 212 of the primary component forms part of an additional connection mechanism. Only some of the secondary components utilise the additional connection mechanism. The additional connection mechanism provides an additional point of contact between the primary component 102 and a secondary component to be connected to the primary component by utilising the mounting plate 212. In order to connect a secondary component to the primary component through the mounting plate, the secondary component comprises a threaded knob which passes through the mounting plate 212 of the primary component and screws into the secondary component. This robustly and repeatably aligns the secondary component with the primary component. It also aids with the connection of various shaped and sized components and resists impacts caused by dropping or bumping the device and forces that might cause the secondary component to move relative to the primary component. Other mechanisms may be used to provide this mechanical stability. For example, the rotational position could be located by a spline feature and the axial position could be located by a stepped feature or snapping lock mechanism. Ideally, a mechanism is provided to fix relative rotational position, locate relative axial position, and resist bumps, vibrations, and forces that might seek to displace the secondary component relative to the primary component.

Another form of additional connection mechanism is through the use of one or more pairs of magnets. In such embodiments, the primary component comprises one magnet from the pair of magnets, the secondary component comprises the other. The magnets are configured such that when the primary and secondary units are connected, a retaining force exists between the pair of magnets, holding the two components together. The magnets also provide a means for aligning the primary and secondary component in repeatable way.

In the spirometry configuration of FIGS. 2 and 3 the flow sensor 306 used to measure flow rate has a range of ±200 litres per minute. This is lower than typical flow rates for spirometry tests which may reach up to ±850 litres per minute. Such a flow sensor 306 is chosen because other tests performed by the device, when the device is in other configurations, require a low flow rate. A flow sensor with a smaller range, i.e. a range of considerably lower than ±850 litres per minute, has sufficient resolution for these low flow rate applications. For higher flow rate applications, such as spirometry test, the effective range of the flow sensor 306 has to be extended. This is achieved by the spirometry component 202, and in particular the presence of the bypass holes 210.

The design of the spirometry component means that the airflow channel 302 effectively splits. One channel is formed through the bypass holes and another channel is formed past the flow sensor so only a portion of airflow in or out from the subject passes the flow sensor. The airflow channels have different resistances, and it is the resistance of each of the channels that determines the proportion of air that flows through each of the channels.

The ratio of the resistances of the airflow channels can be chosen to ensure that the expected flow rate past the sensor always falls within the range of the sensor. The following relationship can be used.

$$(R\_bypass)/(R\_sensor)=(Max\_Flow\_Sensor\_Range)/(Expected\_Max\_Subject\_Flow-Max\_Flow\_Sensor\_Range)$$

At the maximum expected flow rate from the subject, the portion of flow in the airflow channel passing the flow sensor 306 is less than the maximum range of the flow sensor 306. The excess flow passes through the bypass holes in the spirometry component 202. The proportion of air passing the flow sensor compared to out of the air bypass holes is dependent on the overall air flow and is a non-linear relationship. The control circuitry is programmed to scale up any measurement at the flow sensor to a value that represents the total flow using the non-linear relationship.

With this configuration, the effective range of the flow sensor 306 increases from ±200 litres per minute to ±1000 litres per minute, as required for a spirometry test (that reaches±850 litres per minute).

As part of the spirometry test, the control circuitry receives measurements from the flow sensor 306 in order to calculate or measure a number of different metrics. Each metric gives an indication of the mechanical properties of the subject's lungs. These metrics include Peak Expiratory Flow (PEF), Forced Expiratory Volume in 1 second (FEV1), Forced Expiratory Flow (FEF) and Force Expiratory Volume (FEV) and finally Force Inspiratory Flow (FIF). Lung volumes are calculated by integrating flow rate over time.

To measure PEF the subject inflates their lungs to a maximum volume, then exhales with as high a flow rate as they are able to produce. The PEF value is the maximum flow rate produced, measured in litres per minute by the flow sensor or pressure sensor.

To measure FEV1 the subject inflates their lungs to a maximum volume, then exhales with as high a flow rate as they are able to produce. The FEV1 value is the maximum expired volume within the first second of expiration, typically measured in litres.

FEF and FEV are similar to PEF and FEV1 respectively but are more general metrics representing any expiration flow rate rather than peak flow rate as well volumes over any time interval rather than a fixed first second of expiration. They can be measured at any point of the exhalation. FIF, similar to FEF but for inhalation rather than exhalation, is also calculated.

The tidal volume (VT) is calculated as the volume of gas exchanged in one breath of normal tidal breathing. Tidal breathing is defined as inhalation and exhalation during restful breathing. At rest, also known as "quiet breathing", tidal breathing tends to have a narrow range between the depth of the breath and amount that is exhaled and tends to be fairly consistent. Respiratory diseases can change the normal character of this breathing and cause inconsistencies over a number of breaths.

The Forced Vital Capacity (FVC) can also be calculated, this is the volume exchanged from a maximum inhalation and maximum exhalation. Other volume measurements that are routinely used in clinical assessment and research can also be calculated using the device, most are calculated as the extreme inspiration or expiration volume relative to a minimum or maximum volume from tidal breathing.

As well as using the above metrics individually, the control circuitry 106 is programmed to combine some metrics in order to calculate additional metrics. In this example, the ratio of FEV1 to FVC (as a percentage) is used as an indicator of airway resistance or obstruction and the control circuitry calculates this ratio. A low value for FEV1 to FVC ratio may indicate high airway resistance or that the airways are obstructed. High airway resistance or the presence of obstruction suggests the subject has a respiratory condition such as asthma or COPD.

Multiple values are calculated from a single inhalation and/or exhalation. The tests can be repeated and a highest, lowest, or average of the test values can be used as the reported value.

Spirometry metrics can be measured over time to monitor the progression of a subject's disease or to indicate if the subject is responding to a medical treatment. Spirometry metrics for a subject can be compared to expected values for the subject, given their age, weight, height, ethnicity, sex, and other demographic variables. Spirometry values can be measured before and after exposure to a trigger to determine if the subject's respiratory condition has sensitivity to the trigger. Spirometry values can be measured before and after a treatment such as a bronchodilator, to determine if the subject's respiratory condition has response to the treatment.

The device 100 may use Bluetooth to transfer data from the control circuitry 106 to a computer. This may be a portable computer such as a laptop or smartphone. The portable computer is configured to process the data to provide a test score which can be used to help monitor or diagnose a respiratory disease. This processing of data may include plotting graphs of flow rate versus time, volume versus time, and volume versus flow rate. The shapes of the curves on these graphs at different events in the respiratory cycle can be indicative of a subject's respiratory condition. Other data transfer means are possible, for example a wired connection between the device and the external computer. In some embodiments the device will process the data internally using the control circuitry. Test scores and other data outputs can then be displayed to the subject on a display integral to the device. This may include displaying graphs.

In the spirometry configuration the air bypass holes 210 of the spirometry component 202 alters the airflow channel so that the flow sensor is suitable for performing spirometry tests. By changing the spirometry component connected to the primary component to a different component (or simply by removing it), a different airflow channel is formed for performing a different respiratory diagnostic test.

Figure 6:
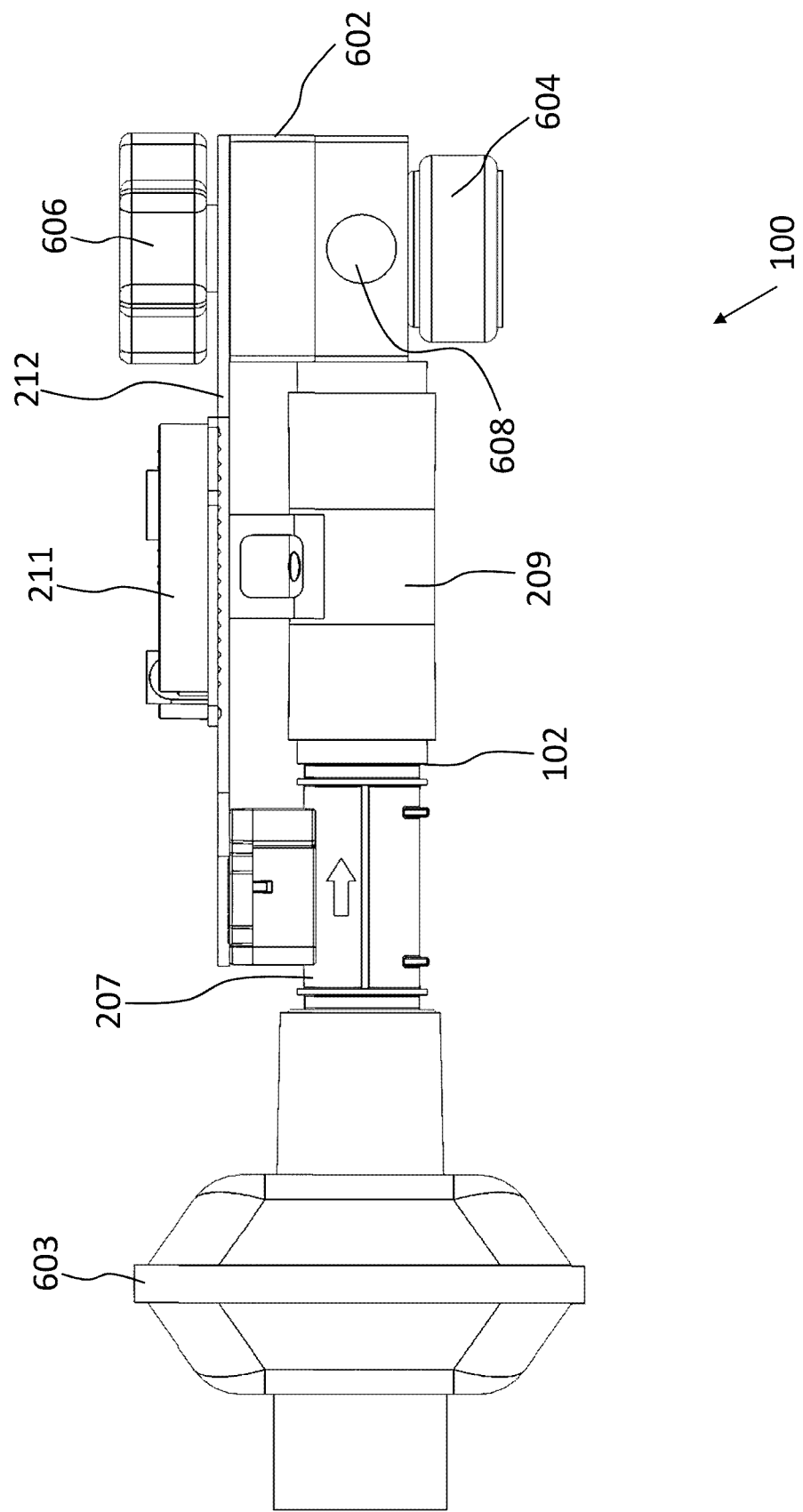
FIG. 6 is a side view of the device in a specific configuration, different to the configuration shown in FIG. 2, for performing nitric oxide concentration tests.
Figure 7:
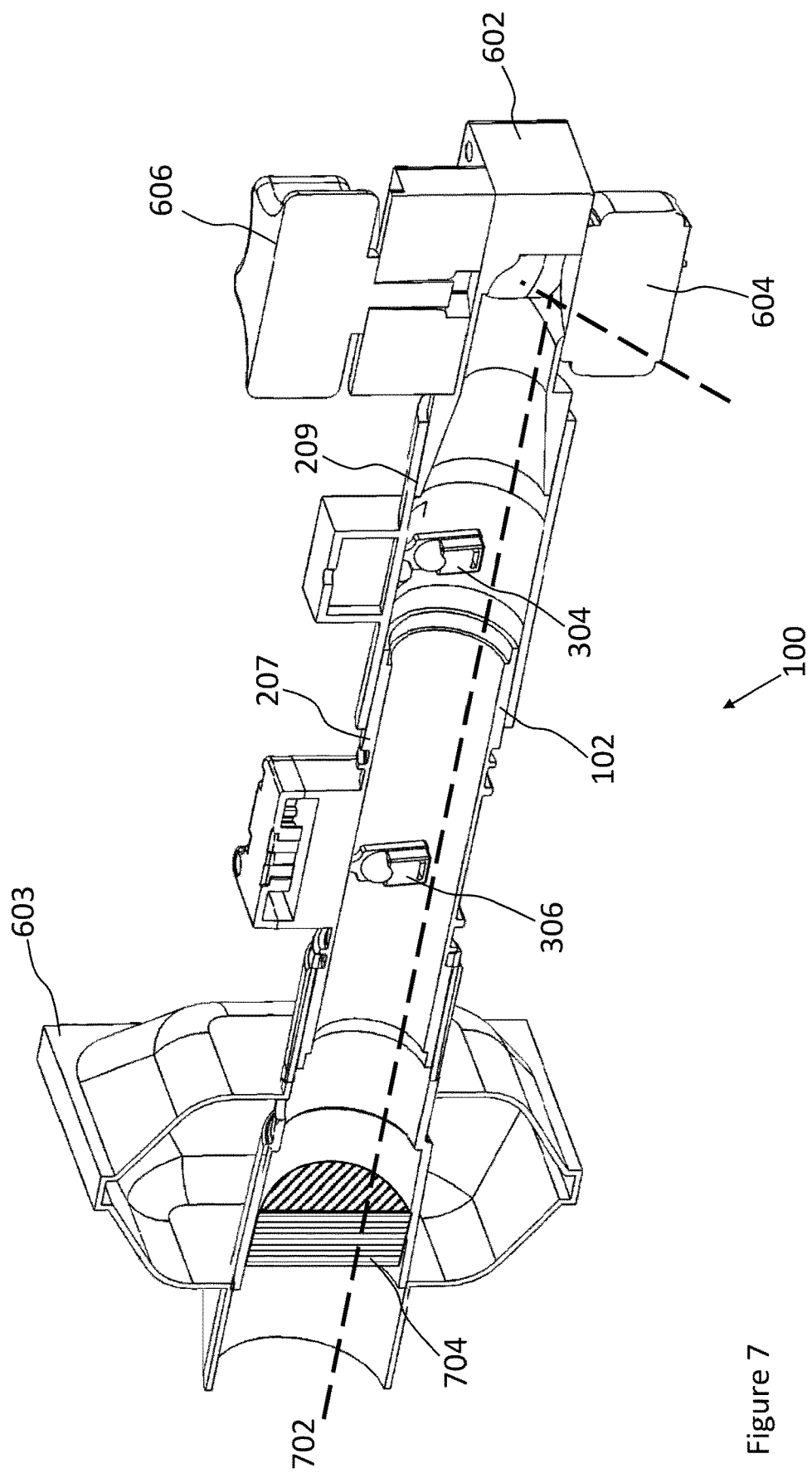
FIG. 7 is a cross-sectional view of the device of FIG. 6 showing the airflow channel that is formed through the device.

FIG. 6 is a perspective view showing the device 100 for performing a plurality of respiratory diagnostic tests in a second configuration for performing a second diagnostic test. In this case the spirometry component 202 is no longer engaged to the primary component 102. Instead the secondary component connected to the primary component 102 is a nitric oxide sensor module 602. FIG. 7 shows the second airflow channel 702 in this configuration.

In the second configuration the device is configured to perform a diagnostic test which involves measuring nitric oxide concentration in the exhaled breath. The second secondary component in this configuration is a nitric oxide sensor component 602. In this configuration the primary component 102 is the same as in the first configuration. The control circuitry 106 is also the same. The mouthpiece 603 is different to mouthpiece 204 in this embodiment of the device. The mouthpiece 603 comprises a gas drier 704 which the mouthpiece 204 does not comprise. In some other embodiments the same type of mouthpiece 204 may be used in both the first and second configurations. In these embodiments the gas drier 704 may be located in the nitric oxide sensor component 602.

At the bottom of the nitric oxide sensor component 602 is the nitric oxide sensor 604. The nitric oxide sensor 604 is an electrochemical sensor and is an AlphaSense NO-B4 which is available from Sensor Technology House 300 Avenue West, Skyline 120, Great Notley, Braintree CM77 7AA. The sensor contains an electronics board that establishes electrode voltages for electrochemical reactions within the sensor and amplifies the signal produced by the sensor. The concentration of exhaled nitric oxide is measured by the nitric oxide sensor 604. The measurement is received by the control circuitry. The nitric oxide sensor component 602 is in electrical communication with the control circuitry 106. The control circuitry 106 provides power and receives data from the nitric oxide sensor module 602 by an electrical connection. The nitric oxide sensor module has two outlet holes 608. Only one of these is visible in FIG. 6. In FIG. 7, the airflow channel 702 is shown to split in the nitric oxide sensor module as it passes through the outlet holes 608.

The nitric oxide sensor component 602 utilises an additional connection mechanism. The threaded knob 606 of the nitric oxide module 602 passes through the mounting plate 212 and into a guide in the nitric oxide module (not visible). The threaded knob 606 at the top of the device axially locates and secures the nitric oxide sensor component to the device. The electrochemical sensor is sensitive to its orientation relative to gravity and vibrations. The aligning guide and threaded knob 606 help ensure the central axis of the cylindrical sensor is aligned vertically, with the correct side upwards.

Nitric oxide concentration is used to indicate biological processes such as eosinophil activity. Eosinophil activity can be raised as part of the airway inflammation process. High exhaled nitric oxide concentration is used as an indicator for the subtype of a respiratory disease and probable response to inhaled corticosteroids. Exhaled nitric oxide concentration can be monitored over time to determine response to a treatment, anticipate attacks or exacerbations or periods of severe symptoms, determine if a subject is taking their prescribed treatment regularly and with good technique, and to titrate dosage of a treatment to a level that controls the subject's condition but without excess that is wasteful and can cause side effects.

The control circuitry 106, or a separate computing device, is configured for the exhaled nitric oxide test. This software configuration acquires data from the sensors used in this configuration, and displays data and calculated values for the subject's test. The software may also instruct the subject how to perform the test.

In the nitric oxide respiratory test, the subject exhales into the mouthpiece 204 at a slow and constant flow rate of about 50 mL/s±10% for a duration of 10 seconds for adults or 6 seconds for some children. The intention of this test is to measure nitric oxide that is produced from the distal airways. Distal airways are airways with a diameter of less than 2 mm. These airways contribute to gas exchange in the lungs and cause only a small portion of the total air flow resistance for breathing. Distal airways encourage laminar flow of air. Exhalation should be against a positive expiratory pressure, caused by an increased resistance to the exhaled flow in the device. The positive expiratory pressure ensures the nasal velum remains shut. The expiratory pressure should be at least 5 cm $H_2O$ to keep the velum shut but pressures above 20 cm $H_2O$ can be uncomfortable for the subject. Air in the nasal passages can have high concentrations of nitric oxide, which can contaminate the exhaled air from the lungs if the velum opens during the exhalation.

The gas drier 704 in the mouthpiece 603 acts as a flow resistor to increase the exhaled pressure above 5 cm $H_2O$ but keep it less than 20 cm $H_2O$. This contrasts with the spirometry configuration in which flow resistance is desirably as low as possible. The mouthpiece 603 may also comprise a microbe filter to avoid infections being passed from multiple subjects using the device. The microbe filter is not shown.

The exhaled flow rates are lower and therefore exhaled volumes of gas are smaller compared to the spirometry tests. Thus, there is an even greater need to minimize the unused volume or dead space volume within the flow channel 702. The gas drier 704 and microbe filter occupies space within the mouthpiece 603, thus reducing the internal volume of the flow channel 702. Exhaled air entering the nitric oxide sensor module 602 from the sensor assembly 304 flows parallel to the nitric oxide sensor 604. The nitric oxide sensor module 604 has two outlet holes, both at a right angles to the incident airflow channel 702, which are not visible in FIG. 7. Therefore, the nitric oxide sensor module 604 creates a T-junction in the airflow channel. In some embodiments, the nitric oxide sensor module 604 instead creates a Y-junction. This is the case when the two outlet holes are at acute angles to the incident airflow channel 702. A change in flow direction above the electrochemical sensor's sensing surface encourages mixing of the air and avoids stagnant zones of air near the surface membrane of the sensor. The outlet of the airflow channel 602 is preferably near to the nitric oxide sensor.

In another embodiment, the subject may exhale through their nose rather than their mouth at a constant rate to measure the concentration and rate of production of nitric oxide in the nasal passages. In this embodiment the mouthpiece is replaced with a nasal mask.

The nitric oxide sensor 604 is an electrochemical sensor. Electrochemical sensors use reactions in electrochemical cells to detect the presence of gases. The temperature, humidity and pressure of the environment can affect the physics of theses reactions. The rate of change of humidity and changes to pressure from the airflow can also affect the reactions. These changes to the reactions can change cause an inaccurate measurement of nitric oxide concentration.

Exhaled air contains a high moisture content, generally much higher than the ambient humidity of the air that was inhaled. As previously described, the mouthpiece 603 comprises a gas drier 704 which is formed of a moisture absorbent material. This absorbs moisture present in exhaled air and so avoids condensation forming on the flow sensor 306, the environmental sensors 208, and the nitric oxide sensor 604, which may cause errors in the measurements made by those sensors. The moisture absorbent material reduces the relative humidity of the air in the airflow channel 702 to be as close as possible to the relative humidity of the ambient environment.

In alternative embodiments of the device the absorbent material, microbe filter, and flow resistor may be positioned in a secondary component rather than in the mouthpiece.

The axial distances between the mouthpiece 106, flow sensor 306, environmental sensors 208, and nitric oxide sensor module 602 are minimised. Low axial distance between these components results in a low internal volume of the device and thus minimised wasted volume in the flow channel 702. An additional advantage of reducing the axial distance between the sensors is that this ensures the properties of the air are similar at each of the sensors at any given time.

When exhalation begins, the air pressure in the airflow channel 702 increases as a function of downstream resistance and flow rate. As the nitric oxide sensor has a cross-sensitivity to pressure and changes in pressure, the rate of change of pressure at the start of the exhalation should be minimized. Locating the nitric oxide sensor near the outlet minimizes the downstream resistance between the nitric oxide sensor and the outlet and thus minimizes the pressure transient and thus minimizes the nitric oxide sensor's response to the pressure transient.

The respiratory tract is divided into upper airways and lower airways. The upper airways include the nose and nasal cavity, the Pharynx and the Larynx. The lower airways include the Trachea, Primary Bronchi and Lungs. In tests such as the nitric oxide test it is the air from the lower airways that is important. When breathing out, the first 3 seconds of an exhalation may contain air from the upper airways mixed in with air from the lower airways. In some embodiments the control circuitry contains instructions to disregard this three second portion of the exhalation for nitric oxide concentration measurements. In other embodiments, a control valve could route different durations or portions of exhaled air towards or away from particular sensors within the device.

Figure 8:
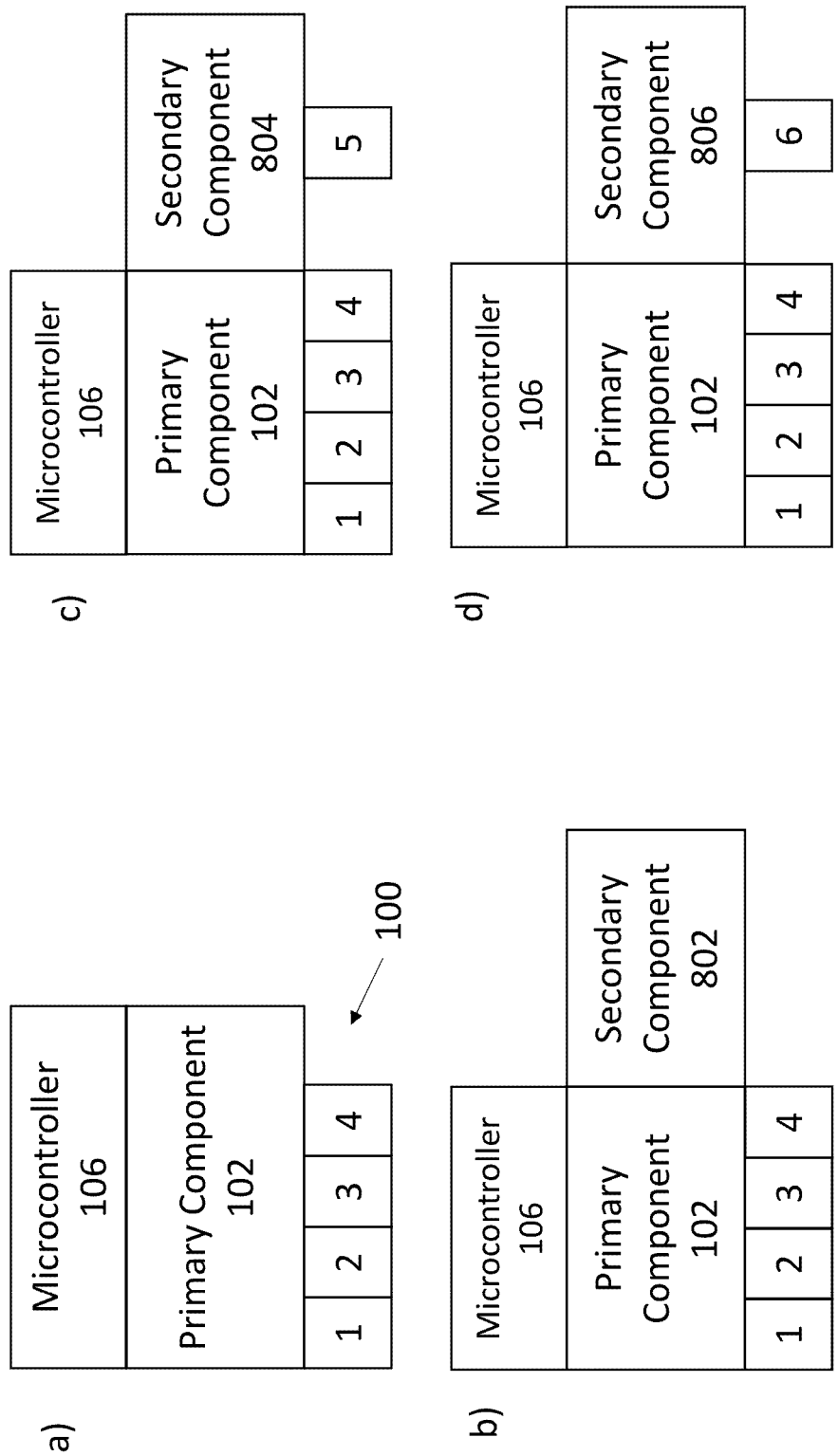
FIG. 8 is a series of schematics of general configurations of the device, similarly to FIG. 1 but also showing the sensors present and which component comprises the sensors.

It has already been described how the device 100 may have a plurality of configurations. FIG. 8 is a schematic of four different configurations of device, showing the components that form an airflow path in each of the configurations. FIG. 8 differs to FIG. 1 in that it shows the sensors that are found in each component. The sensors are shown generally as sensor number 1 to sensor number 6. Each of the sensors is different. In each configuration the primary component comprises the same four sensors 1 to 4. Secondary components may or may not comprise the additional sensors.

FIG. 8a shows the device 100 in a configuration where the airflow channel is formed through only the primary component 102. This configuration is the most basic configuration of the device. This configuration of the device can be used to perform spirometry tests. That configuration is described below in relation to FIG. 9. The primary component comprises sensors 1 to 4 which can be used to measure parameters of air in the airflow channel. The four sensors are a flow sensor, a temperature sensor, a humidity sensor and a pressure sensor. Each of the configurations of the device shown in FIG. 8 comprises the same primary component 102, and so comprises the same four sensors.

FIG. 8b shows how the device 100 can be configured differently, in this case in a different spirometry configuration. In this configuration, the secondary component 802 is connected to the primary component 102 such that the airflow channel is defined through the primary component 102 and secondary component 802. The device in this configuration can be used to perform spirometry tests and was described above in relation to FIGS. 2 and 3. The secondary component 802 does not comprise any sensors. The secondary component changes the airflow channel defined through the device, compared to the airflow channel that is defined through the device of FIG. 8a. Secondary component 802 may be equivalent to spirometry component 202 of FIGS. 2 and 3 and so may comprise air bypass holes that alter the airflow channel, for example. This configuration can also be applied for oscillometry tests, as will be described.

FIG. 8c shows another configuration of the device with secondary component 804, different to secondary component 802, connected to the primary component 102 such that an airflow channel is defined through the primary component 102 and secondary component 804. The device in this configuration can be used to perform a biomarker test, where the biomarker may be, for example, nitric oxide concentration. Such a test was described above in relation to FIGS. 6 and 7. Secondary component 804 comprises sensor number 5. In the case of the biomarker being nitric oxide concentration, sensor number 5 is a nitric oxide sensor equivalent to the nitric oxide sensor 604 of FIGS. 6 and 7 and secondary component 804 is a nitric oxide sensor module.

FIG. 8d shows another configuration of the device with secondary component 806, different to secondary component 802 or secondary component 804, connected to the primary component 102 such that an airflow channel is defined through the primary component 102 and secondary component 806. The device in this configuration can used to perform a test for a biomarker that is not nitric oxide, for example, the biomarker may be carbon dioxide. The secondary component 806 therefore differs to secondary component 804 in that it comprises a sensor for detecting carbon dioxide rather nitric oxide. Such a test is referred to as a capnometry test and is described in more detail below.

Figure 9:
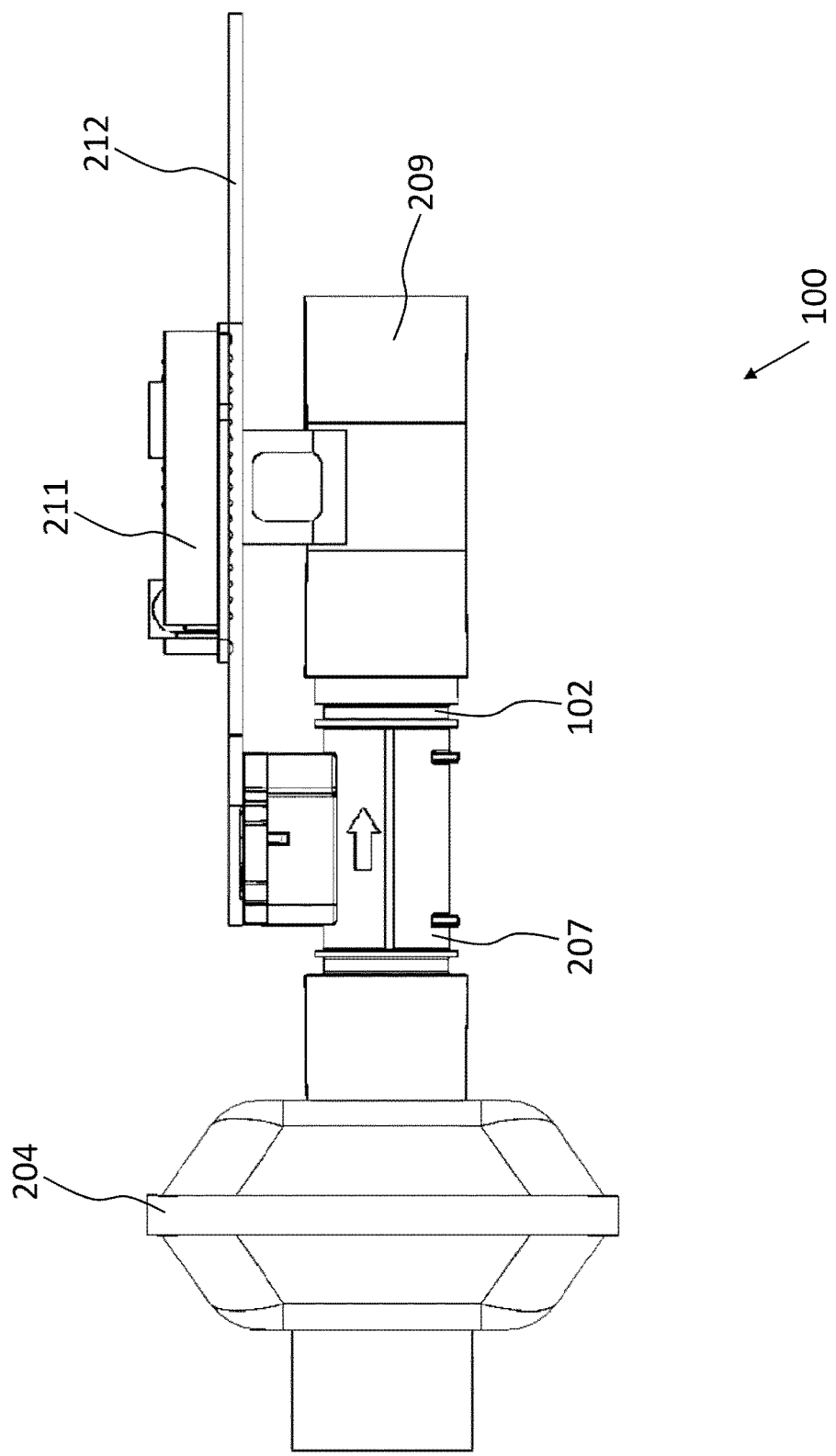
FIG. 9 is a side view of the device in a second spirometry configuration.

FIG. 9 is a device configured as in FIG. 8a for performing spirometry tests in an alternative embodiment to that shown in FIG. 2 and FIG. 8b. The device in this configuration has only the primary component, which comprises the flow sensor 306 and the control circuitry 106 which is connected to the mouthpiece 204. There is no spirometry component 202 and so there are no air bypass holes 210. Therefore, all the air passes the flow sensor 306. The same flow sensor is used as in the embodiment shown in FIG. 2 and so is designed with a range that is lower than the typical flow rates used in spirometry tests. In this embodiment the control circuitry 106 receives signals from a pressure sensor, which is one of the environmental sensors 208, and uses measurements from that sensor in combination with measurements from flow sensor 306 to generate a flow measurement which may be outside the normal range of the flow sensor 306, which is lower than the high flow rate of the spirometry tests as was described previously.

Figure 10:
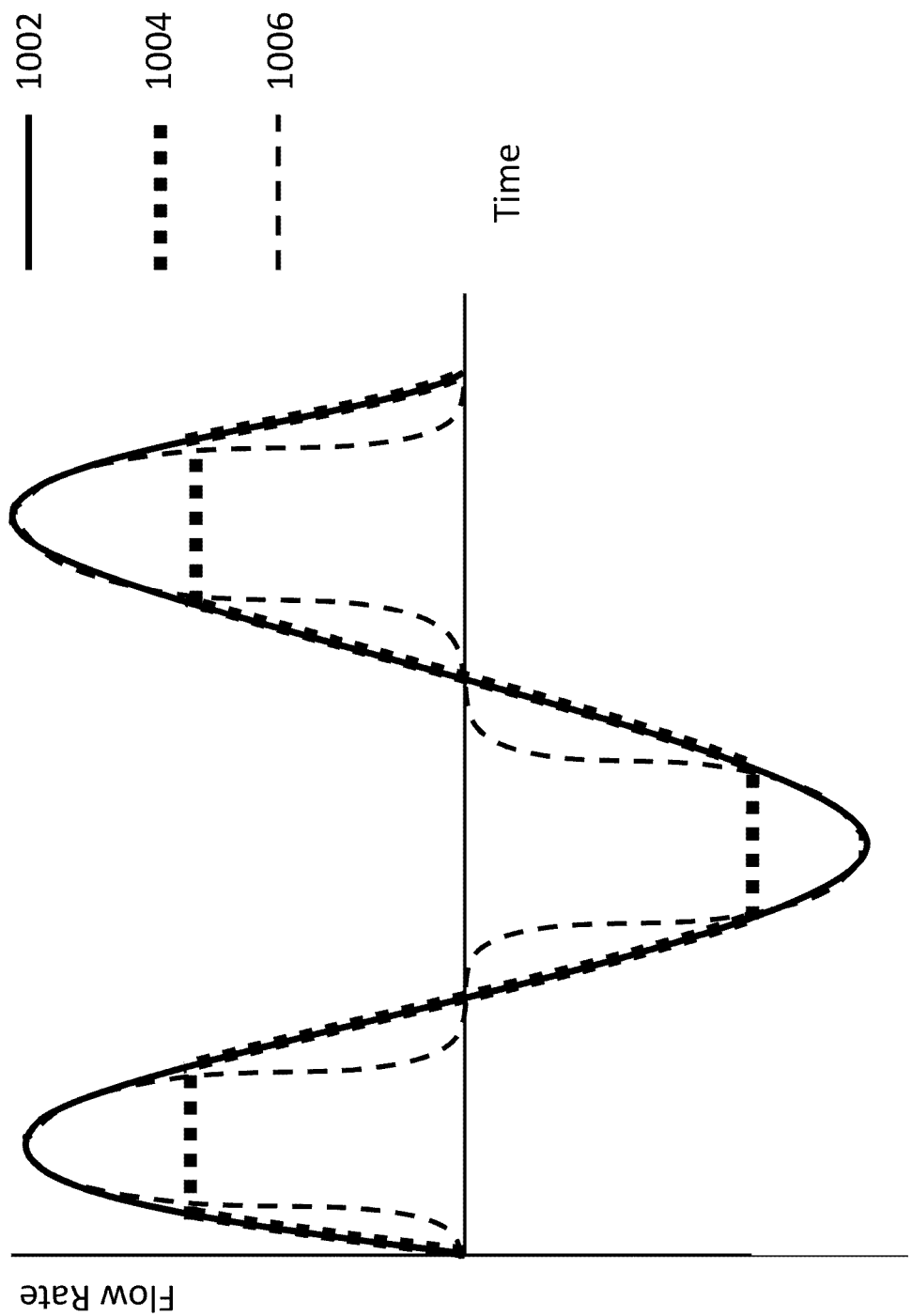
FIG. 10 is a graph showing flow measurements changing with time as measured a flow a sensor and a pressure sensor in comparison to the true value.

The control circuitry 106 uses measurements from the flow sensor 306 primarily for measuring low flow rates. The pressure sensor is used primarily for measuring high flow rates. FIG. 10 is graph showing how the signals from the flow sensor and the pressure sensor can be combined. The graph shows the flow rate of a subject performing a series of inhalation and exhalation breath maneuverers over time. The flow rate increases from zero to a peak flow rate and then decreases back to zero for each breath maneuverer. The true value is shown by 1002.

The flow rate as measured by the flow sensor is shown by 1004. For low flow rates the flow sensor is accurate and measurements of flow are close to the true value. However, once the flow rate goes above the maximum range of the flow sensor, the flow sensor is not able to then measure flow rate.

The flow rate as measured by the pressure sensor is shown by 1006. For low flow rates the pressure sensor is far less accurate than the flow sensor and tends to under-estimate the flow rate. However, as flow rates increase the accuracy of the pressure sensor increases. At flow rates above the maximum range of the flow sensor 306 the pressure sensor is able to reasonably accurately measure the flow rate and provide a value close to the true value.

The control circuitry is programmed to combine the measurements it receives from the flow sensor and the pressure sensor to give a measurement that accurately reflects the true flow rate. The combined measurement has the benefit of accuracy of the flow sensor at the low range with the extended range of the pressure sensor for higher flow rates. In other embodiments of the device humidity and temperature sensors can be used in addition to the pressure sensor to provide further measurements that can be used in the adjustment of the flow measurements to account for humidity and temperature conditions.

The spirometry configuration of FIG. 9 is an example of how the control circuitry can be configured to adjust measurements it receives from one of the sensors of the device that can form a metric for one of the respiratory diagnostic tests using other measurements or signals received from another sensor or sensors. The microprocessor is programmed with various models which describe how a system behaves given certain inputs. This may include different models for each of the different configurations. It can use these models to adjust a measurement which might be inaccurate.

The nitric oxide concentration test described previously also uses an adjustment process. One of the limitations when performing the nitric oxide concentration tests is the cross-sensitivity of the electrochemical sensor 604 and how much this is affected by changes in ambient environmental conditions. A device configured for performing the nitric oxide concentration test was described in relation to FIGS. 6 and 7. A gas drier 704, is used to reduce the effects of environmental conditions on measurements taken by the nitric oxide sensor 604. However, the control circuitry 106 may be programmed to be able to further adjust the measurement from the nitric oxide sensor 604 using measurements from sensors measuring environmental conditions, namely pressure, temperature, and humidity.

Exhaled breath has relative humidity near 100%, which is higher than typical ambient environmental relative humidity.

The exhaled air replaces ambient air at the surface of the electrochemical sensor and so there is a high rate of change of relative humidity experienced by the surface of the nitric oxide sensor 604. This rapid change in humidity causes the electrochemical sensor to output a response which cannot be easily separated from the response caused by a change in the concentration of nitric oxide. As such, the measurement will be inaccurate.

The humidity sensor measures the moisture content of air passing over it. The control circuitry 106 receives the measurements from both the humidity sensor and the nitric oxide sensor 604. The control circuitry 106 is programmed with models of the behaviour nitric oxide sensor 604 and its response to different environmental conditions. It uses those models to calculate the true nitric oxide concentration by compensating for the portion of the nitric oxide sensor's signal that can be attributed to the rate of change of relative humidity. The nitric oxide sensor also has a sensitivity to rates of change of pressure, temperature and flow. In some embodiments the measurements from the electrochemical sensor are further compensated by the control circuitry 106 using measurements of pressure, temperature and flow with a more complex model programmed into the control circuitry 106.

Figure 11:
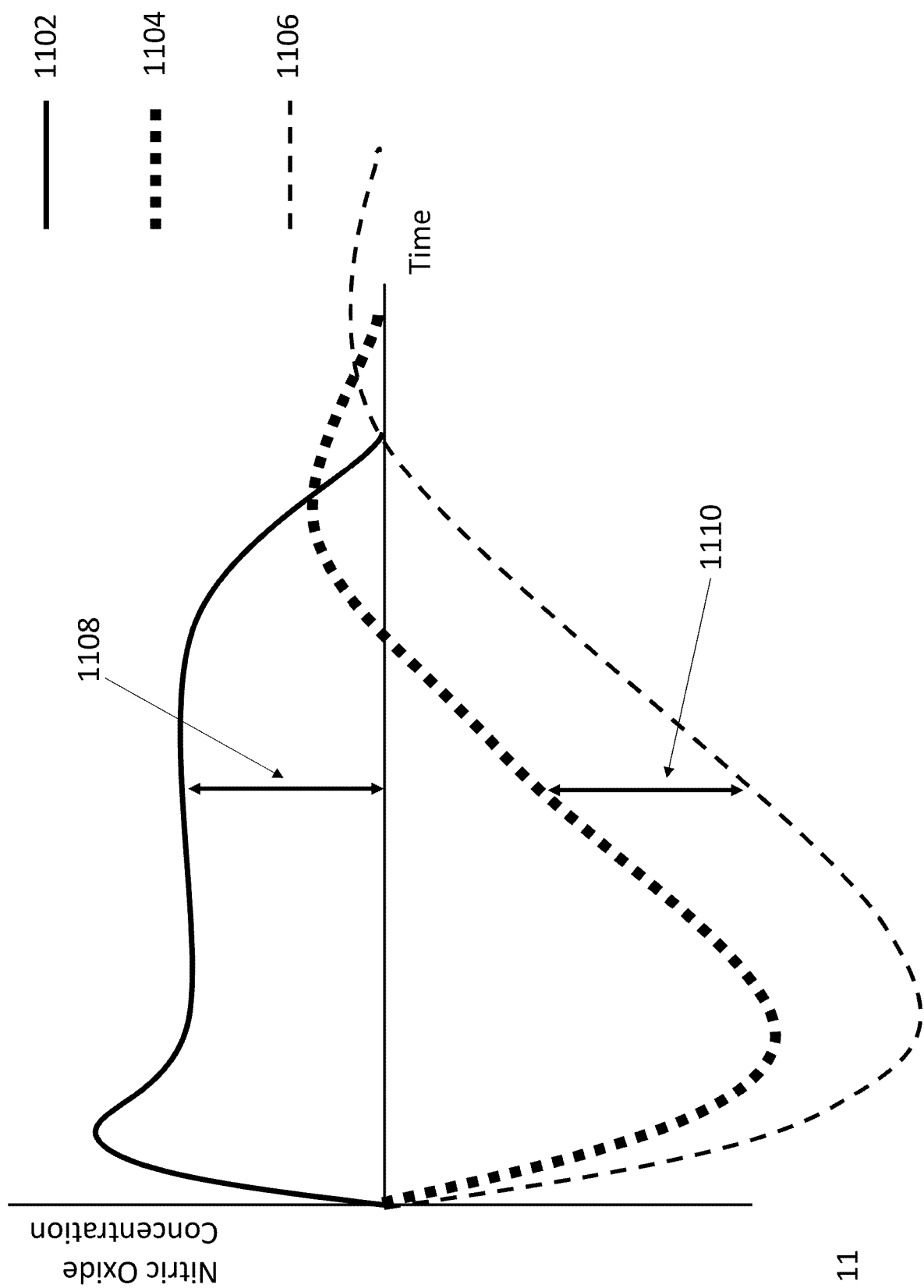
FIG. 11 is a graph showing nitric oxide concentration as measured by a nitric oxide sensor in comparison to the true value, it also shows the negative rate of change of relative humidity.

FIG. 11 is a graph showing the adjustment of the signal from the nitric oxide sensor to achieve a more accurate measurement nitric oxide concentration. Line 1102 shows the true nitric oxide concentration and how it changes over time. Line 1104 shows the measured nitric oxide taken directly from the electrochemical sensors. These measurements are inaccurate and fall far below the true values. 1106 shows a relative humidity adjustment factor that is calculated as the negative rate of change of the humidity as a percentage. Subtracting the value of line 1106 from the value of line 1104 results in an adjusted signal that is much closer to the true value 1102. This subtraction is demonstrated by lines 1108 and 1110 which are of equal height. In some embodiments temperature, pressure and flow adjustment factors can be calculated and subtracted from the measured nitric oxide concentration 1104 too.

The adjustment process will now be described generally. The control circuitry may receive a measurement of parameter A from a first sensor, which is the parameter of interest and which may be used to form a metric which can be used in the monitoring or diagnosis of a respiratory disease. The measurement of parameter A may have limitations, particularly with respect the accuracy of the measurement. Parameter B may be used to account for these limitations in a model stored in the control circuitry. Parameter B may be an environmental parameter such as temperature, pressure or humidity. A sensor is used to measure parameter B which is received at the microprocessor. Parameter B is generally measured by a second sensor. However, in some embodiments parameter B may be calculated from the measurement of parameter A. For example, parameter B may be the rate of change of parameter A and is calculated by the microprocessor. The adjustment improves accuracy and repeatability of measurements of parameter A. In some cases a linear model is used, in others a more complex non-linear model is more accurate.

There could be any number of additional parameters (parameter C, parameter D etc.) that the accuracy of the measurements of parameter A dependent on. Each of these parameters may also be measured. The model that the microprocessor is programmed with includes these additional parameters and so the measurement of parameter A can be adjusted based on any or all of the dependent parameters. In many embodiments and configurations of the device there will be more sensors than parameters measured, it is not a requirement that all sensors are used. Sensors can switched on and off by the control circuitry as required.

In each configuration of the device 100 a subset of sensors is used to measure the relevant parameter A and any subsequent parameters that are required in the adjustment of parameter A.

It is beneficial that subsets of sensors in different configurations share sensors as it reduces the total number of sensors that are required. One sensor can be used in more than one test. If the various tests were being performed by separate devices then sensors that exist in both subsets would need to be duplicated. Having one device, being configurable to perform multiple tests, allows for the sharing of sensors and so leads to a reduction in total number of sensors required to perform the same number of tests.

The subsets of sensors used in the configurations of the device so far described will now be summarised.

The first spirometry configuration, as shown in FIGS. 2 and 3 as well as being represented by FIG. 8b, has a subset of sensors comprising only a flow sensor.

The second spirometry configuration, as shown in FIG. 9, as well as being represented by FIG. 8a, has a subset of sensors generally comprising a flow sensor and a pressure sensor and the control circuitry is configured to use measurements of to adjust measurements of flow in order to make high flow measurements. In some embodiments of the second spirometry configuration, the subset of sensors may also comprise a temperature and a humidity sensor. The control circuitry is configured to use measurements of temperature and humidity to adjust the measurements of flow.

The nitric oxide concentration configuration, as shown in FIGS. 6 and 7, as well as being represented by FIG. 8c, has a subset of sensors generally comprising a nitric oxide sensor, a pressure sensor, a temperature sensor and a humidity sensor wherein the control circuitry is configured to use measurements of pressure, temperature and humidity to adjust the measurements of nitric oxide concentration. The subset of sensors may also comprise a flow sensor and the control circuitry is configured to use measurements from the flow sensor to adjust measurements made by the nitric oxide sensor.

The flow sensor is common to the subsets of sensors of both the first and second spirometry configurations. The flow sensor is also common to the subset of sensors of the nitric oxide concentration configuration in embodiments that use flow measurements to adjust nitric oxide concentration measurements made by the nitric oxide sensor.

The pressure sensor is common to the subsets of sensors of both the second spirometry configuration and the nitric oxide concentration configuration.

The temperature and humidity sensors are common to both the nitric oxide concentration and embodiments of the second spirometry configuration that use temperature and humidity sensors to adjust flow measurements made by the flow sensor.

Each of the configurations of the device so far described shares sensors with each of the other configurations.

Figure 12:
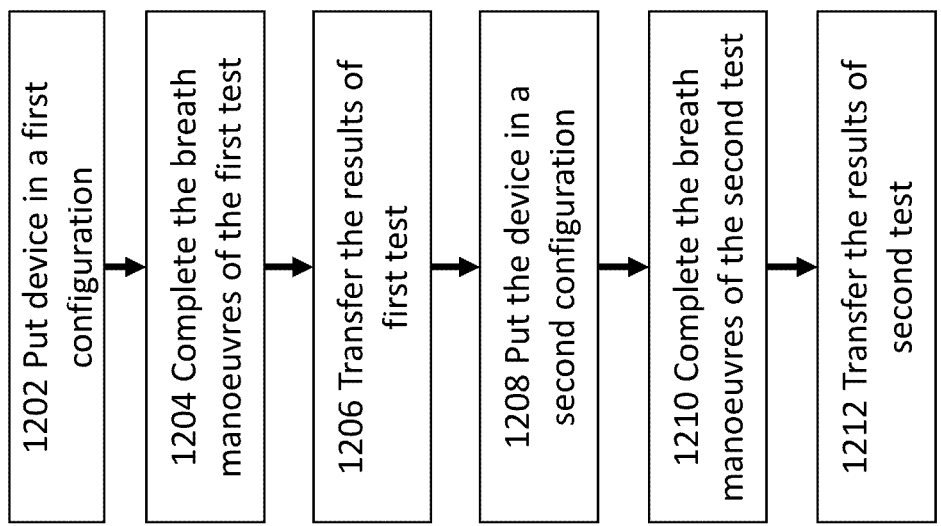
FIG. 12 is a flow chart outlining a method for using the device according to the invention.

An example method for using the device 100 will now be described with reference to relation to FIG. 12. FIG. 12 is a flow chart of the method of use of the device. At step 1202 the device is placed in a first configuration. The first configuration may be the spirometry test configuration shown in FIG. 2. A mouthpiece 204 is connected to the spirometry component 202, for a subject to breathe into. A new mouthpiece is used for each individual subject of the device. Only the sensors that are required need be switched on. The switching on and off of sensors is managed by the control circuitry. In some embodiments the control circuitry can detect which configuration the device is in and automatically switch on the correct sensors, in other embodiments a subject input indicates the configuration to the control circuitry.

At step 1204 the subject completes breath manoeuvres through the device in the spirometry configuration. In some embodiments, the control circuitry indicates to the subject what these manoeuvres should be. However, a trained medical professional may instruct the subject. Alternatively, an instruction manual may be provided. These breath manoeuvres include forced exhalation. Measurements of flow are received at the control circuitry 106 from the flow sensor 306. As the device is in the configuration with the spirometry component 202, the control circuitry 106 will adjust the measurements such that they are scaled up to account for the airflow lost through the air bypass holes 210, as previously described.

At step 1206, after completion of the breath manoeuvres, the control circuitry outputs the results of the spirometry test. This may be done by wireless data transfer to a smart phone or computer, for example. The wireless data transfer may be over Bluetooth. In some embodiments a display may be fitted into the device itself which displays the results of the test. In some embodiments software either stored in the control circuitry or on a computer or portable device that may be used to process the results of the test and provide a simplified test score or result. In some embodiments the results of the test may be stored to maintain a record of past tests. This record of past tests can be used in a diagnosis process and to monitor changes in a subject's health over time.

At step 1208 the device is placed in a second configuration. The second configuration may be the nitric oxide test configuration shown in FIG. 6. To achieve this configuration the spirometry component 202 is disconnected from the primary component 102. The mouthpiece 603 is then connected to the primary component 102 in the position that the spirometry component 202 was connected. At the other end of the primary component 102, the nitric oxide sensor module 602 is connected. This defines an airflow channel through the mouthpiece 204, the primary component 102 and into the nitric oxide sensor module 602. In this configuration the control circuitry switches on the nitric oxide sensor 604, the flow sensor 306 and the environmental sensors 208 which includes pressure, temperature and humidity sensors.

At step 1210 the subject completes breath manoeuvres through the device 100 in the nitric oxide concentration test configuration. Again, in some embodiments the control circuitry 106 indicates to the subject what these manoeuvres should be. However, a trained medical professional may instruct the subject. Alternatively, an instruction manual may be provided. These breath manoeuvres include slow inhalation and exhalation. Measurements of nitric oxide concentration are received at the control circuitry 106 from the nitric oxide sensor 604. The control circuitry 106 will adjust the measurements of nitric oxide concentration using measurements from the flow sensor, pressure sensor, temperature sensor and/or humidity sensor to account for the cross-sensitives of the nitric oxide sensor 604.

At step 1212, after completion of the breath manoeuvres, the control circuitry may output the results of the nitric oxide test. This may be done by wireless data transfer to a smart phone or computer, for example. The wireless data transfer may be over Bluetooth. In some embodiments a display may be fitted into the device itself which displays the results of the test. In some embodiments software, either stored in the control circuitry/microcontroller or a computer or portable device, may be used to process the results of the test and provide a simplified test score or result. In some embodiments the results of the test may be stored to maintain a record of past tests. This record of past tests can be used in a diagnosis process and to monitor changes in a subject's health over time.

The results of the spirometry test and the NO test may be presented together or in some combined form to aid diagnosis and monitoring of a particular respiratory diagnostic disease.

To demonstrate that the device is configurable to perform a plurality of respiratory diagnostic tests, spirometry and nitric oxide tests have been used as examples of respiratory diagnostic tests the device can be configured to perform. An example of another test that the device may be configured to perform is an oscillometry test which is another diagnostic test which can help to diagnosis of respiratory diseases such as COPD.

Figure 13:
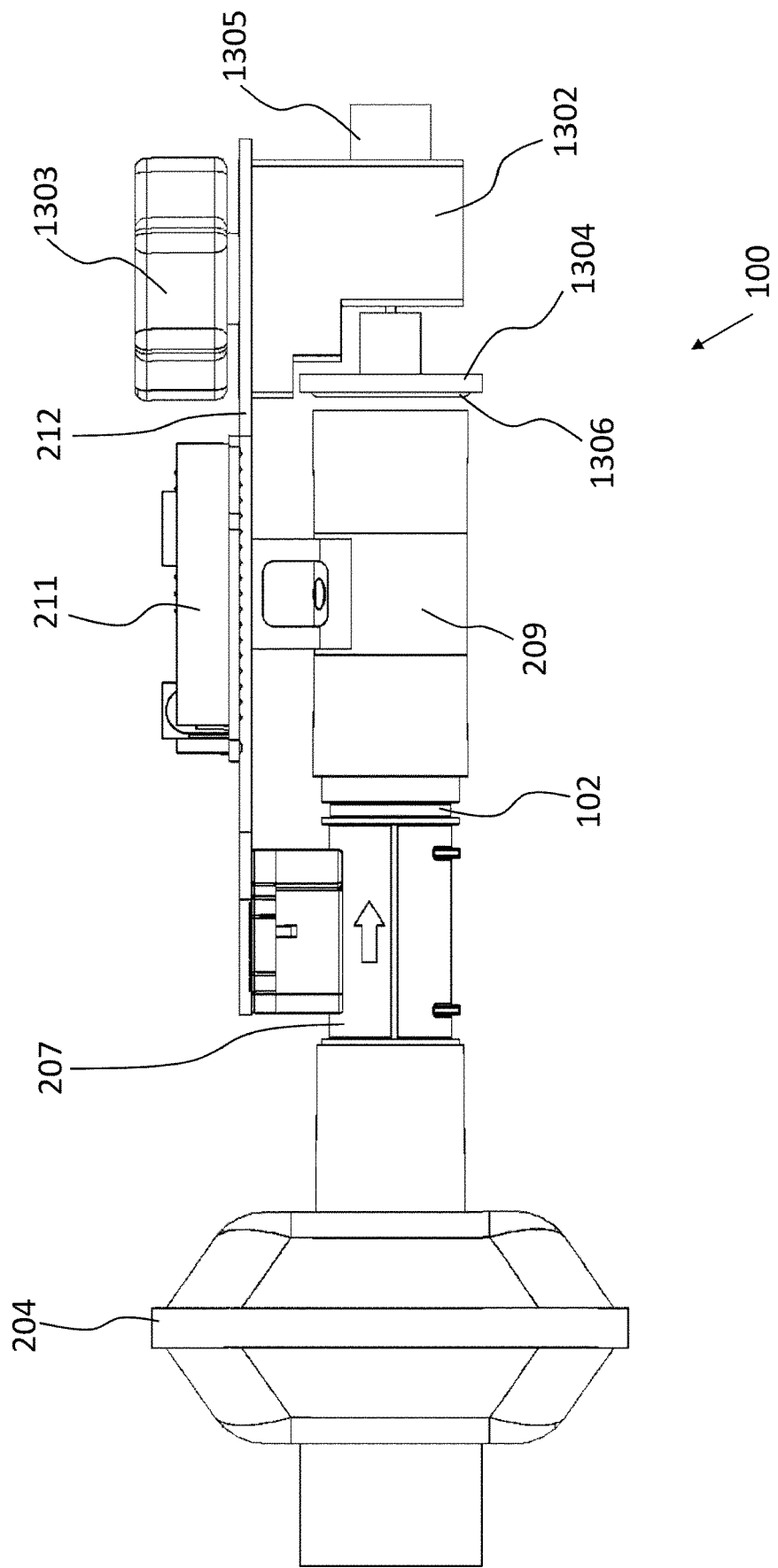
FIG. 13 is side view of the device in a different configuration, for performing oscillometry tests, the device in this configuration comprising an occluder wherein the occluder is in a first position.

Oscillometry tests are used to indicate mechanical properties of the airways of the subject. The device in the oscillometry configuration is shown in FIG. 13.

In the oscillometry configuration the device comprises the primary component 102 with the microcontroller 106. The primary component 102 is connected to a mouthpiece 204 on a first side and to a secondary component on a second side.

The secondary component is an oscillometry module 1302. In order to connect the oscillometry module 1302 to the primary component 102 through the mounting plate, the secondary component comprises a threaded knob 1303 which passes through the mounting plate 212 of the primary component 102 and screws into the secondary component. This robustly and repeatably aligns the secondary component with the primary component.

The oscillometry module 1302 comprises an occluder 1304 and a means to move the occluder 1305. The means to move the occluder is a linear actuator. The occluder can have a diameter of about 40 mm. The means to move the occluder can have a stroke length of about 9 mm. The occluder comprises an O-ring 1306. The oscillometry module 1302 is in electrical contact with the primary component 102. This means that signals can be sent and received from the microcontroller 106 in the primary component to the oscillometry module 1302.

Figure 14:
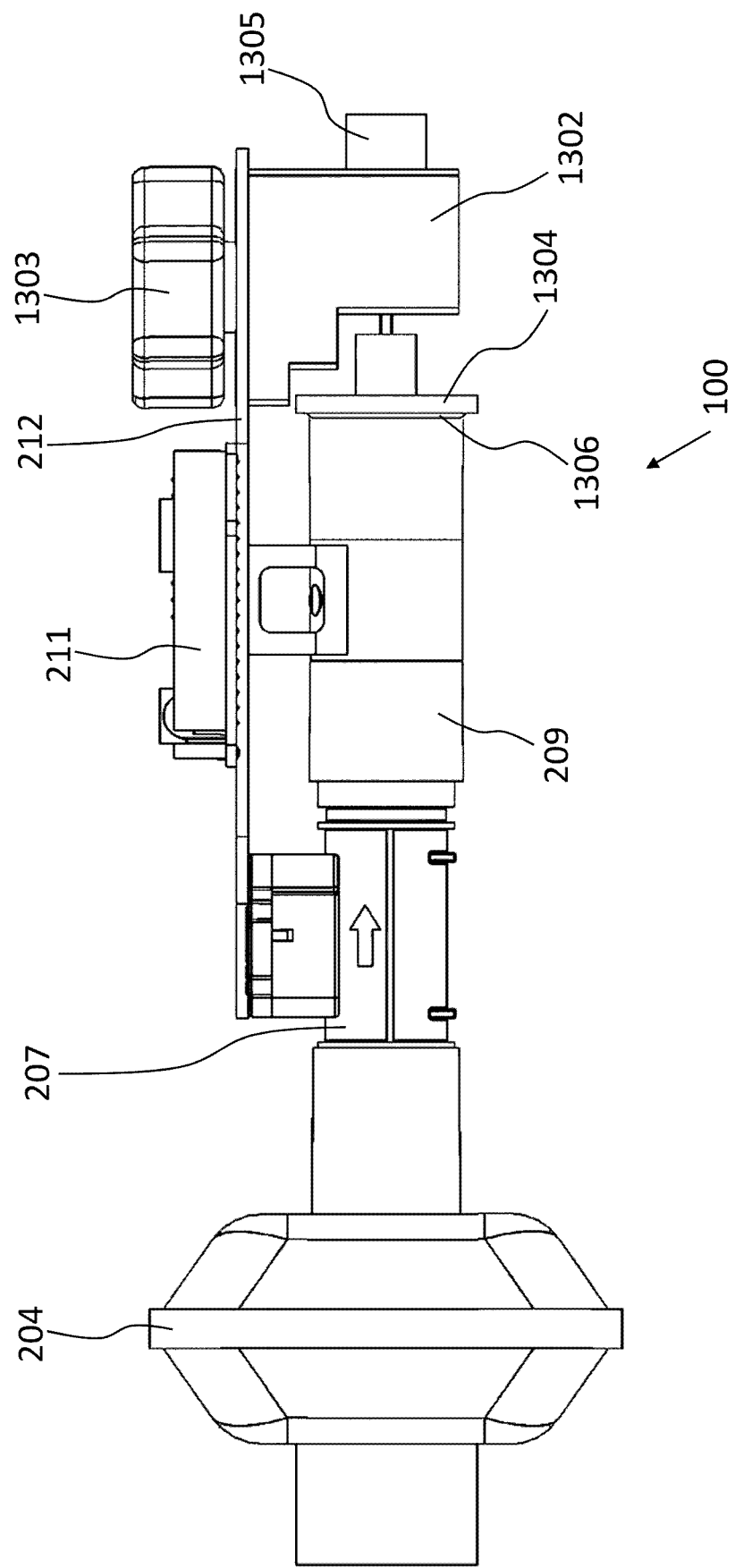
FIG. 14 is the same side view of the device of FIG. 13, the occluder of the device is in a second position.

FIG. 14 is the same side view of the device 100 as FIG. 13, but showing the occluder 1304 in the second position rather than in the first position. In FIG. 14, the O-ring 1306 of the occluder 1304 is shown to be in contact with housing 209 of the primary component 102.

The microcontroller 106 can send signals to the linear actuator causing it to move the occluder 1304 from the position shown in FIG. 13, which is the first position, to the position shown in FIG. 14, which is the second position. Power can also be transferred to the oscillometry module 1302 through the electrical contact. This provides power to the linear actuator that can be used to move the occluder between the first and second position. The force of the linear actuator may cause vibrations through the device that cause the oscillometry module 1302 to move relative to the primary component 102. The use of a threaded knob 1303 to connect the oscillometry module to the primary component 102 reduces this movement.

In some embodiments of the device the oscillometry module 1302 comprises a battery in addition to the power source powering the control circuitry of the primary component 102. The power requirements of a linear actuator, such as a solenoid, are higher than what many small batteries are able to produce. By having an additional battery located in the oscillometry module 1302, the power supplied to the linear actuator can be increased to the required level.

The O-ring 1306 prevents damage to the housing 209 or the occluder 1304 when the occluder is moved from the first position to the second position. In many embodiments of the device, when the occluder is in the second position, the O-ring 1306 is not in contact with the housing 209. Instead there is a gap between the housing 209 and the O-ring 1306 of at least 0.5 mm. However, in all embodiments the occluder 1304 will be closer to the housing 209 in the second position compared to the first position.

Figure 15:
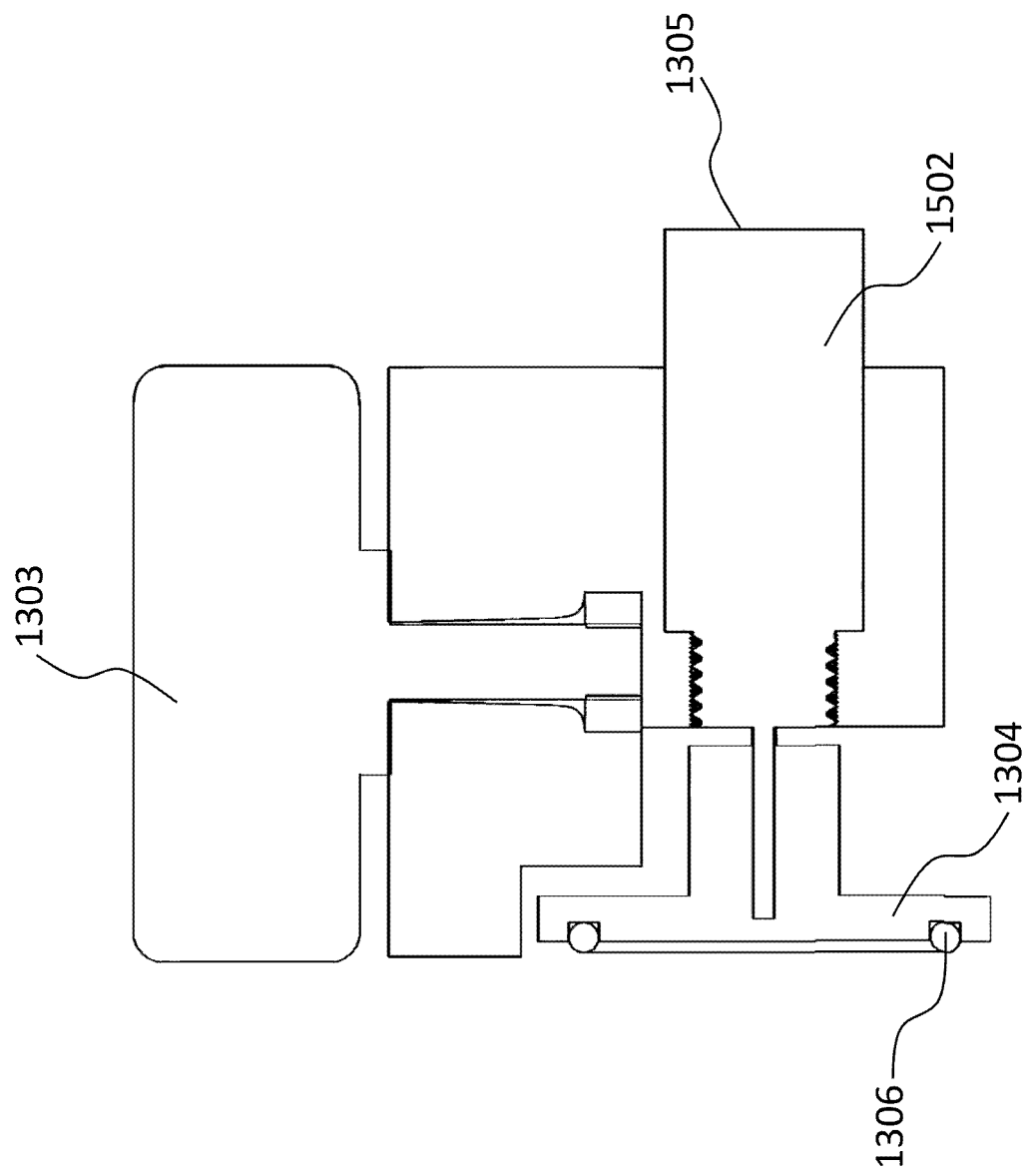
FIG. 15 is a cross-sectional view of the oscillometry module of FIGS. 13 and 14, showing the linear actuator that moves the occluder from the first position to the second position, shown in FIGS. 13 and 14 respectively.

FIG. 15 is a cross-sectional view of the oscillometry module 1302 in isolation from the rest of the device 100. The linear actuator 1305 comprises a main body 1502 and a solenoid. The linear actuator is a Johnson Electric Model 51 STA Push DC Tubular Solenoid or a Mecalectro Solenoid Latching—8.MBO.AA.29, both available from RS components at: uk.rs-online.com/web. When a first voltage is applied to the solenoid of the linear actuator a force is applied to the occluder 1304 such that the occluder moves from the first position to the second position. When the power supply is switched off the occluder 1304 will move back to the first position. This may be due to a biasing spring or magnetic return system, not shown. In some embodiments the linear actuator is a push-pull linear actuator. In these embodiments the occluder is returned to the first position by forces applied by the linear actuator when a voltage of different polarity to the first voltage is applied to the linear actuator.

The control circuitry 106 is configured to cause the linear actuator 1305 to move the occluder 1304 from a first position to a second position and back to a first position again at least 3 times each second during a testing period. Creating multiple acoustic impulses throughout a test allows a full picture of the airways and shows how the airways changes throughout the duration of a breath.

Figure 16:
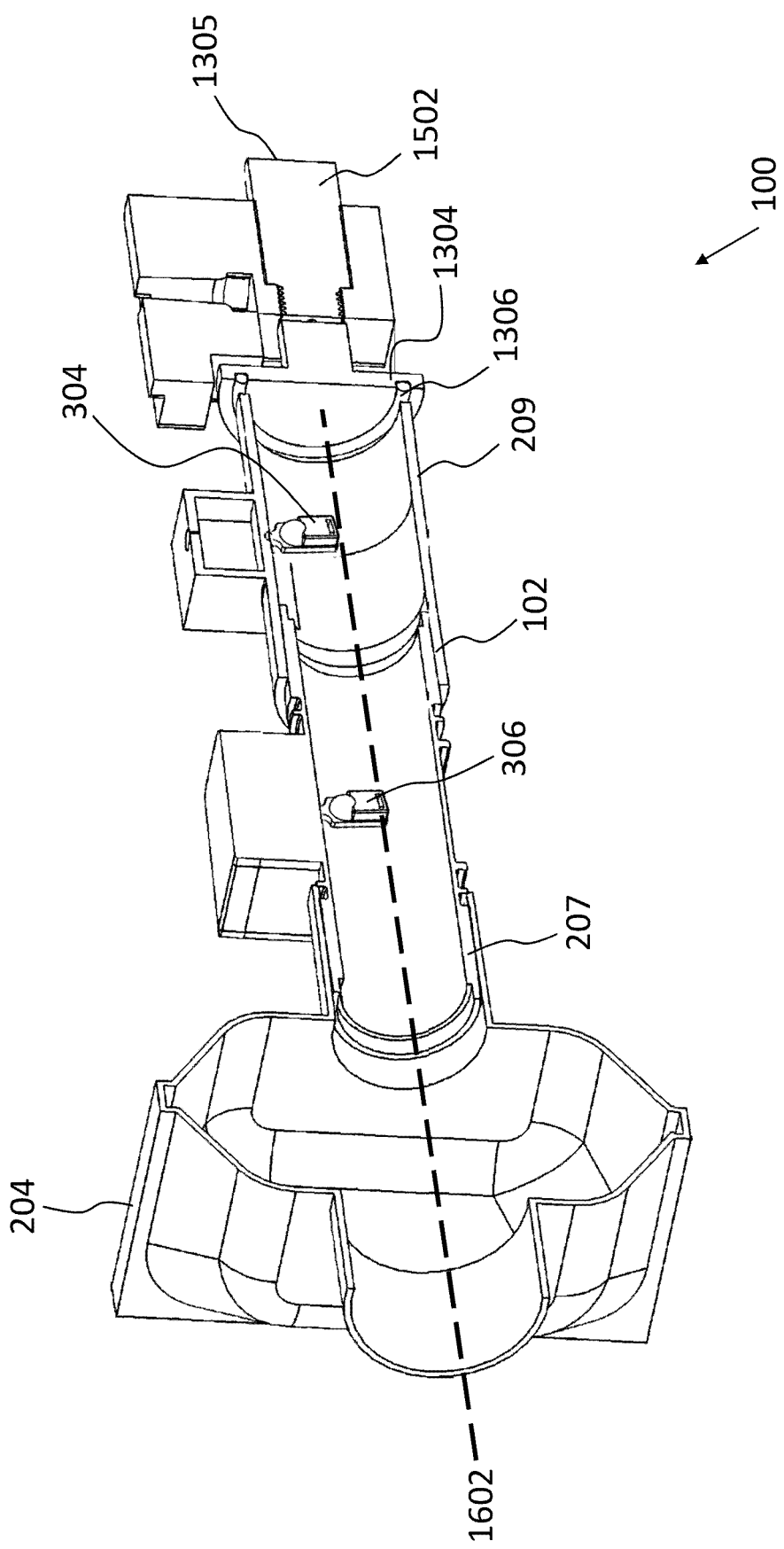
FIG. 16 is a cross-sectional perspective view of the device of FIG. 13, showing the airflow channel that is defined through the device.

FIG. 16 is a cross-sectional perspective view of the device 100. FIG. 16 shows the airflow channel represented by dotted line 1602 through the device 100. The airflow channel is defined through the mouthpiece 202 and housing 207 and 209 of the primary component 102. The airflow channel 1602 terminates at an air outlet. The air outlet is at the end of housing 209 nearest the occluder 1304. If the direction of flow of air in the airflow channel is toward the mouthpiece then the air outlet is instead an air inlet. In either case, the air outlet or air inlet are the same thing and positioned at the end of housing 209 nearest the occluder 1304. The direction of movement of the occluder from the first position to the second position is parallel to the airflow channel.

If, when the occluder is in the second position the O-ring 1306 is in contact with the housing 209, then the airflow channel 1602 is sealed at the outlet. In this case, air cannot escape the outlet from the airflow channel when the occluder is in the second position.

However, when the occluder is in the second position the O-ring 1306 may not be in contact with the housing 209 and there may be a gap of at least 0.5 mm between the O-ring 1306 and the housing. The airflow channel is then not sealed at the outlet. In this case, air can escape the outlet from the airflow channel when the occluder is in the second position.

FIGS. 3, 7 and 16 show cross-sectional perspective views of the device 100 in different configurations for performing different respiratory diagnostic tests. In these figures, the flow sensor 306 and the sensor assembly 304 have been shown as two separate components at different positions in the airflow channel. However, the positions of the flow sensor 306 and the sensor assembly 304 are not required to be in the positions as shown in the figures. Furthermore, the sensor assembly 304 may actually comprise a number of different sensors positioned along the airflow channel. For example, in the oscillometry configuration, time-variant signals from the pressure sensor and the flow sensor are used to calculate a result. So it is advantageous for the pressure sensor to be located as close as possible to the flow sensor 306 in the flow channel. In the configuration for measuring nitric oxide concentration in the exhaled breath, the measurements of nitric oxide are dependent on humidity. In that case it is advantageous for the humidity sensor to be positioned at the distal end of the airflow channel, away from the mouthpiece and as close to the nitric oxide sensor 604 as possible.

Figure 17:
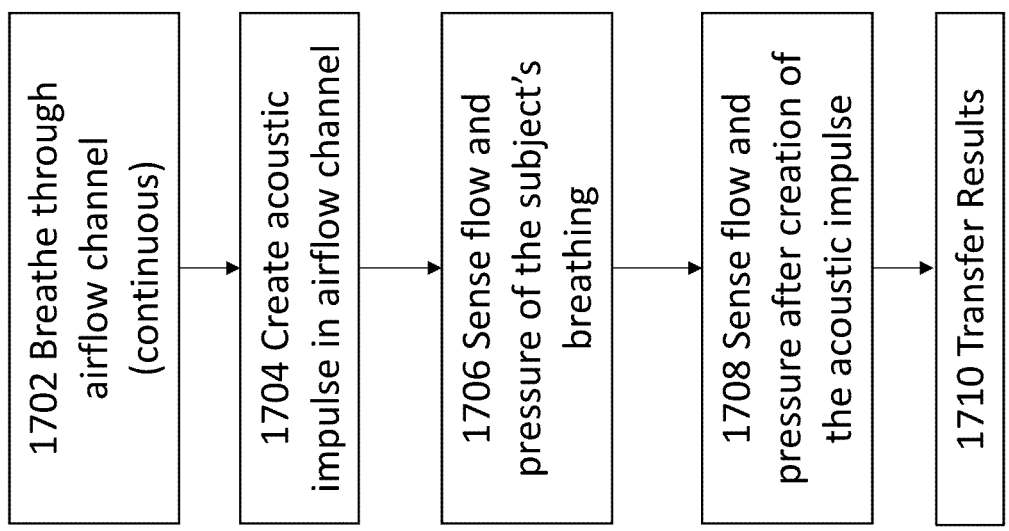
FIG. 17 is a flow chart showing a method of using the device of FIG. 1 to perform an oscillometry test.

A method for using the device in the oscillometry configuration, in order to perform an oscillometry test, will now be described in relation to FIG. 17. At step 1702 the subject breathes through the device. The breathing required is continuous, constant breathing or normal, tidal breathing. Preferably, a subject breathing into the device uses a nose clip. Clipping the nose can improve the results of the oscillometry test. The subject continues to breathe through the device for the duration of the test. The subject breathes in and out through the mouthpiece 204 of the device. The subject's breath will pass in and out of their airways, through the airflow channel 1602. As the subject inhales, air will enter the airflow channel 1602 through the air inlet, positioned at the end of housing 209 nearest the occluder 1304. As the subject exhales, air will exit the airflow channel out through the air inlet, which is now considered an air outlet.

In some embodiments, the subject may only breathe in through the device 100. In these embodiments air enters the device through the air inlet, passes through the airflow channel 1602 toward the mouthpiece 204 and into the subject's airways. The subject would then breathe out directly into the atmosphere and so exhaled breath would not pass through the airflow channel 1602 of the device.

In some embodiments, the subject may only breathe out through the device 100. In these embodiments the subject would breathe in air directly from the atmosphere. The subject would then exhale through the mouthpiece 204 of the device 100. The exhaled breath would pass through the airflow channel 1602 of the device 100 and out of the air inlet.

At step 1704 an acoustic impulse is created in the air in the airflow channel. The acoustic impulse is created when the occluder 1304 is moved from the first position to the second position by the linear actuator 1305. The direction of movement of the occluder 1304 from the first position to the second position is in the direction of the mouthpiece 204. This movement has the effect of pushing the air in the airflow channel 1302 in the direction of the mouthpiece 204. The result of the push of air is an impulse of increased flow that passes through the airflow channel 1302 in the direction of the mouthpiece. The occluder is moved by the linear actuator 1305 with enough force that the push on the air in the airflow channel 1602 results in increased flow of at least 0.15 litres per second in the direction of the mouthpiece.

The flow impulse that passes through the airflow channel results in a pressure transient which has an amplitude of at least 50 Pa. The acoustic impulse travels through the airflow channel 1602 and into the airway of the subject resulting in changes in the pressure and flow rate of the air passing the sensor. As the acoustic impulse progresses it experiences damping. This causes a reduction in the amplitudes of pressure and flow. A flow rate increase of 0.15 litres per second and a pressure increase of 50 Pa in the direction of the mouthpiece is enough to provide a significant and measurable response.

The acoustic impulse is made up of sinusoidal pressure fluctuations having frequencies between 5 Hz and 20 Hz.

At the end of step 1704, after the acoustic impulse has been created, the occluder is returned to the first position.

The resistance to flow will be higher when the occluder 1304 is in the second position than when the occluder is in the first position. While the occluder is in the second position, the higher resistance may cause the pressure in the airflow channel 1602 to change. The change in pressure may affect the characteristics of the acoustic impulse. Both the length of time that the occluder is in the second position for and the configuration of the occluder may affect the amount the pressure changes in the airflow channel and so the characteristics of the acoustic impulse. The configuration of the occluder refers particularly to the amount to which the occluder increases the resistance to flow when the occluder is in the second position compared to when it is in the first position.

If the resistance to flow in the airflow channel is sufficiently low when the occluder is in the second position, the pressure build-up in the airflow channel will be negligible. Therefore, the change to the characteristics of the acoustic impulse will also be negligible. In this case the occluder in the second position is not in contact with the housing 209 of the primary component 102 and there is a gap of at least 0.5 mm between the occluder and the housing 209. When the occluder is in the second position, air is still able to flow through the device and the resistance with the occluder in the second position is not as high as if the occluder was closer to, or in contact with, the housing. Changes in pressure when the occluder is in the second position can also be reduced by limiting the amount of time the occluder is in the second position for. The occluder remains in the second position for no more than 20 ms before being returned to the first position.

A negligible pressure change in the airflow channel, as a result of the occluder being in the second position, means that a relatively simple mathematical model is required. This simplifies the mathematics, particularly calculations using Fast Fourier Transforms. A minimal pressure build-up is also more comfortable for the subject using the device. If the change in pressure in the airflow channel is too substantial the subject will notice the change while breathing through the device which may cause discomfort and interrupt tidal breathing.

If the resistance to flow in the airflow channel is significantly higher when the occluder is in the second position and the occluder is in the second position for a significant period of time, then there will be a non-negligible pressure change in the airflow channel. Therefore, the changes to the characteristics of the acoustic impulse will also be non-negligible. When the occluder is in the second position there may be a gap of less than 0.5 mm between the occluder and the housing 209 of the primary component 102. There may be no gap between the occluder and the housing 209. The length of time the occluder is in the second position for may be longer than 20 ms.

The change in characteristics of the acoustic impulse may be an increase in the amplitude of the acoustic impulse. This is because a pressure build-up in the airflow channel contributes additional energy to the acoustic impulse. It is also because the occluder in the second position more efficiently directs the energy of the acoustic impulse into the airflow channel and toward the mouthpiece.

At step 1706 the flow and pressure of air in the airflow channel are sensed by the flow sensor 306 and the pressure sensor in the sensor assembly 304. This sensing determines the flow and pressure due to the subject's breathing which is normal, tidal, breathing. The control circuitry receives the measurements from the flow and pressure sensors. The control circuitry will analyse the signals by performing a Fourier Transform. The amplitude of the pressure fluctuations at frequencies from 5 Hz to 20 Hz can then be continuously measured. The control circuitry stores the results of the measurements and the Fourier Transform.

At step 1708 an acoustic impulse is created by the device by moving the occluder from the first position to the second position. The flow and pressure of air in the airflow channel are sensed continuously by the flow sensor 306 and the pressure sensor in the sensor assembly 304 for a period of 150 ms. The 150 ms sensing period begins momentarily before the occluder begins its movement from the first position to the second position. 150 ms is long enough to include measurements after the acoustic impulse has entered the subject's airways as well as immediately after creation of the acoustic impulse. The flow and pressure measurements are a superposition of the flow and pressure resulting from the subject's breathing with the flow and pressure resulting from the acoustic impulse. The control circuitry performs a Fourier Transform on the pressure and flow signals and stores the measurements and the results of the Fourier Transform. The measurements of the superimposed flow and pressure can be compared to the measurements of flow and pressure in step 506. This allows the separation of the pressure and flow signal resulting from the subject's breathing from the portion of the signal that is caused by and in response to the acoustic impulse. The control circuitry can use the response of the acoustic impulse to calculate metrics indicating characteristics of a subject's airway.

Steps 1704 to 1708 may be repeated any number of times during a test, while a subject breathes through the device. These steps may be repeated at least three times every second. The measurements taken each time that step 1706 and 1708 is performed are stored in the control circuitry 106. Repeating steps 1704 to 1708 means that measurements can be taken throughout the duration of a breath and so any change in the characteristics of the airways of the subject can be detected.

At step 1710 the control circuitry 106 outputs the results of the oscillometry test. This may be done by wireless data transfer to a smart phone or computer, for example. The wireless data transfer may be over Bluetooth. In some embodiments a display may be fitted into the device itself. In some embodiments software either stored in the control circuitry 106 or on a computer or portable device that may be used to process the results of the test and provide a simplified test score or result. In some embodiments the results of the test may be stored to maintain a record of past tests. This record of past tests can be used in a diagnosis process and to monitor changes in a subject's health over time.

Note that the oscillometry configuration has a subset of sensors comprising a flow sensor and a pressure sensor. In some embodiments, the oscillometry configuration also comprises a temperature sensor and a humidity sensor. In these embodiments, the control circuitry is configured to use measurements from the temperature, humidity and pressure sensor to adjust measurements made by the flow sensor.

The flow sensor is the same flow sensor as referred to previously and so is common to the subsets of sensors of both the first and second spirometry configurations. The flow sensor is also common to embodiments of the nitric oxide concentration configuration that use the flow sensor.

The pressure sensor is the same pressure sensor as referred to previously and so is common to the subsets of sensors of the second spirometry configuration and the nitric oxide configuration.

The device 100 may be configured to perform a capnometry test. Capnometry is the measurement of exhaled carbon dioxide. The capnometry configuration of the device is very similar to the configuration for performing nitric oxide concentration tests as shown in FIGS. 6 and 7. In the case of capnometry, the secondary component, comprising a nitric oxide sensor 604, is replaced with a near identical secondary component that instead comprises a carbon dioxide sensor. The carbon dioxide sensor is a SprintIR-20 from Gas Sensing Solutions.

The carbon dioxide sensor uses a non-dispersive infrared absorption operating principle. It is sensitive to condensation, so a gas drier is used to ensure the humidity at the sensor is non-condensing. The same gas drying component may be used for the capnometry and nitric oxide tests. However, the capnometry test does not require additional flow resistance, as the nitric oxide test does, and it is preferable to have a low flow resistance in the airflow channel.

A sampling frequency of at least 20 Hz, from the carbon dioxide sensor, is preferred to accurately record the transient showing how carbon dioxide concentration changes with time. The peak value of carbon dioxide concentration may be of interest. The capnometry transient is thought to change as symptoms worsen and may provide warning that a subject may soon have an asthma attack or COPD exacerbation. Higher peak values of exhaled carbon dioxide indicate a high concentration of carbon dioxide in the blood. This suggests impairment of the respiratory or cardiovascular system of the subject.

The shape of the carbon dioxide concentration transient during tidal breathing can also be used as an indicator of respiratory performance. A more gradual increase in exhaled carbon dioxide concentration may indicate respiratory obstruction or higher airway resistance. However, this method is not able to distinguish if a lower rate of increase in carbon dioxide concentration is from slower airflow or slower transfer of carbon dioxide from the blood to the airways. In some embodiments the carbon dioxide concentration measurements are combined with measurements of flow rate. This provides more information as to the relative contributions to the exhaled carbon dioxide signal i.e. whether it is related to airflow speed or from transfer rate of carbon dioxide from the blood to the air in the lungs.

The capnometry configuration, in some embodiments, has a subset of sensors comprising a carbon dioxide sensor and a flow sensor. The flow sensor is common to the subsets of sensors of both the first and second spirometry configurations, the nitric oxide test configuration and the oscillometry configuration.

In some embodiments the device comprises a display. The display can act as a user interface for the device. The display or user interface may be a touch screen display. The user interface allows the subject to manually input data into the device, the subject to send commands to the device, the device to provide instructions to the subject, and the device to present results to the subject. It may be a trained medical professional that interacts with the user interface rather than the subject. The display may be part of the device. However, it may also be part of a portable computer such as a laptop or smartphone which the control circuitry is able to transfer data to.

Figure 18:
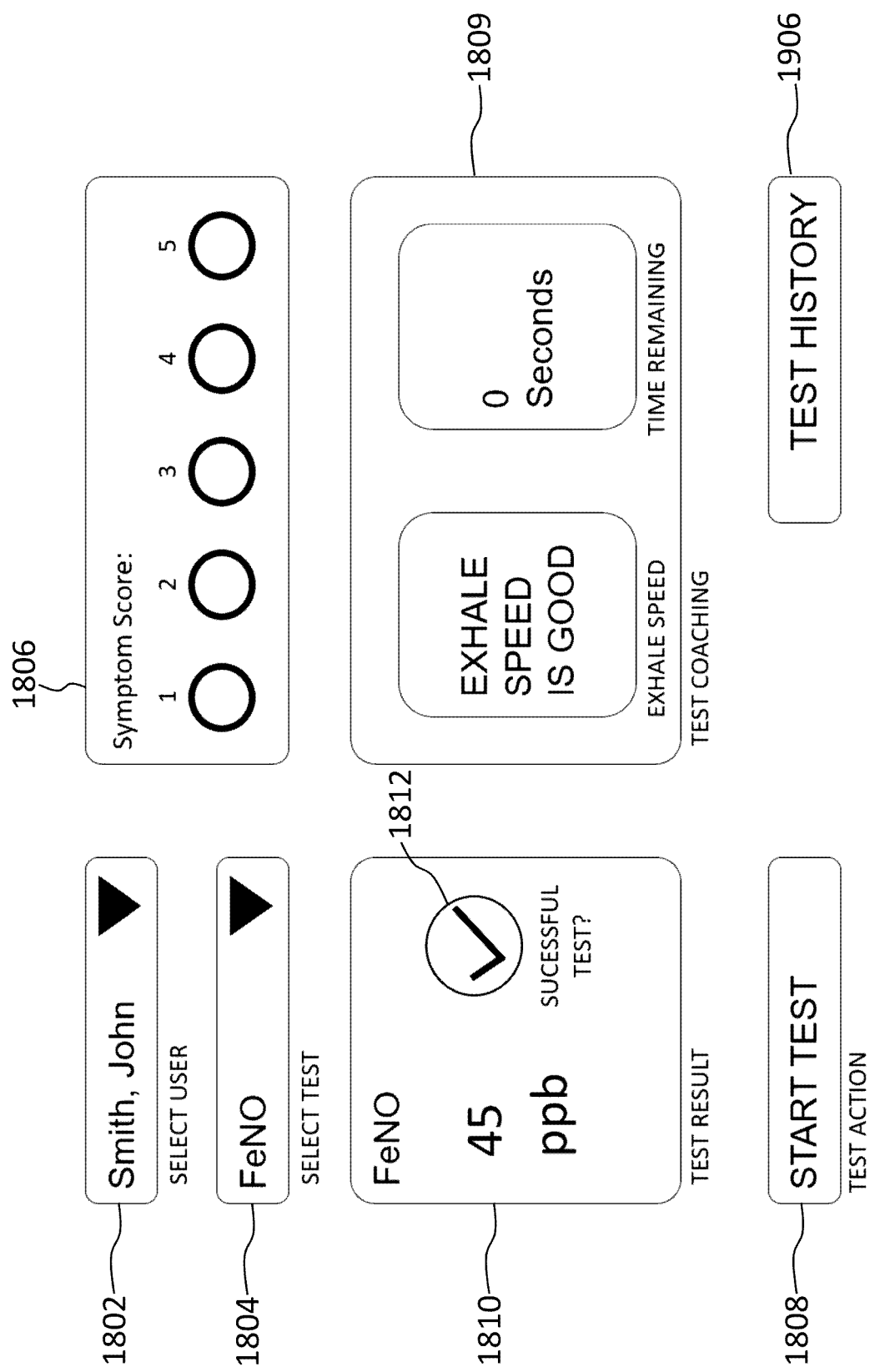
FIG. 18 is a display or user interface of the device, this embodiment is for subjects with limited medical training.

FIG. 18 shows a first embodiment of a display on an interface of the device. This shows the device in testing mode. The interface in this embodiment is designed for subjects with limited medical training and so provides only simple feedback to the subject rather than complicated metrics.

The display includes an option for entering the subject the test is for 1802, which allows the result to be saved in a database as belonging to that user. In this case the subject is John Smith.

The display includes an option for instructing the device which test is to be performed 1804. In this case the test that is to be performed is a nitric oxide test. In embodiments of the device in accordance with FIGS. 1a to 1d, the device instructs the subject to reconfigure the components of the device to modify the airflow channel for the selected test. In embodiments of the device in accordance with FIG. 1e, the device itself will reconfigure the components of the device to modify the airflow channel required for the test. For example, the control circuitry may send a signal to valves between components to open or close to configure an airflow path through the device.

In an alternative embodiment, the device may detect what configuration it is in after the subject has manually configured the components of the device to modify the airflow channel for the required test. In these embodiments, there is no need for an option for the subject to select what test the device is to perform.

The subject can manually input data into the device. This is shown in FIG. 18 as the symptom score input 1806. Other useful data that could be manually entered includes recent allergen exposure, weather, air quality, and medicine taken. In some embodiments additional data could be imported automatically from other sources such as from a wearable device, smart inhaler, smartphone, electronic health record, or internet-based API. The user interface can include provision to view these additional data alongside data or results created by tests on the device itself.

The display includes a test action input 1808 that is used to instruct the device to begin a test or cancel a test in progress.

The display includes a test coaching output 1809 that provides instruction to the subject, generally after the test has begun. In FIG. 15, the test that is being performed is a test of nitric oxide concentration in exhaled air. This test needs to be performed with a controlled exhalation of breath by the subject. The speed of the exhaled breath needs to be maintained at a controlled speed or flow rate and for a minimum duration. The display informs the subject as to whether the exhale speed is suitable and for how long they have been exhaling for.

The display includes an output for showing the test result 1810. In this example, the test was an exhaled nitric oxide test and so the output is a concentration of nitric oxide given in parts per billion. This panel also provides the user with a test validation output 1812 to indicate to the user if the result was successful or if the next needs to be repeated. Determining whether the test was a success may depend on whether the user followed the test coaching instructions as above.

Figure 19:
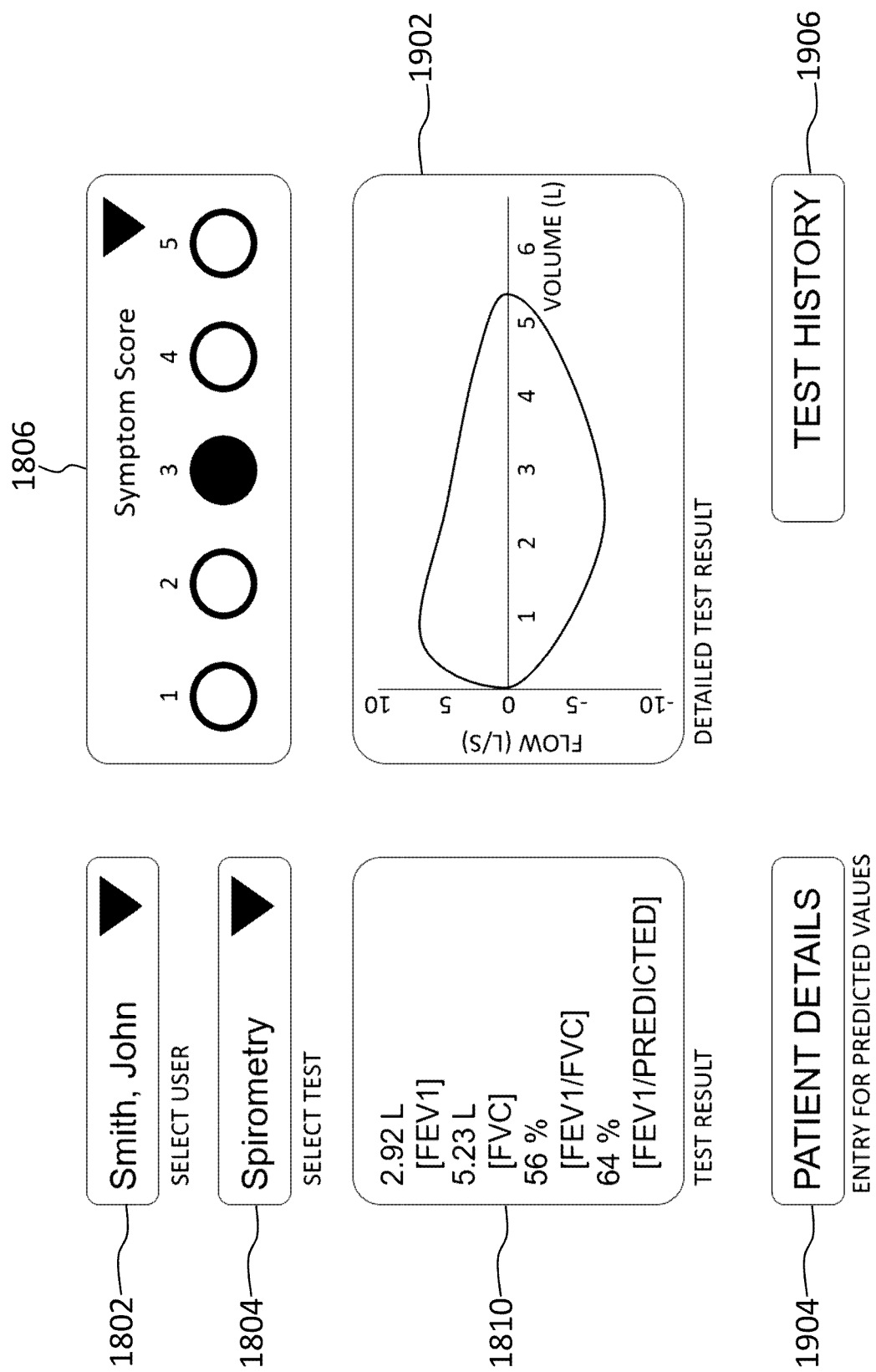
FIG. 19 is a display or user interface of the device, this embodiment is for subjects that are medical professionals.

FIG. 19 shows another embodiment of the user interface that is designed for medical professionals. It allows the medical professional to review the test of a subject with more detail of the results of the test than FIG. 18.

As in FIG. 18, input buttons 1802 and 1804 allow the subject and test to be selected. In this case the test that has been selected is a spirometry test.

The test result panel 1810 shows output metrics calculated from the test. The panel is the same as the previous embodiment shown in FIG. 18, but shows the results for a different test (for a spirometry test instead of an FeNO test). The detailed test result 1902 panel shows a graph of the test result, in greater detail than the calculated metrics. An experienced and trained medical professional may gain additional detail from the graph than the output metric alone. Preferably, the metrics in the test result panel 1810 and the axes of the detailed test result panel 1902 graphs are pre-populated according to the type of test selected using the select test input button 1804. However, in some embodiments there is provision for the user to select what output metrics and axes are shown.

In some embodiments, a less detailed result for another test could be shown in a separate panel of this display. The display of multiple tests allows the user to interpret the results of multiple data sources jointly.

The display includes an input to add details for the subject 1904. For example, entering details for a subject such as height, weight, age, sex, and ethnicity can be used to establish predicted values for the test result.

In both FIGS. 15 and 16 the display includes an input button test history 1906 which the user selects to instruct the device to display previous results on the user interface. Pressing this button causes the device to display the screen shown in FIG. 20 which is a display that recalls data from previous tests.

Figure 20:
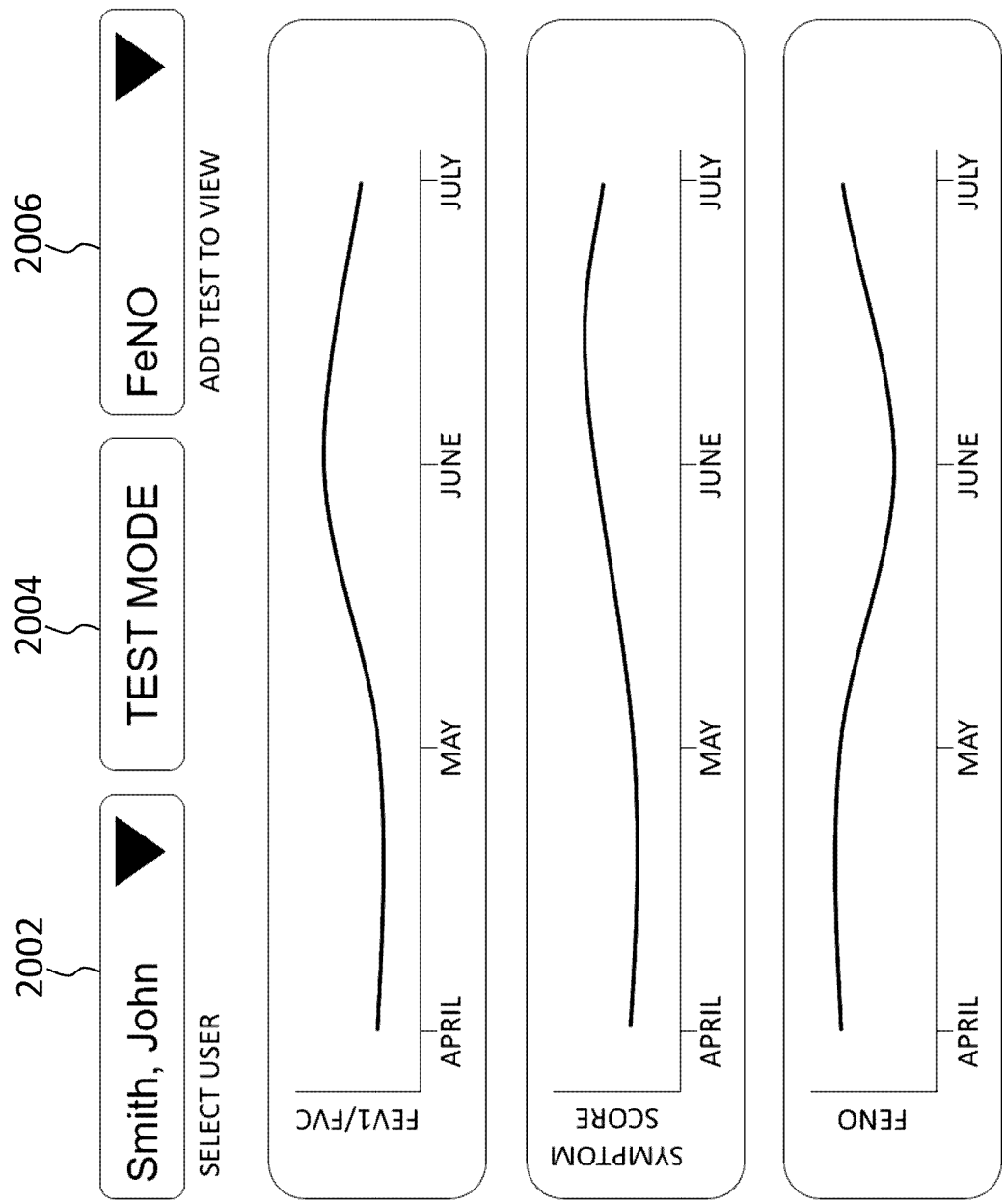
FIG. 20 is a display that shows historical data from previous tests.

The display shown in FIG. 20 includes an input button to select the user to display data for 2002, an input button to put the device into test mode 2004, and to add a type of test to the display 2006. After a subject and test are selected, graphs of test results versus time are plotted in the panels of the user interface 2008, 2010 and 2012. As illustrative examples, spirometry, exhaled nitric oxide, and manually entered data are plotted in the display. These displays can assist a subject or medical professional in understanding the time history of metrics related to their medical condition. A benefit of having multiple tests on the device is that it is easier for multiple tests to be displayed in a way that can be compared and interpreted.

Figure 21:
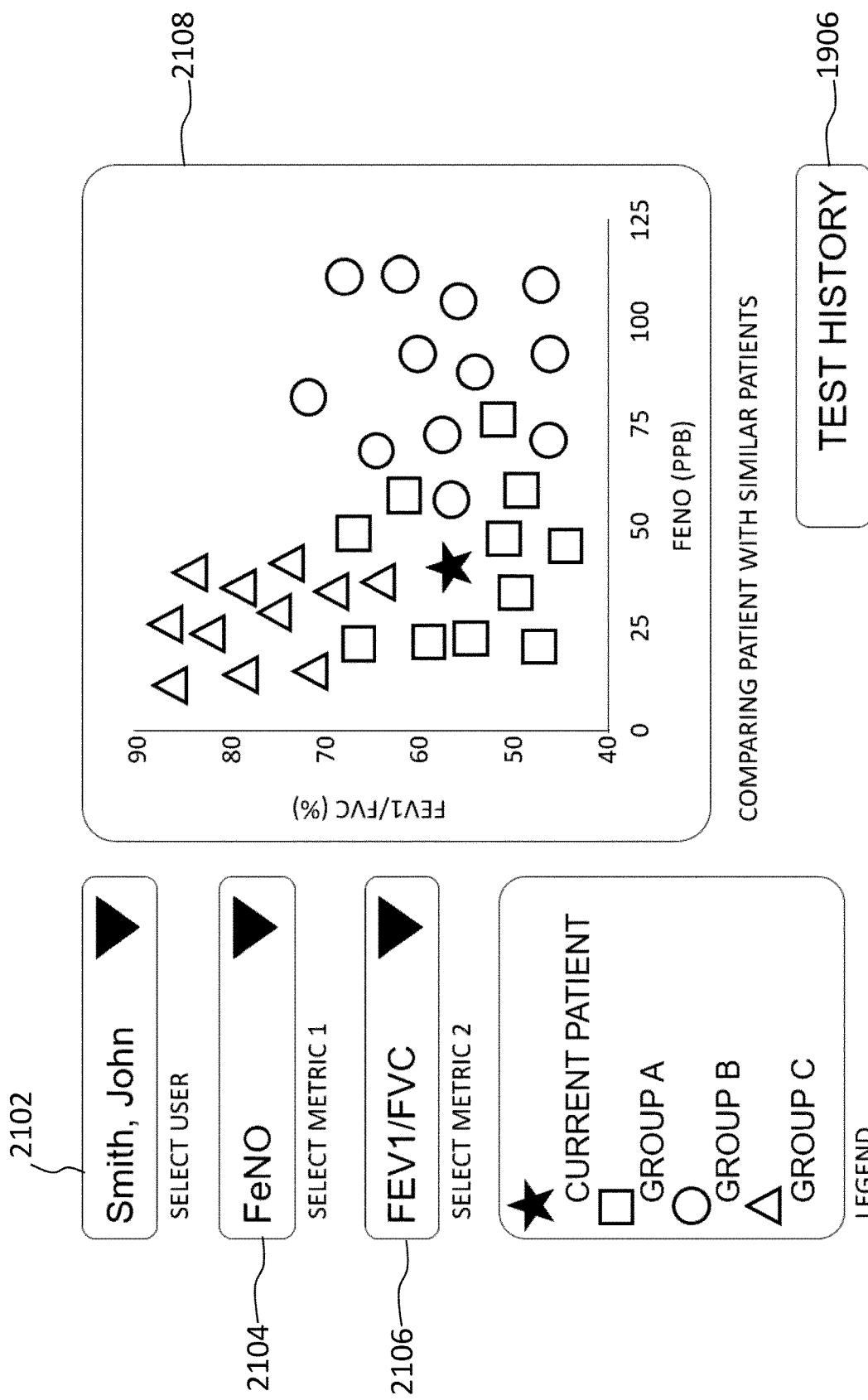
FIG. 21 is an additional display or user interface where the test results from a current subject are compared to those of other subjects.

FIG. 21 is an additional display of the user interface where the test results from a current subject are compared to those of other subjects. Input buttons allow the user to select the subject 2102, a first metric 2104, and a second metric 2106. Two metrics are shown here illustratively; this display can also be used with one metric or more than two metrics. The graph on the main panel 2108 is generated and displayed, which compares the results for these tests for the subject 2102, with those from other subjects from different subject groups from an existing database with the representation of the different groups shown in the legend panel 2110 The other subjects can be classified, for example as group a, group b, and group c. This classification and display can aid the user in determining if the current subject has characteristics similar to a classified group of other subjects from the existing database. The classification of subjects into group a, group b, group c, etc. could be based on successful response to a particular treatment or if these people are known to have a certain disease sub-type.

Figure 22:
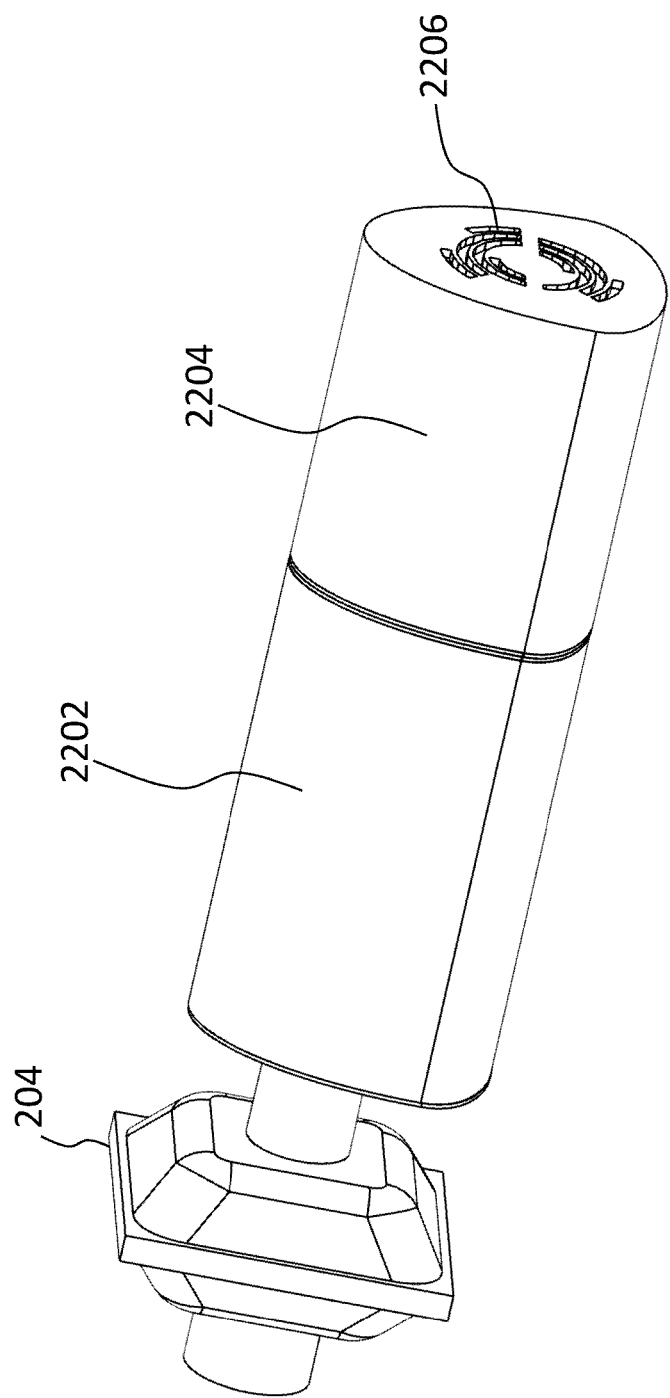
FIG. 22 is a perspective view of an embodiment of the device where the primary component and secondary component each comprise a case.

FIG. 22 shows an embodiment of the device wherein the primary component is covered by a case 2202 and the secondary component is covered by a case 2204. The case for the secondary component 2204 comprises an opening 2206 which corresponds to the air inlet and is in fluid communication with the airflow channel. Air can pass through the opening 2206. Cases 2202 and 2204 provide protection to the components contained within. Each of the secondary components, already described, can comprise such a casing. When an additional connection mechanism is required between the primary component and a secondary component this can be through the use of one or more pairs of magnets within the casing, not shown. The primary component comprises one magnet from the pair of magnets, the secondary component comprises the other magnet. The magnets are configured such that when the primary and secondary units are connected, a retaining force exists between the pair of magnets, holding the two components together. The magnets can also provide a means for aligning the primary and secondary component in repeatable way.

The opening 2206 can be optimized depending on the secondary component. Generally, it is preferable that the opening 2206 does not significantly increase the resistance of the airflow path defined through the device. However, when the device is configured for performing an oscillometry test, the opening 2206 of the case of the oscillometry module can be configured to increase the airflow resistance in the airflow channel. In particular the airflow resistance may be significantly increased by the opening 2206when the occluder is in the first position but less significantly when the occluder is in the second position. For example, the system can be configured such that a portion of the occlude mechanism partially occludes opening 2206 when the occluder is in the first position but does not partially occlude the opening 2206 when the occluder is in the second position.

As described, the movement of the occluder from the first position to the second position increases the flow resistance in the airflow channel by reducing the gap between the occluder and the housing. This helps ensure as much energy from the acoustic impulse is directed to the mouthpiece as possible, but the movement of the occluder from the first position to the second position but can cause a relatively large increase in the total resistance in the airflow channel which can affect the results of the oscillometry test and which may be uncomfortable for the subject. By reducing the resistance through opening 2206 as the occluder moves from the first position to the second position, the increased resistance in the airflow channel caused by the reduction in the gap around the occluder can be partially offset by a reduction in the resistance through the opening 2206, while still maintaining the benefit provided by the occluder.

There are other ways of at least partially offsetting the increase of resistance caused by the reduction in the gap around the occluder. For example, the housing of the oscillometry module can comprise additional holes which act as air inlets and outlets. In this embodiment the occluder is configured so that the additional holes are occluded when the occluder is in the first position but not when the occluder is in a second position. Alternatively, it is possible to include a further occluder at the opening 2206, operating in tandem with the first occluder. The further occluder is configured such that it occludes the opening 2206 to a greater degree when the first occluder is in the first position relative to when the first occluder is in the second position.

Figure 23A:
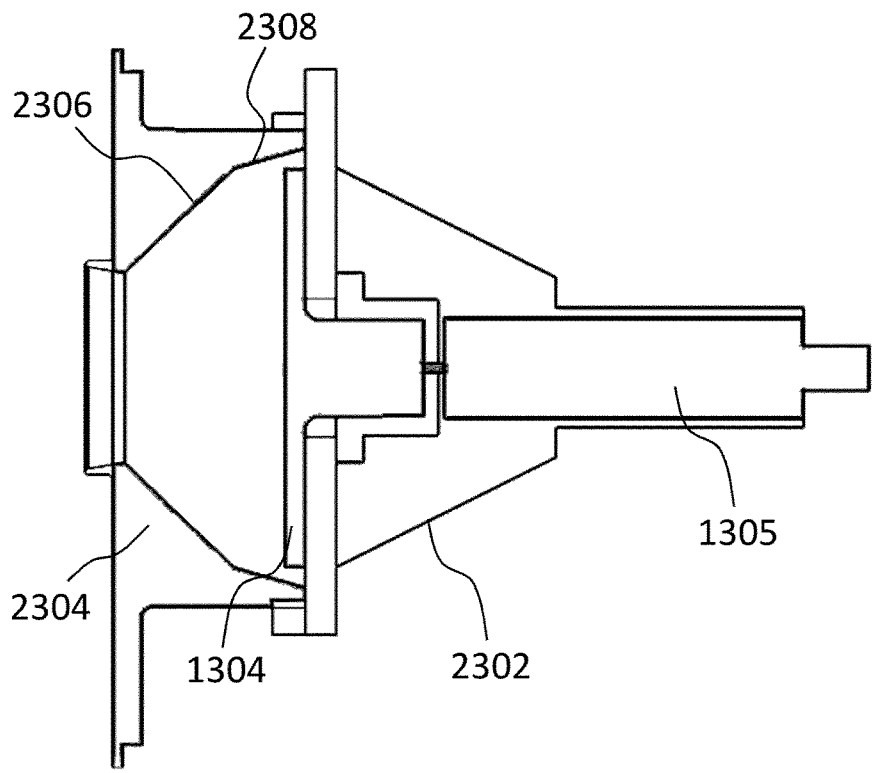
FIGS. 23a and 23b are cross-section schematic views of another embodiment of the oscillometry module.
Figure 23B:
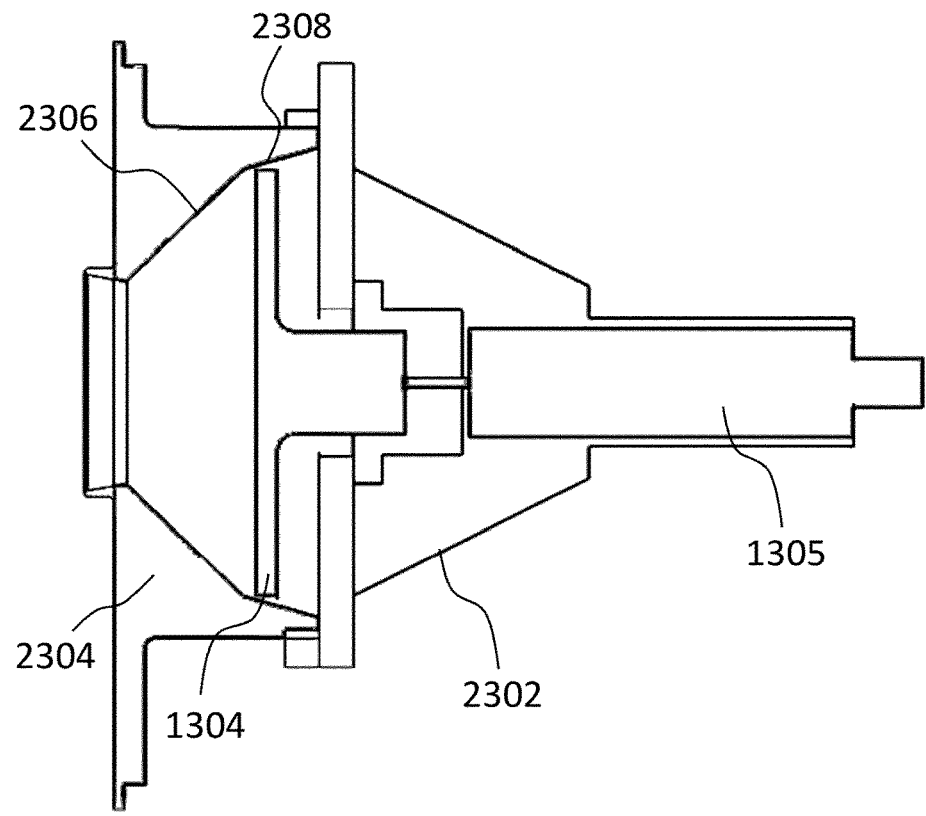

FIGS. 23a and 23b are cross-sectional schematic views of another embodiment of the oscillometry module, described above in relation to FIGS. 13 to 18. In this embodiment, the oscillometry module 2302 comprises an occluder 1304 and a means to move the occluder 1305. In FIG. 23a, the occluder 1304 is in the first position. In FIG. 23b, the occluder 1304 is in the second position. As described above, the movement of the occluder 1304 from the first position to the second position creates an acoustic impulse in the airflow channel.

The oscillometry module 2302 comprises a housing 2304 which is in communication with the airflow channel defined in the primary component 102. Housing 2304 is tapered and the taper has a first taper portion 2306 and a second taper portion 2308. The shape of the first and second taper portions 2306 and 2308 result in the housing 2304 having a funnel-like shape.

At its widest diameter, the second taper portion 2308 has an opening that provides enough clearance around the occluder 1304, when in a first position, that air passing through the gap between the housing 2304 and the occluder experiences very little resistance. As the occluder moves from the first position to the second position, the gap between the occluder 1304 and the housing 2304 is reduced and the resistance to flow increases. In the second position 2304, the occluder is adjacent to the widest part of the first taper portion. The diameter of the widest part of the first taper portion 2306 is similar to, or the same as, the diameter of the occluder 1304. If the occluder has a diameter of 40 mm, the widest part of the first taper portion can have a dimeter of slightly greater than 40 mm. In embodiments where complete occlusion is desired, the widest part of the taper portion has a diameter equal to the diameter of the occluder. The narrowest part of the first taper portion 2306 is 20 mm. The housing 2304 having this shape results in the energy from the acoustic impulse being guided into the airflow channel of the device towards the mouthpiece. Less energy is lost to the surroundings compared to the embodiment of the oscillometry module shown in FIG. 13.

Figure 24A:
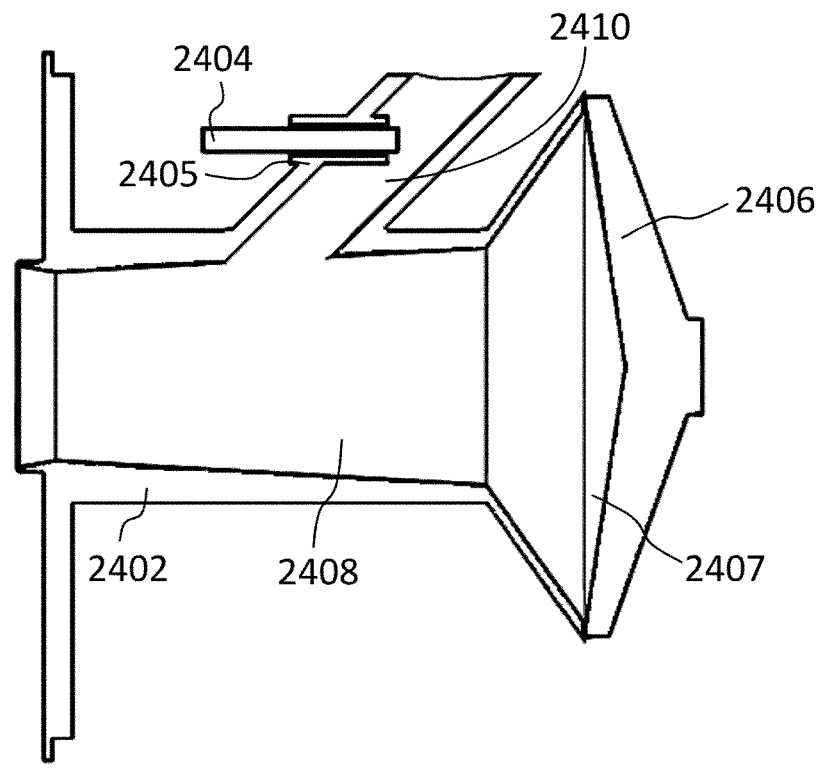
FIG. 24 are cross-section schematic views of a further embodiment of the oscillometry module.
Figure 24B:
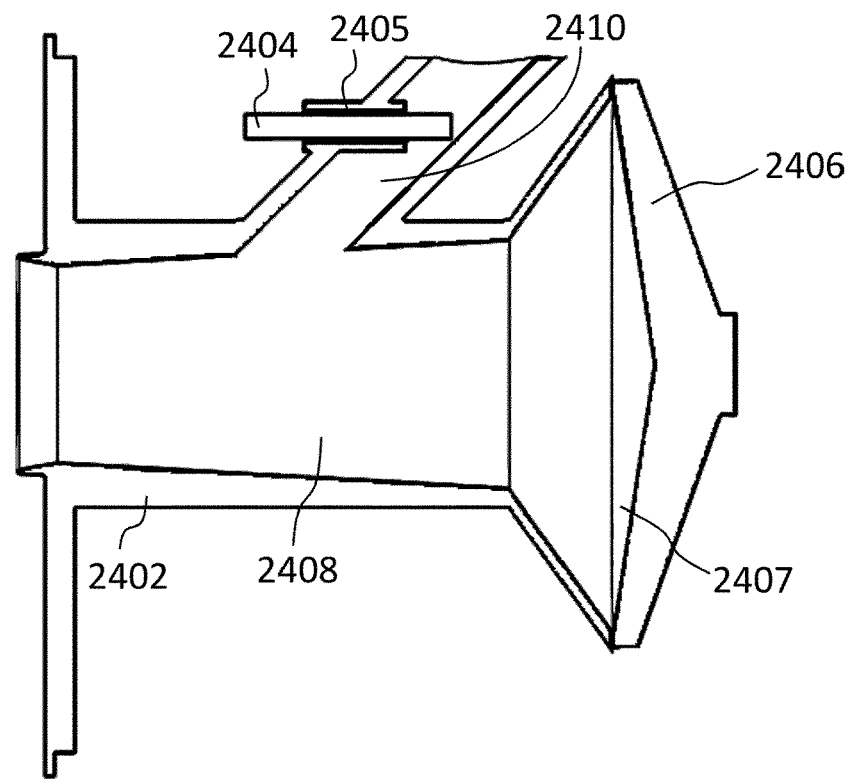

FIGS. 24a and 24b are cross-sectional schematic views of another embodiment of an oscillometry module 2402. The retaining means is not shown in FIG. 24. The oscillometry module 2402 comprises an occluder in the form of a shutter 2404, a means to move the shutter in the form of a linear actuator 2405 and an acoustic impulse generator in the form of a loudspeaker 2406. In this embodiment, an airflow channel is defined through the oscillometry module 2402 to a forked distal end. The loudspeaker 2406 is positioned in a first branch 2408 of the fork. The shutter 2404 is positioned in a second branch of the fork 2410. The air inlet is positioned at the end of the second branch of the fork.

The oscillometry module 2404 is in electrical contact with the primary component 102, not shown. This means that signals can be sent and received from the microcontroller 106 in the primary component to the oscillometry module 2402. The microcontroller 106 can send signals to the linear actuator 2405 causing it to move the shutter 2404 from the position shown in FIG. 24a, which is the first position, to the position shown in FIG. 24b, which is the second position. In the second position, the shutter occludes an air inlet in the housing of the oscillometry module 2402 to a greater extent than in the first position. When the shutter 2404 is in the first position, the resistance at the air inlet is minimal. Power can also be transferred to the oscillometry module 2402 through the electrical contact. This provides power to the linear actuator that can be used to move the occluder between the first and second position.

The microcontroller 106 controls a signal generator. The generated signals are sent to the loudspeaker 2406. The loudspeaker comprises a speaker cone 2407 which creates an acoustic impulse in the direction of the mouthpiece in response to the signals. The signals sent to the loudspeaker results in an acoustic impulse being created that comprises frequencies from 5 Hz to 20 Hz. The signal generator is not shown.

The signals are sent to the loudspeaker are coordinated with the control signal sent to the linear actuator. This means that shutter 2404 can be moved from the first position to the second position simultaneously with the creation of the acoustic impulse by the loudspeaker 2406. When the shutter 2404 is in the second position, the resistance at the air inlet is increased. This ensures that a higher percentage of the energy of the acoustic impulse is directed toward the mouthpiece, than if the shutter were in the first position.

If the resistance is at the increased level for too long this may be uncomfortable for a subject using the device. Therefore, the shutter 2404 is not maintained in the second position for prolonged periods of time. By coordinating the movement of the shutter 2404 with the creation of the acoustic impulse by the loudspeaker 2406, the resistance need only be increased for a short period of time, for example, while the acoustic impulse is in the airflow channel of the oscillometry module. The duration of higher resistance should not be so long as to interfere with the breathing effort and breathing pattern of the subject. The timings of the occluder in the first and second position can be similar to those described in relation to previous embodiments of the oscillometry module. However, in the previous embodiments, as shown in FIGS. 13 and 22, the occluder both increases resistance and creates the acoustic impulse. In the embodiment shown in FIG. 24, the occluder is a separate element to the acoustic impulse generator. This means that there can be some decoupling of the impulse creation and the change to the flow resistance. For example, the timing of the movement of the shutter 2404 from the first position to the second position can be up to 5 ms before the creation of the acoustic impulse.

In an alternative embodiment of the oscillometry module 2402, the loudspeaker 2406 is replaced with a canister of compressed gas. This canister of compressed gas is configured to release the gas through a release valve. The release valve is configured such that the released gas pushes air in the airflow channel in the direction of the mouthpiece. The compressed gas is released in a direction that is parallel to the airflow channel and in the direction of mouthpiece. The release valve is connected to the control circuitry and controllable such that the release of the compressed gas is coordinated with the movement of the occluder from the first position to the second position. This coordination has already been described in relation to the embodiment shown in FIGS. 24a and 24b.

Embodiments of the device have generally been described in relation to a configurable device, i.e. a device having a first configuration and a second configuration wherein different configurations of the device can be used to perform different respiratory diagnostic tests. In other embodiments, the device may be a stand-alone device that is not configurable and is designed for performing only one respiratory diagnostic test. For example, the device can be a stand-alone oscillometry test. In stand-alone devices, the components making up the device are permanently connected to one another. However, the other features and advantages of such a stand-alone device will be the same as described in relation to a device for performing a plurality of respiratory diagnostic tests in a configuration for performing oscillometry tests.

The invention claimed is:

1. A device for performing a plurality of respiratory diagnostic tests, comprising:
   a housing comprising a primary component, a first secondary component, and a second secondary component;
   a sensor assembly; and
   control circuitry configured to receive signals from the sensor assembly,
   wherein the device has a first configuration in which the device is configured to perform a first respiratory diagnostic test, a second configuration in which the device is configured to perform a second respiratory diagnostic test, and a third configuration in which the device is configured to perform a third respiratory diagnostic test,
   wherein, in the first configuration, the primary component and the first secondary component are engaged to one another to define a flow path through the primary component and the first secondary component, the sensor assembly being used to measure at least a first property of a first sample of air in the flow path during the first respiratory diagnostic test,
   wherein, in the second configuration, the primary component and the first secondary component are disengaged from one another to define the flow path through the primary component such that one or more of a shape and a size of the flow path is modified relative to the first configuration such that airflow resistance experienced by a second sample of air in the flow path is modified relative to the first configuration, the sensor assembly being used to measure at least a second property of the second sample of the air in the flow path during the second respiratory diagnostic test,
   wherein, in the third configuration, the primary component and the second secondary component are engaged to one another to define the flow path through the primary component and the second secondary component, such that one or more of the shape and the size of the flow path is modified relative to the first configuration and the second configuration such that the airflow resistance experienced by a third sample of air in the flow path is modified relative to the first configuration and the second configuration, the sensor assembly being used to measure at least a third property of the third sample of the air in the flow path during the third respiratory diagnostic test, and
   wherein the control circuitry is configured to output a test result after performing either of the first respiratory diagnostic test, the second respiratory diagnostic test, or the third respiratory diagnostic test.

2. The device according to claim 1, wherein the primary component, the first secondary component, and the second secondary component are separate or stand-alone components when they are not engaged.

3. The device according to claim 1, wherein the primary component and the first secondary component are configured to be engaged with and disengaged from one another by a subject, and wherein the primary component and the second secondary component are configured to be engaged with and disengaged from one another by the subject.

4. The device according to claim 1, wherein the primary component has a power or data connection with the first secondary component in the first configuration, and wherein the primary component has a power or data connection with the second secondary component in the third configuration.

* * * * *